July 5, 1960
D. R. HEARSUM ET AL
2,943,788
DATA ANALYZING APPARATUS
Filed April 16, 1953
21 Sheets-Sheet 1
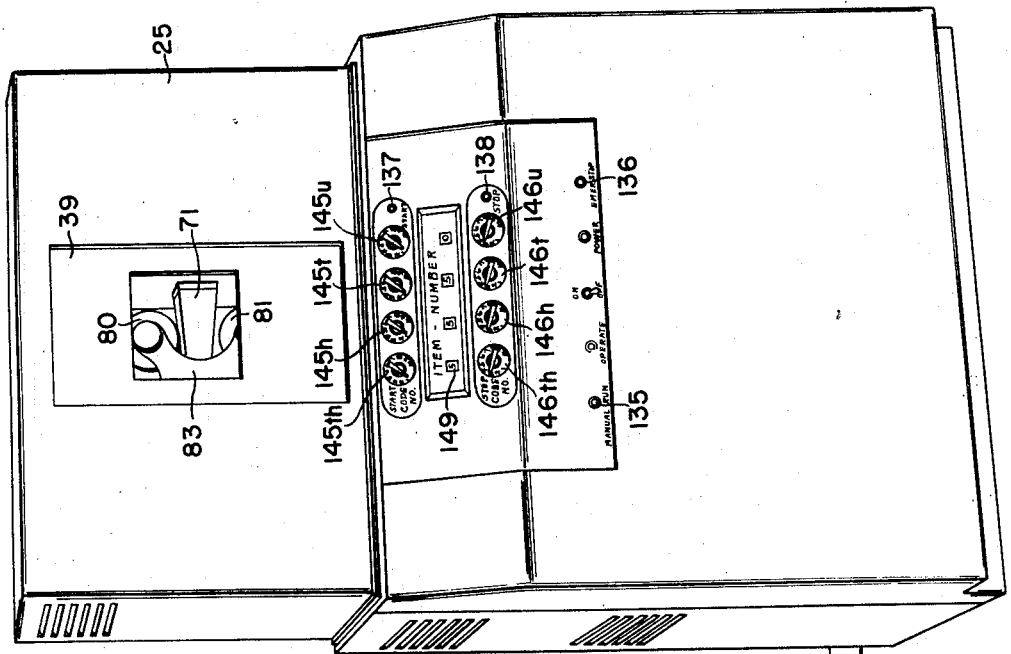
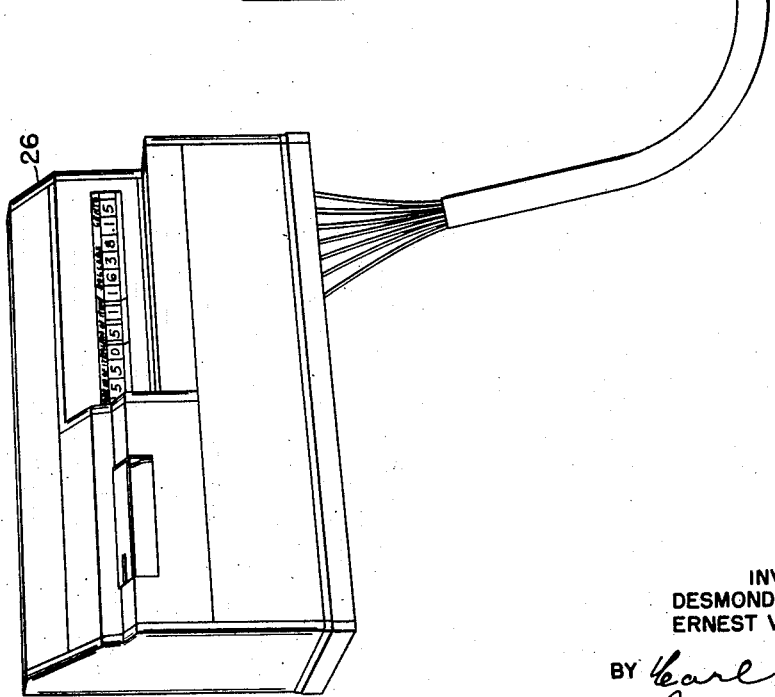
FIG.1
INVENTORS
DESMOND R. HEARSUM
ERNEST V. GULDEN
BY
THEIR ATTORNEYS

INVENTORS
DESMOND R. HEARSUM
ERNEST V. GULDEN

THEIR ATTORNEYS

July 5, 1960  D. R. HEARSUM ET AL  2,943,788
DATA ANALYZING APPARATUS
Filed April 16, 1953  21 Sheets-Sheet 4

INVENTORS
DESMOND R. HEARSUM
ERNEST V. GULDEN
BY Carl Beust
Louis A. Kline
THEIR ATTORNEYS

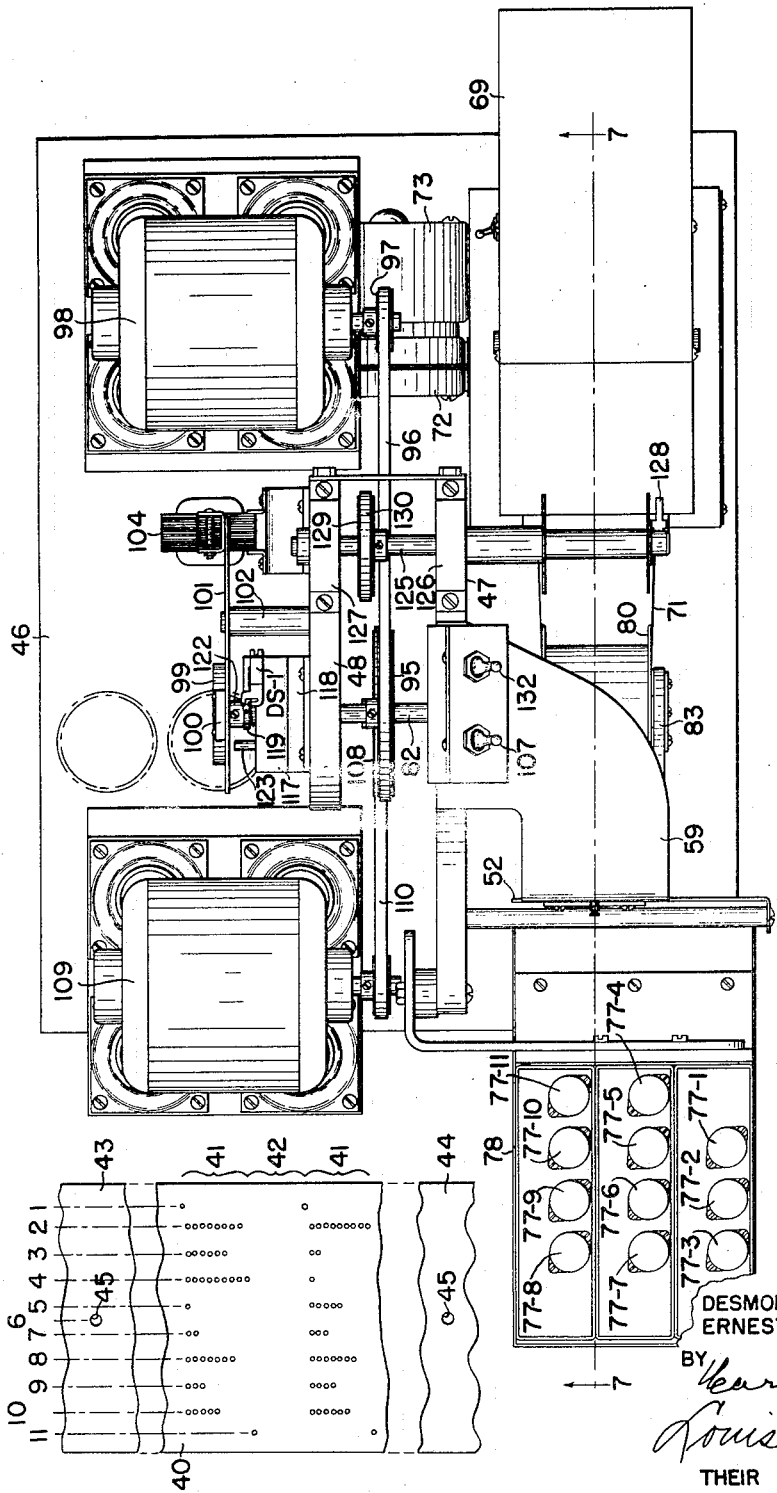

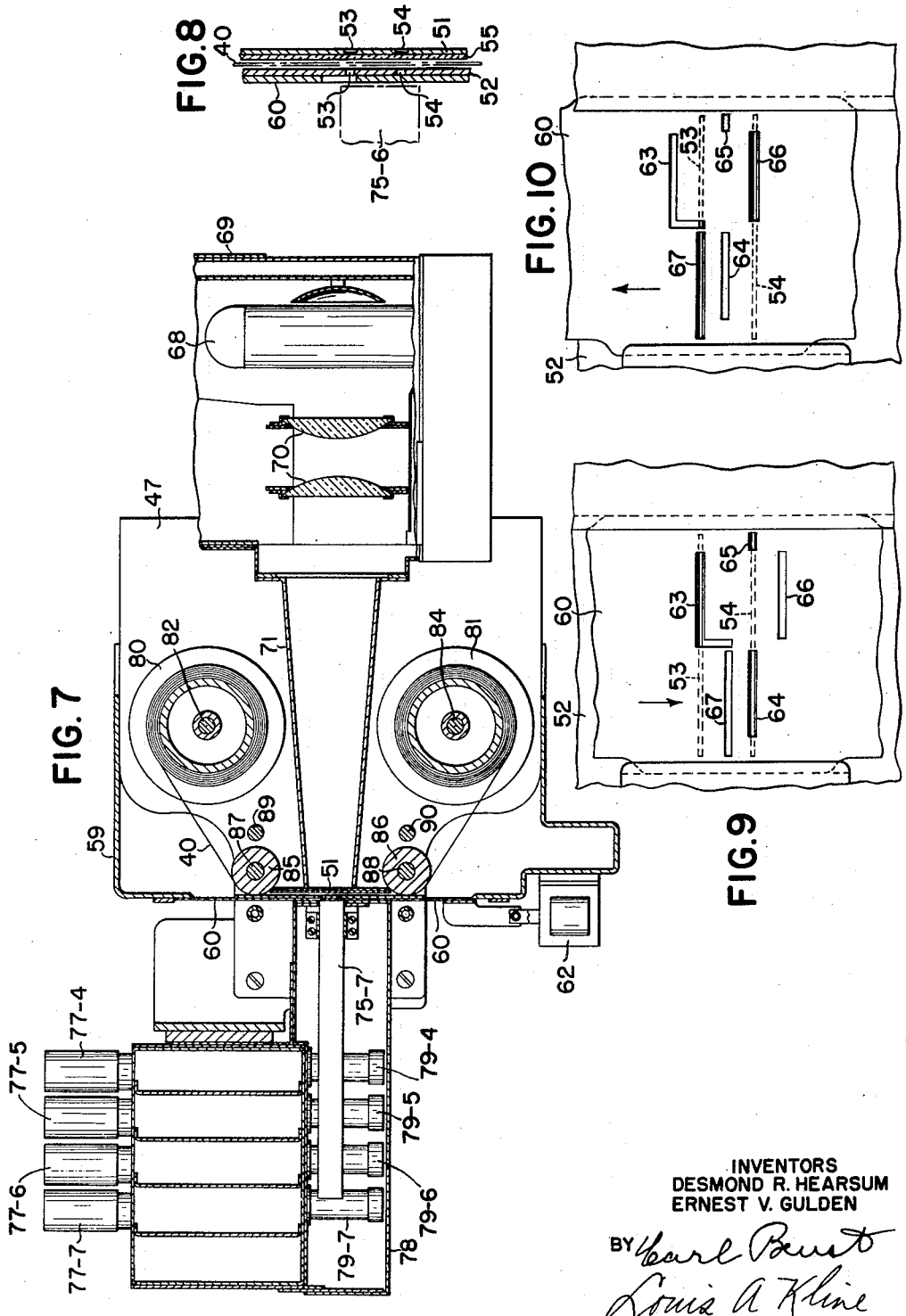

July 5, 1960
D. R. HEARSUM ET AL
2,943,788
DATA ANALYZING APPARATUS
Filed April 16, 1953
21 Sheets-Sheet 7
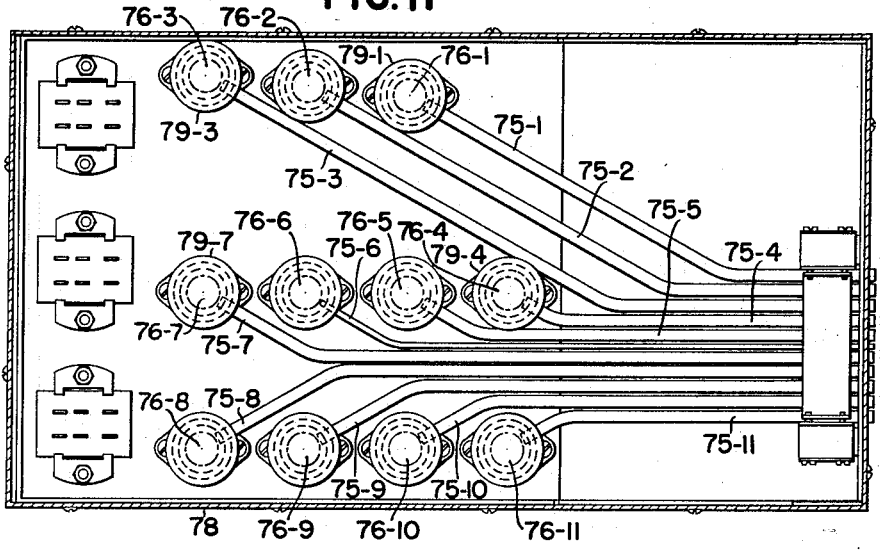
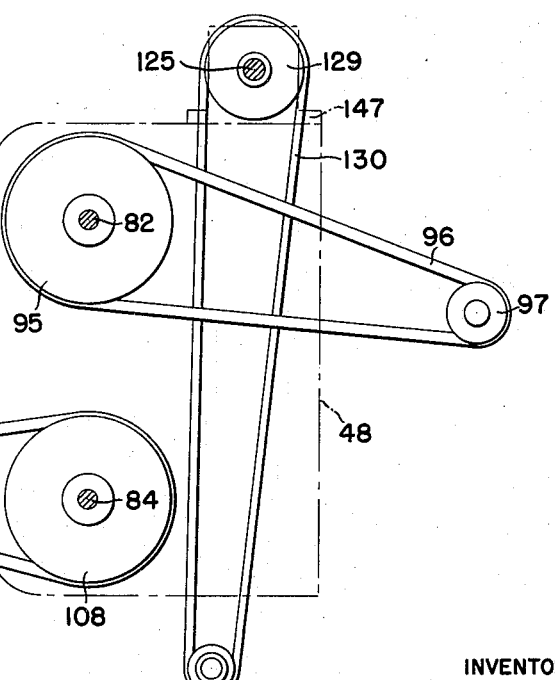
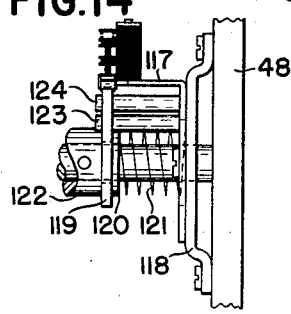
INVENTORS
DESMOND R. HEARSUM
ERNEST V. GULDEN
BY *Pearl Beust*
*Louis A. Kline*
THEIR ATTORNEYS July 5, 1960 D. R. HEARSUM ET AL 2,943,788
DATA ANALYZING APPARATUS
Filed April 16, 1953 21 Sheets-Sheet 8

INVENTORS
DESMOND R. HEARSUM
ERNEST V. GULDEN

BY
THEIR ATTORNEYS

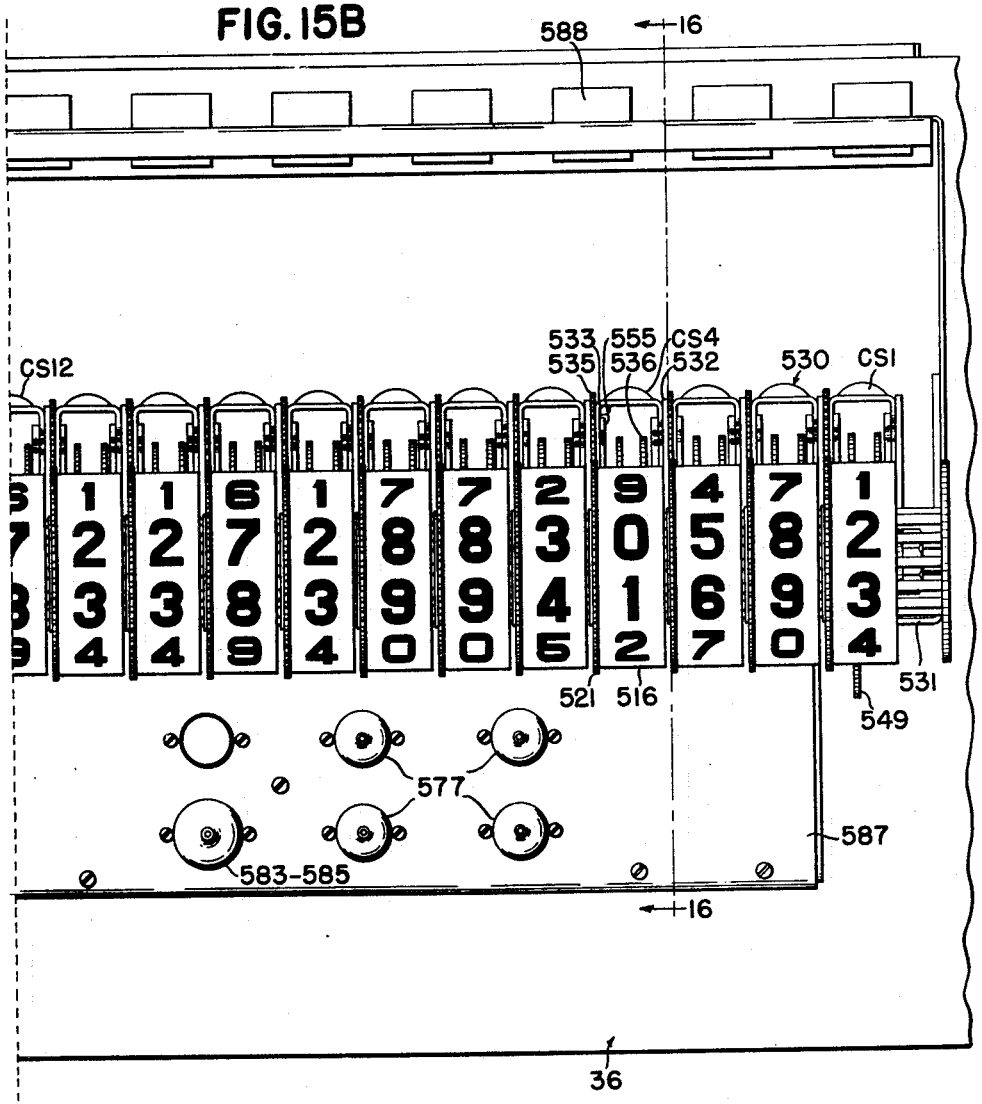

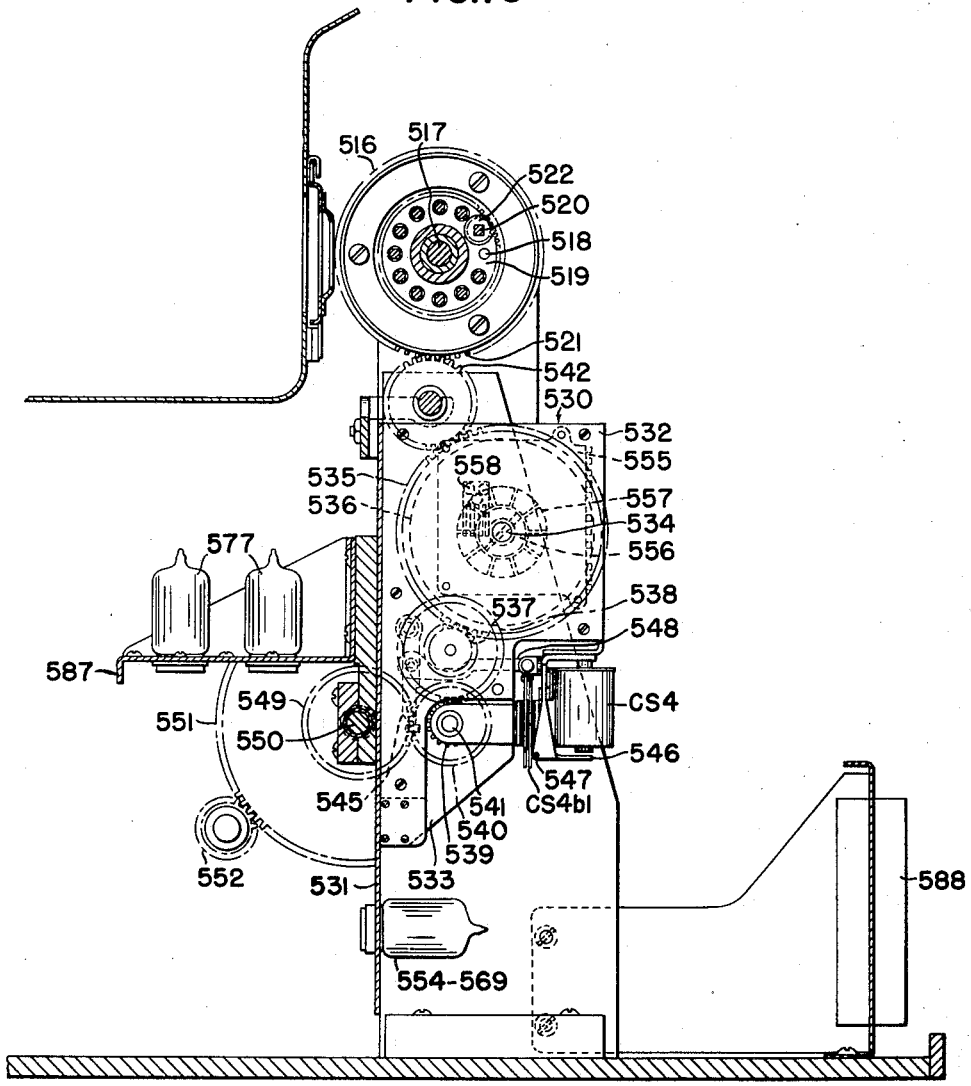

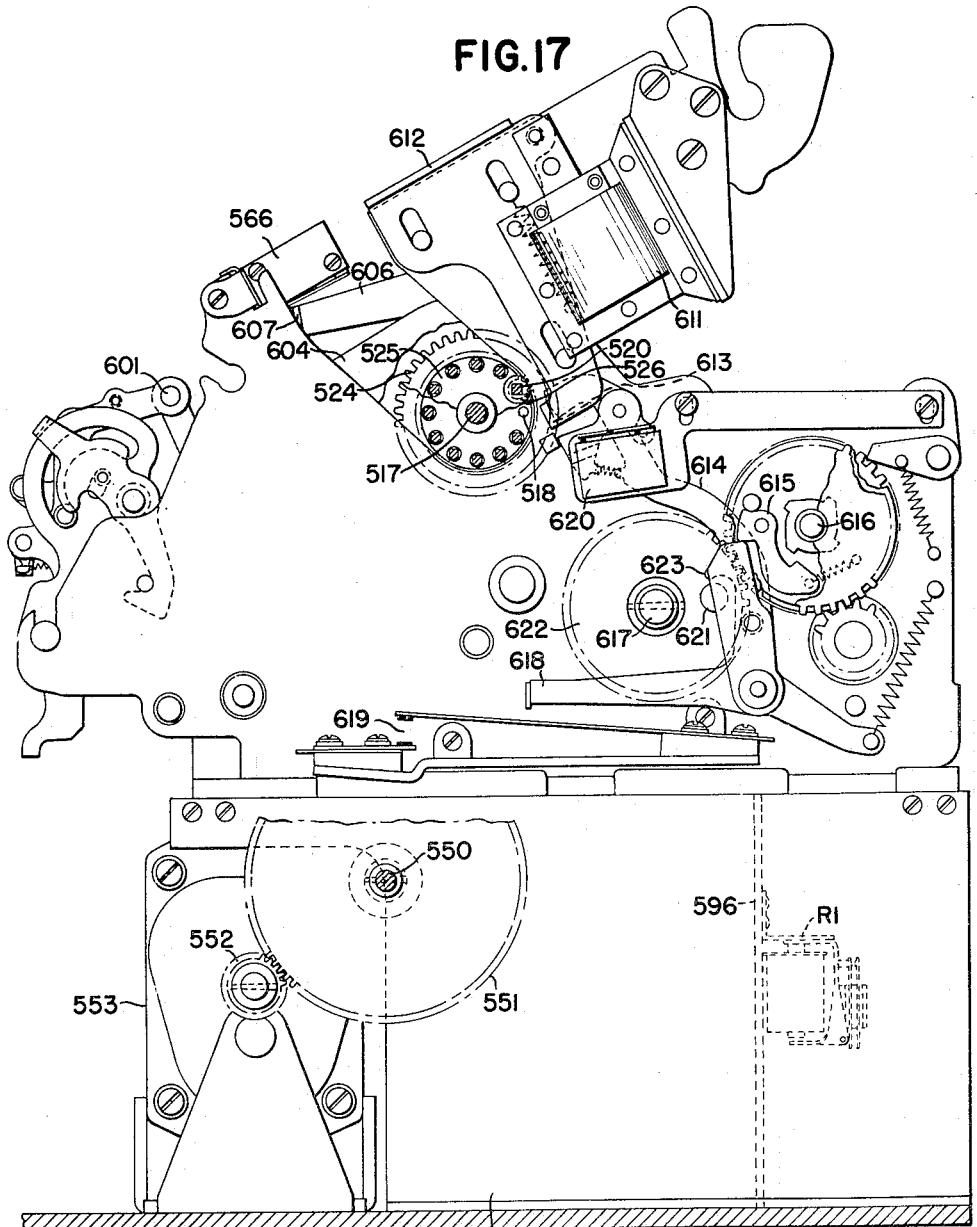

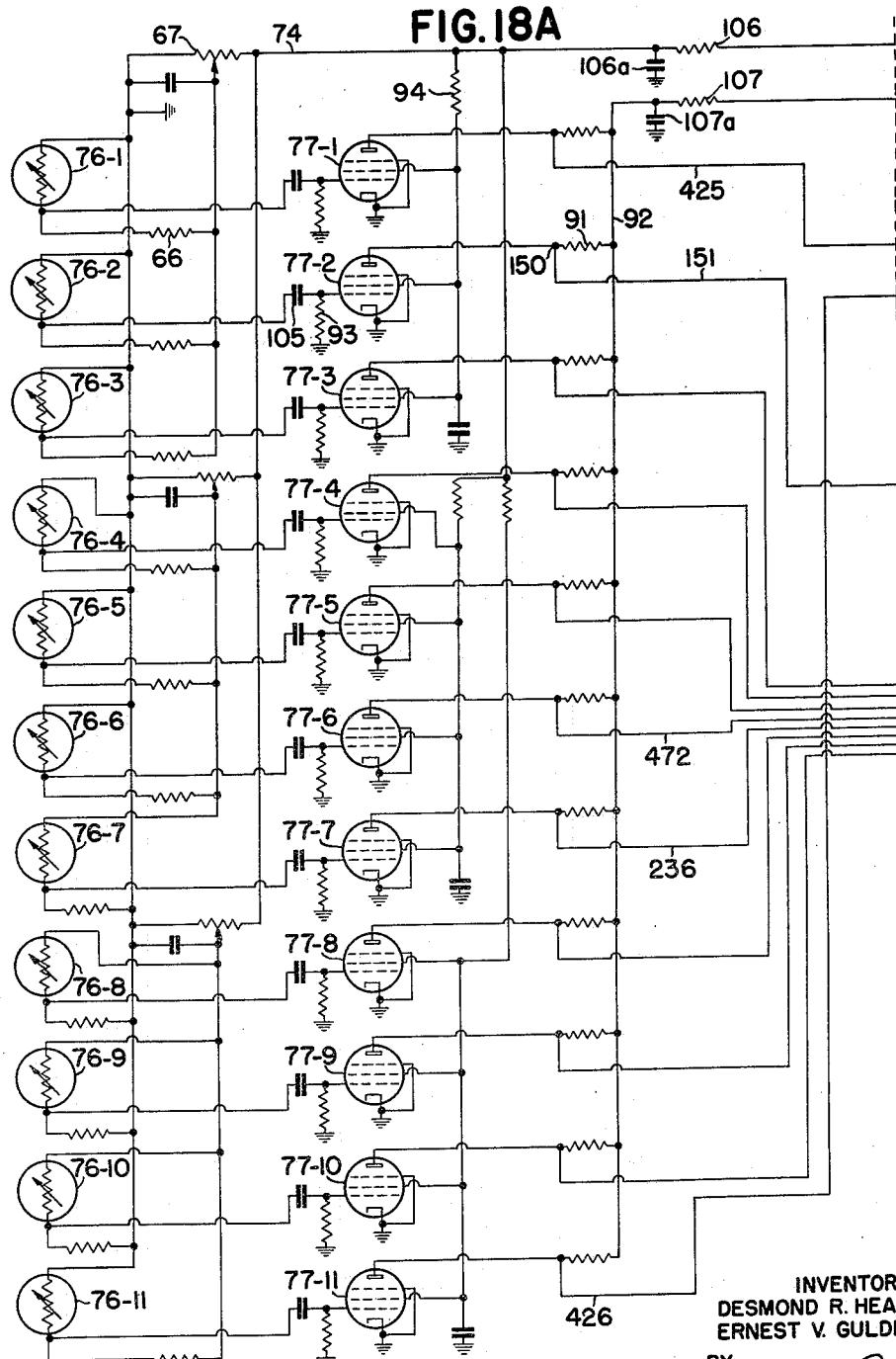

July 5, 1960

D. R. HEARSUM ET AL 2,943,788

DATA ANALYZING APPARATUS

Filed April 16, 1953

INVENTORS
DESMOND R. HEARSUM
ERNEST V. GULDEN

BY *Karl Benst*
*Louis A Kline*

THEIR ATTORNEYS

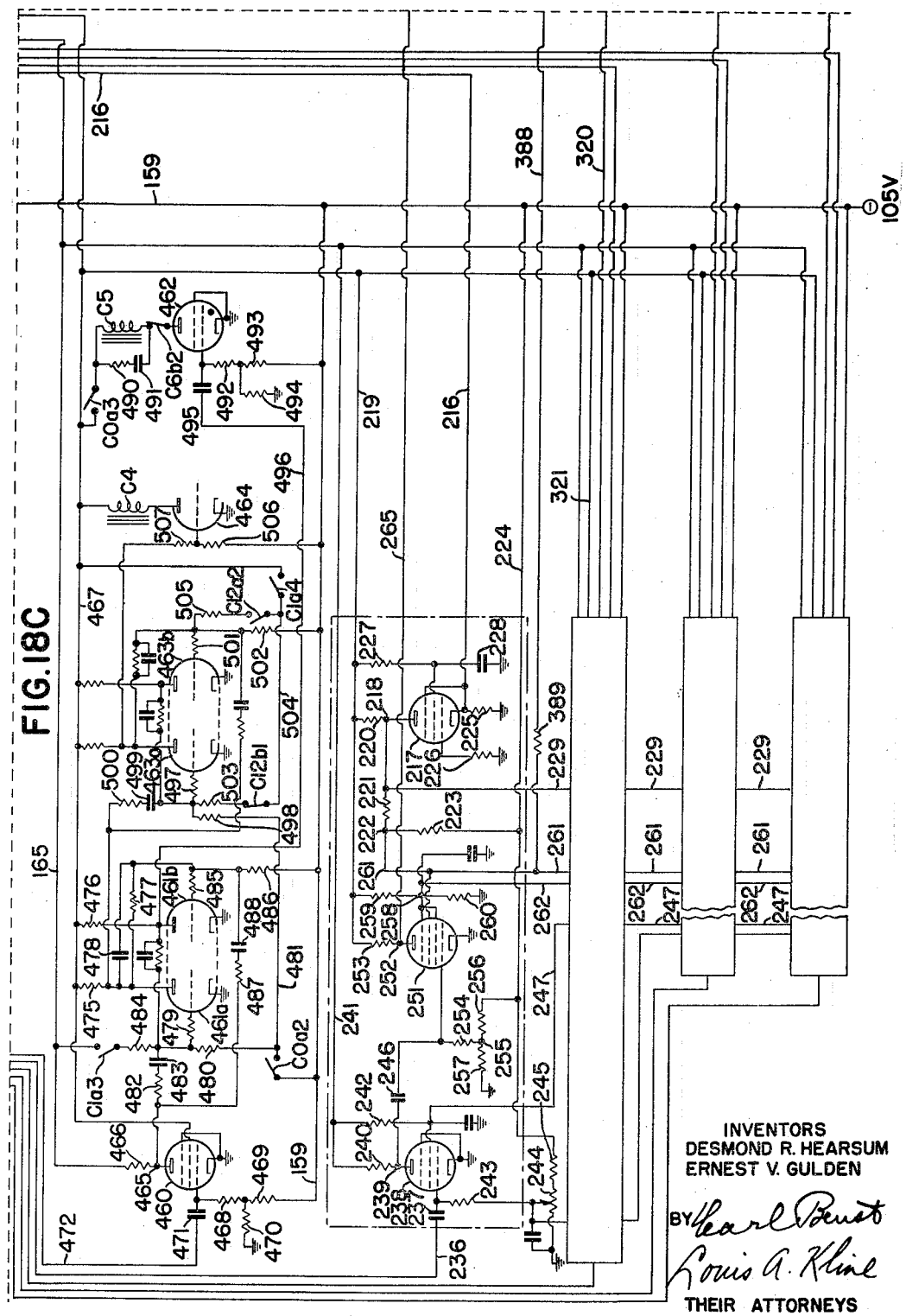

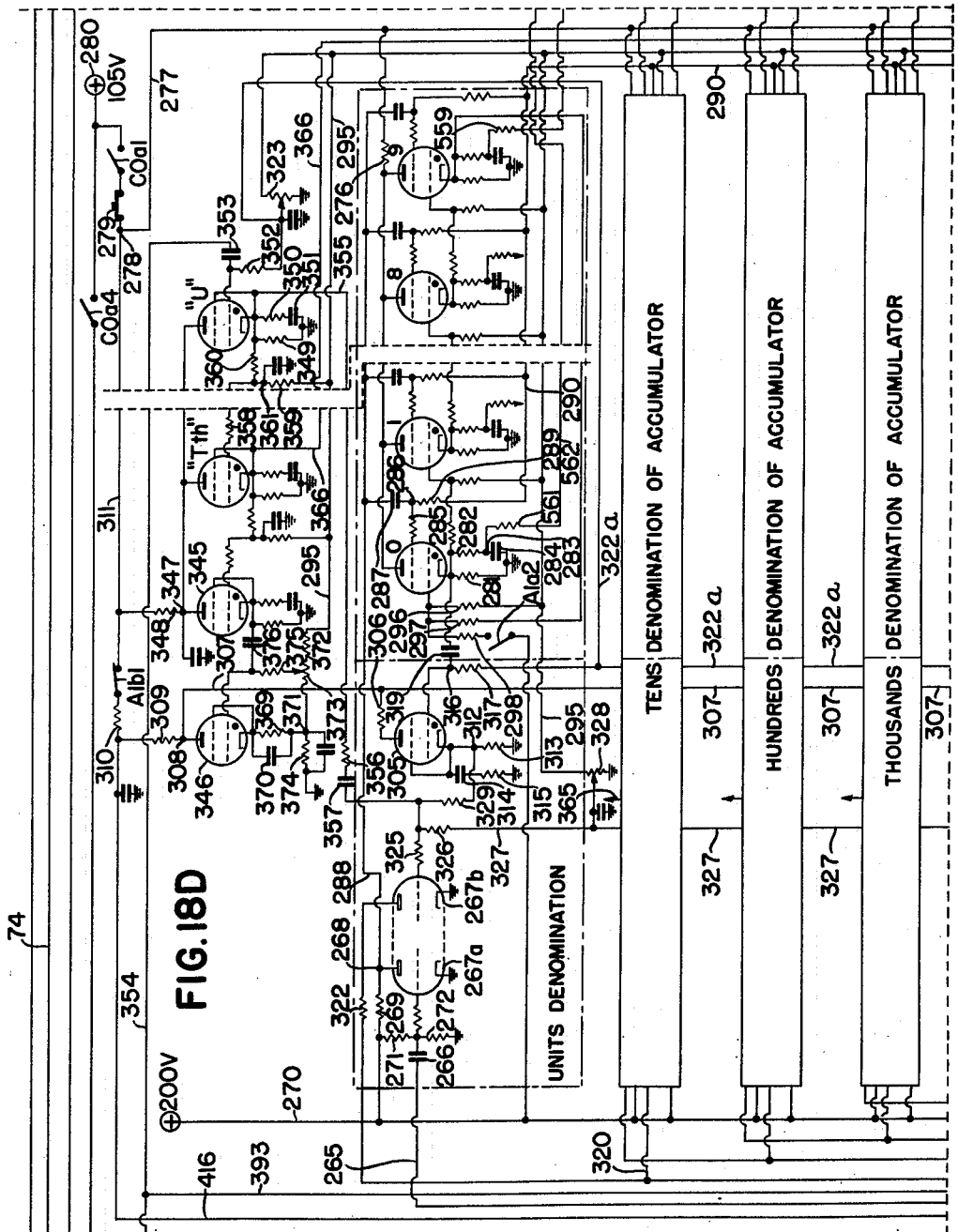

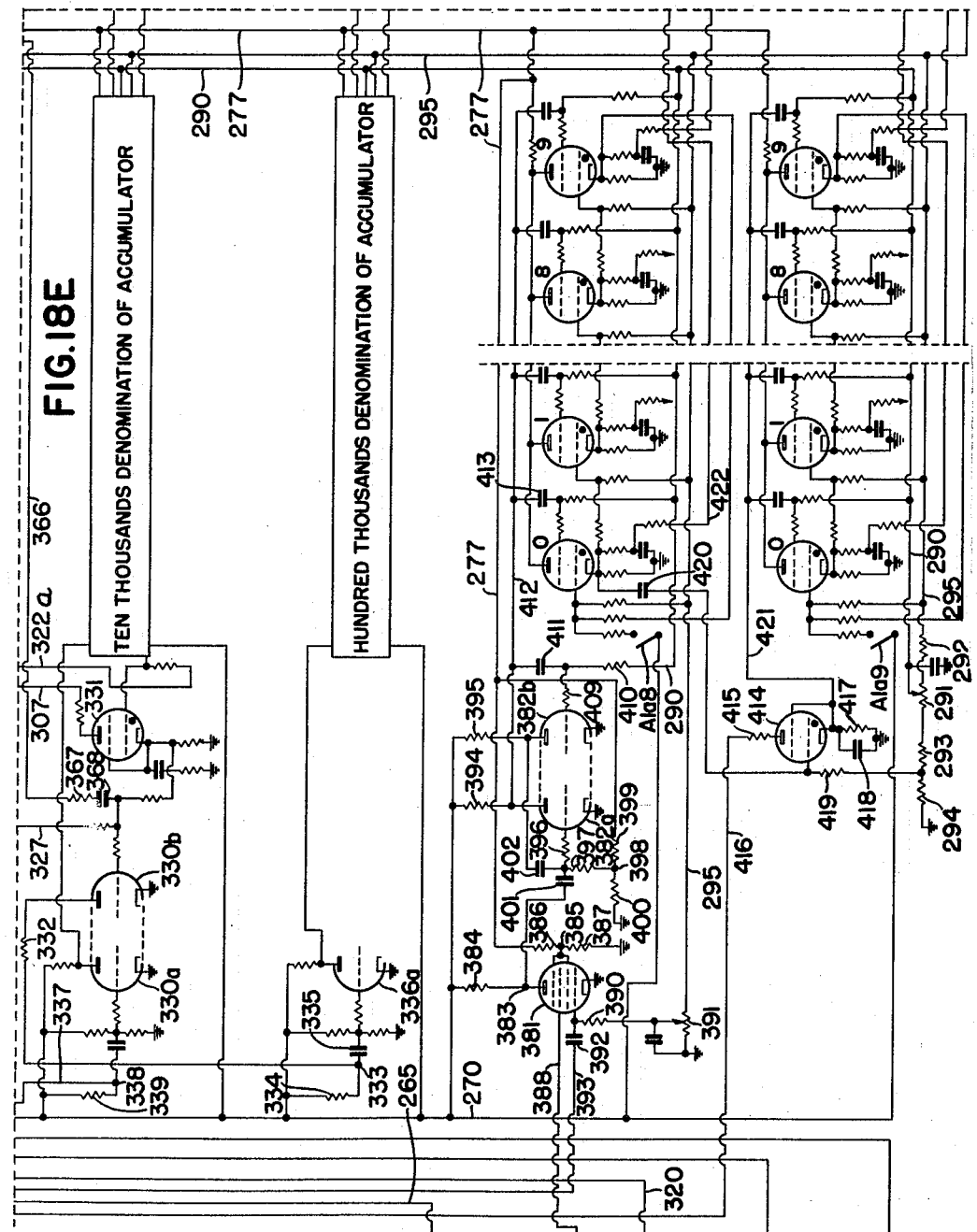

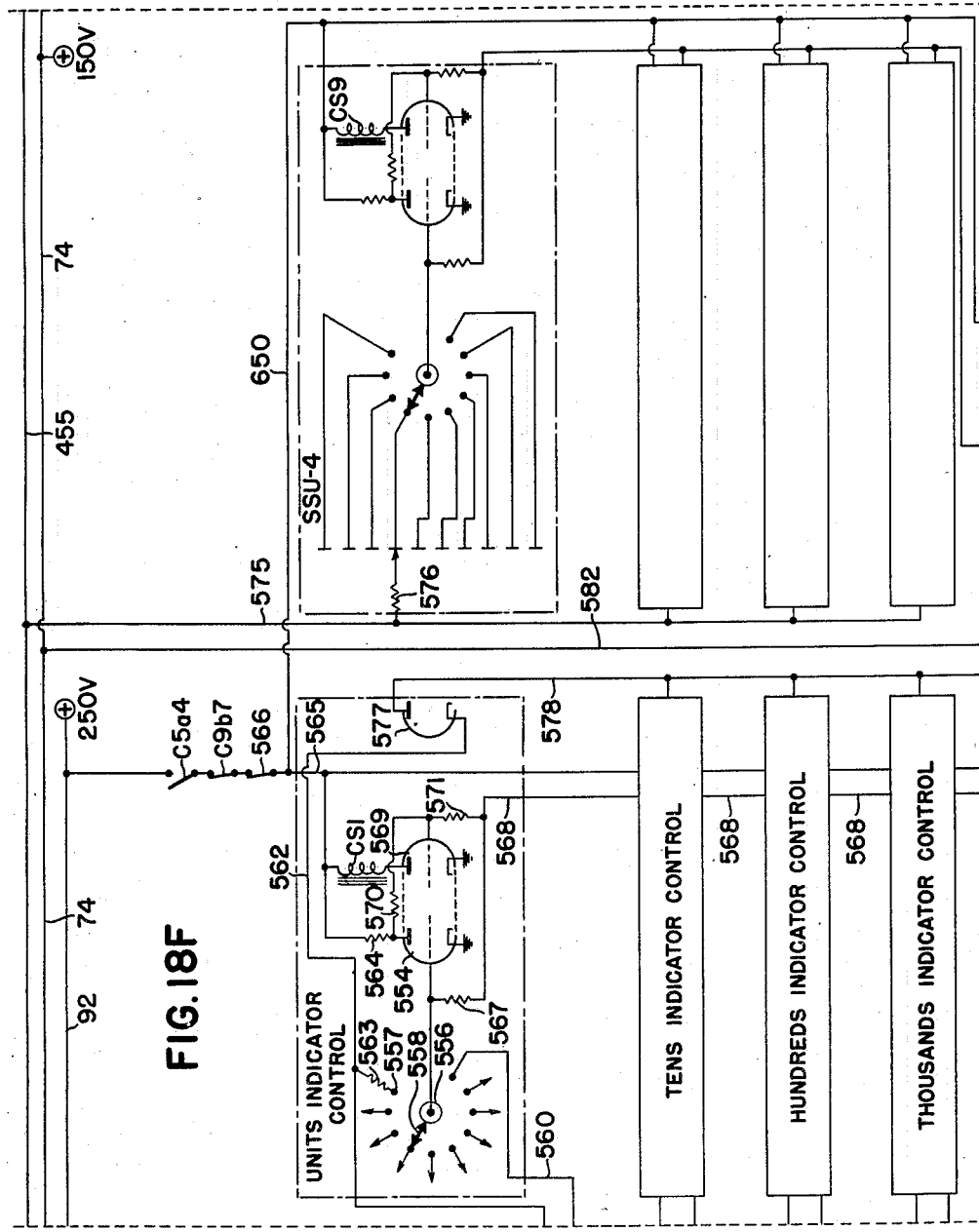

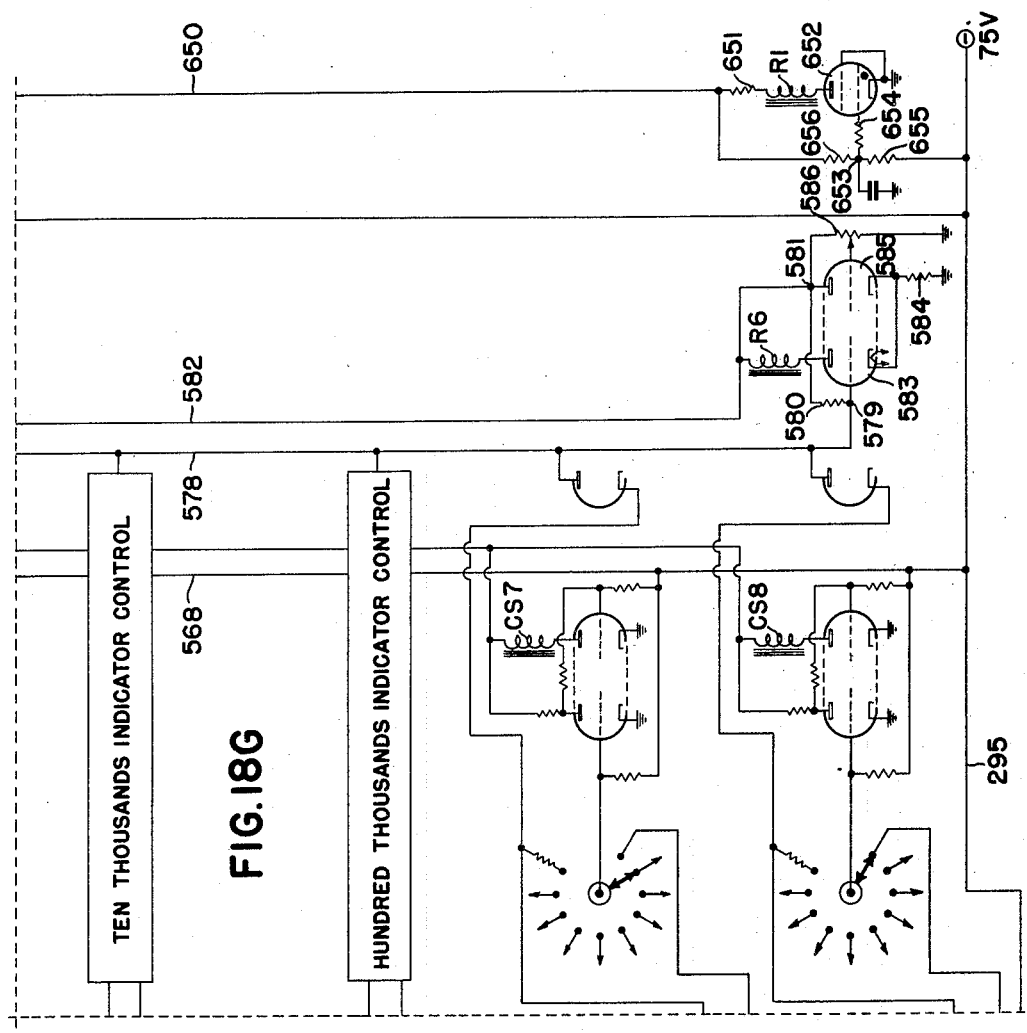

July 5, 1960 — D. R. HEARSUM ET AL — 2,943,788
DATA ANALYZING APPARATUS
Filed April 16, 1953 — 21 Sheets-Sheet 19
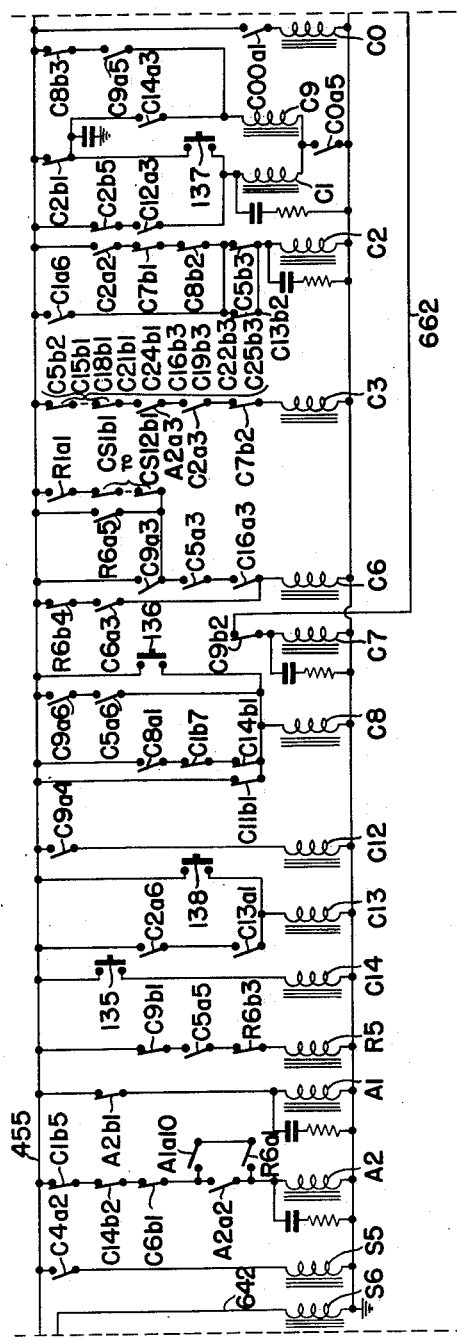
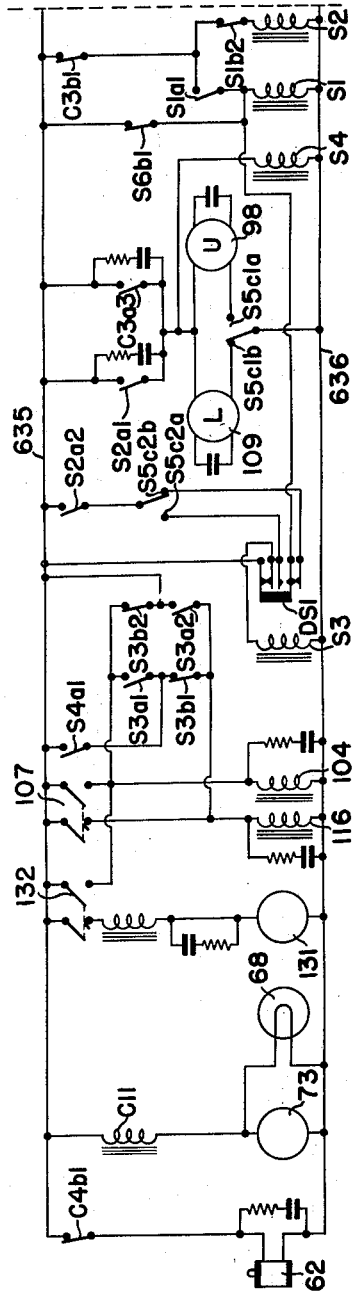
FIG.18H
INVENTORS
DESMOND R. HEARSUM
ERNEST V. GULDEN
THEIR ATTORNEYS July 5, 1960 D. R. HEARSUM ET AL 2,943,788
DATA ANALYZING APPARATUS
Filed April 16, 1953 21 Sheets-Sheet 20

INVENTORS
DESMOND R. HEARSUM
ERNEST V. GULDEN
BY Carl Beust
Louis A. Kline
THEIR ATTORNEYS July 5, 1960 D. R. HEARSUM ET AL 2,943,788
DATA ANALYZING APPARATUS
Filed April 16, 1953 21 Sheets-Sheet 21
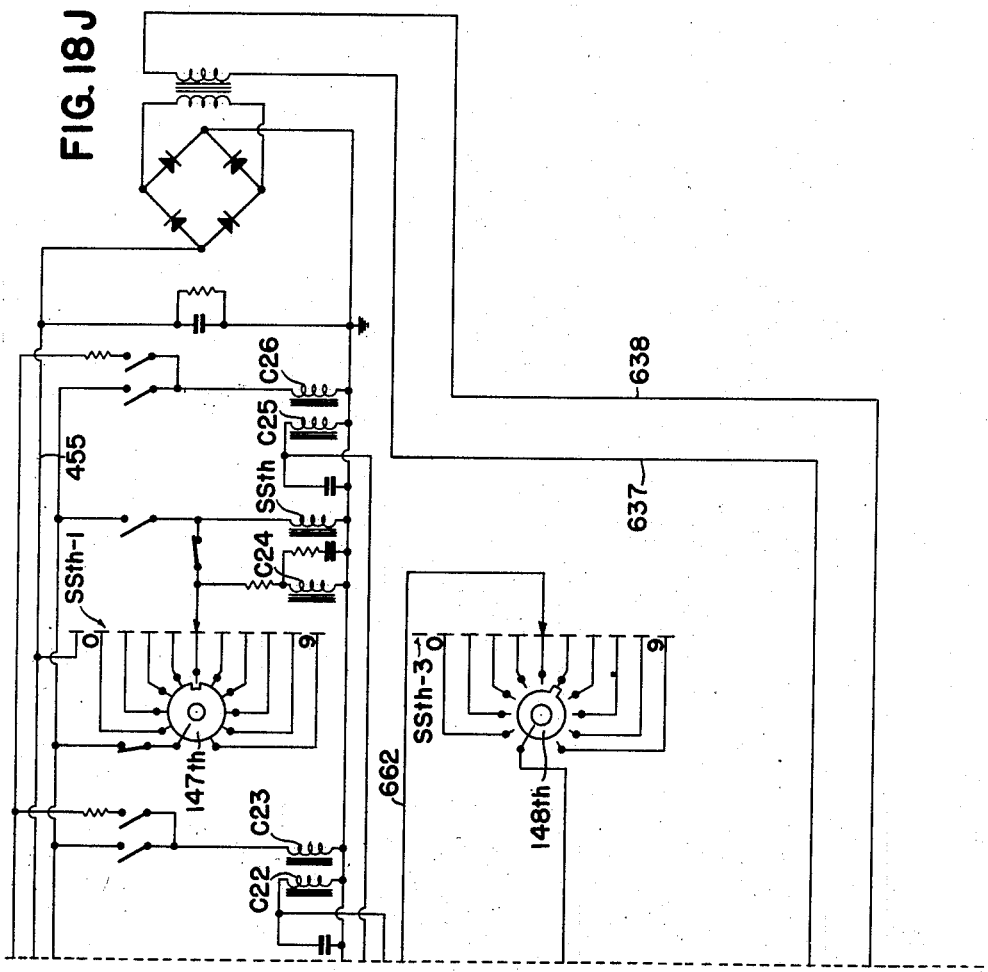
INVENTORS
DESMOND R. HEARSUM
ERNEST V. GULDEN
BY
THEIR ATTORNEYS

# United States Patent Office 2,943,788
Patented July 5, 1960

2,943,788
DATA ANALYZING APPARATUS

Desmond R. Hearsum, Spring Valley, and Ernest V. Gulden, Dayton, Ohio, assignors to The National Cash Register Company, Dayton, Ohio, a corporation of Maryland Filed Apr. 16, 1953, Ser. No. 349,297

42 Claims. (Cl. 235—61.9)

This invention relates to a machine for analyzing classified data recorded on a tape and for producing a summary record of some or all of the data on the tape, as desired, and in particular relates to a machine for performing such analyses at high speeds.

The novel machine is capable of feeding or passing a tape back and forth past a sensing means at high speeds and is capable of sensing the data on the tape while the tape moves in either direction, thereby eliminating idle rewind operations of the tape between sensing operations.

The sensing means senses the tape for classification or code numbers and related amounts and is capable of sensing the code number just prior to the sensing of the related amount. A control member in the sensing means is adjustable according to the direction of the tape feed to enable the code numbers to be sensed just before their related amounts when the tape is being fed or passed in either direction past the sensing means.

Selecting means in the machine compares sensed code numbers for the various entries on the tape against a selected code number set up in the machine and causes all amounts related to the selected code number to be selected and accumulated in a single pass of the tape, the selecting means and the accumulating means being capable of operating at sufficiently high speeds that they can perform their functions while the tape is in continuous motion during a pass in either direction of travel.

The machine is so arranged that it can be controlled to select data related to a single classification or code number in a single pass of the tape, or can be controlled to make a plurality of passes to select data related to each of the code numbers between a starting code number and a stopping code number, which can be preset in the machine. When the selection of data is to be made according to a group of numbers, the selecting means in the machine is initially set to the lowest number of the group, and, at the end of each pass, "one" is added to the code number until the highest number of the group is reached.

A counter is provided to count the number of entries which have been made in the accumulator during a pass of the tape.

At the end of any pass in which data is entered in the accumulator, a summary recorder unit of the machine will be set according to the classification or code number of the pass and according to the amounts in the accumulator and the counter. The next pass is begun as soon as the summary recorder has been set, and the actual recording takes place during the next pass. Since the actual recording of the summary data is a slow operation as compared with the other operations performed by the machine, the overlapping of the recording of summary data for one pass with the analysis in the next pass speeds up the overall operation in making the analysis and the summary record.

It is an object of the invention to provide a tape-analyzing machine for performing analyses at high speeds and for producing summary records of the result of such analyses.

A further object of the invention is to provide a tape-analyzing machine which is asynchronous and is controlled in its automatic operation and in its entering operations by signals derived from the tape, so that variations in the speed of tape feed past the sensing means during an analysis will not adversely affect the operation of the machine.

A further object of the invention is to provide an analyzing machine with sensing means for sensing a tape for classification data and related amount data while the tape is in continuous motion and while the tape is fed in either of two opposite directions past the sensing means.

A further object of the invention is to provide an analyzing machine with a single sensing means for sensing classification or code numbers and related amounts which are located side by side in alinement across a tape, which sensing means will sense the classification or code numbers just before their related amounts and can be controlled to reverse the phase of sensing in order to sense these data in this relation during movement of the tape in either of two opposite directions.

A further object of the invention is to provide an analyzing machine, for analyzing data on a tape, with means for reversing the direction of feed of the tape after all entries on the tape have been sensed in either direction of feed of the tape.

A further object of the invention is to provide an analyzing machine with a selecting means which operates so fast that code numbers which are sensed can be compared with a code number which is preset in the machine and can cause the amounts on the tape which are related to the preset number to be selected and read into the accumulator while the tape is continuously fed past the sensing means.

A further object of the invention is to provide a tape-analyzing machine in which a code number can be preset and which will select and accumulate all amounts on the tape related to this code number in a single continuous pass of the tape past a sensing means.

A further object of the invention is to provide a tape-analyzing machine which can be controlled to make a plurality of passes of the tape past a sensing means to select and accumulate data related to each of the code numbers of a group, the controls being preset to select data corresponding to the lowest code number of the group in the first pass and operable to advance the code number by "one" for each pass and selected data related to that number during the pass, until the highest code number is reached.

A further object of the invention is to provide a selecting means for controlling the selection and accumulation of amounts on a tape, which amounts are related to each of the code numbers of a group, said selecting means being set initially to select, during the first pass of the tape, amounts which are related to the lowest number of the group, and being advanced a value of "one" after each pass of the tape until the amounts related to the highest code number of the group have been selected and accumulated.

A further object of the invention is to provide novel control means to cause the reversal of the direction of the feeding of the tape past the sensing means and to exert other necessary controls to prepare the machine for a further analysis, each time all the data on the tape has been sensed.

A further object of the invention is to provide novel controls for a summary recorder unit of a tape-analyzing machine whereby the summary recorder is set, according to data accumulated during a pass of the tape, while the direction of the tape is being reversed, and the recording of the summary data takes place during the next pass of the tape while a further analysis is being made.

With these and incidental objects in view, the invention includes certain novel features of construction and combinations of parts, a preferred form or embodiment of which is hereinafter described with reference to the drawings which accompany and form a part of this specification.

Of said drawings:

Fig. 1 is a perspective view of the novel analyzing machine.

Fig. 5 is a top plan view of the scanner section.

Fig. 6 shows a fragment of a tape which is used to control the analyzing machine.

Fig. 7 is a partial section through the scanner section along the line 7—7 of Fig. 5.

Fig. 8 is a section through the tape-guiding means at the sensing station.

Fig. 9 is a view showing the shutter of the sensing means in its lower position, which it occupies during a downward pass of the tape.

Fig. 10 is a view showing the shutter of the sensing means in its upper position, which it occupies during an upward pass of the tape.

Fig. 11 is a section through the unit containing the light guides and the photo-cells, taken on the line 11—11 of Fig. 3 and showing in particular the arrangement of the light guides.

Fig. 12 is a section through the scanner section, showing the drive belt arrangement for driving the several shafts of the tape-feeding means.

Figs. 13 and 14 are views of the direction-controlled switch DS–1 and the arm for controlling this switch according to the direction of feed of the tape.

Figure 15A:
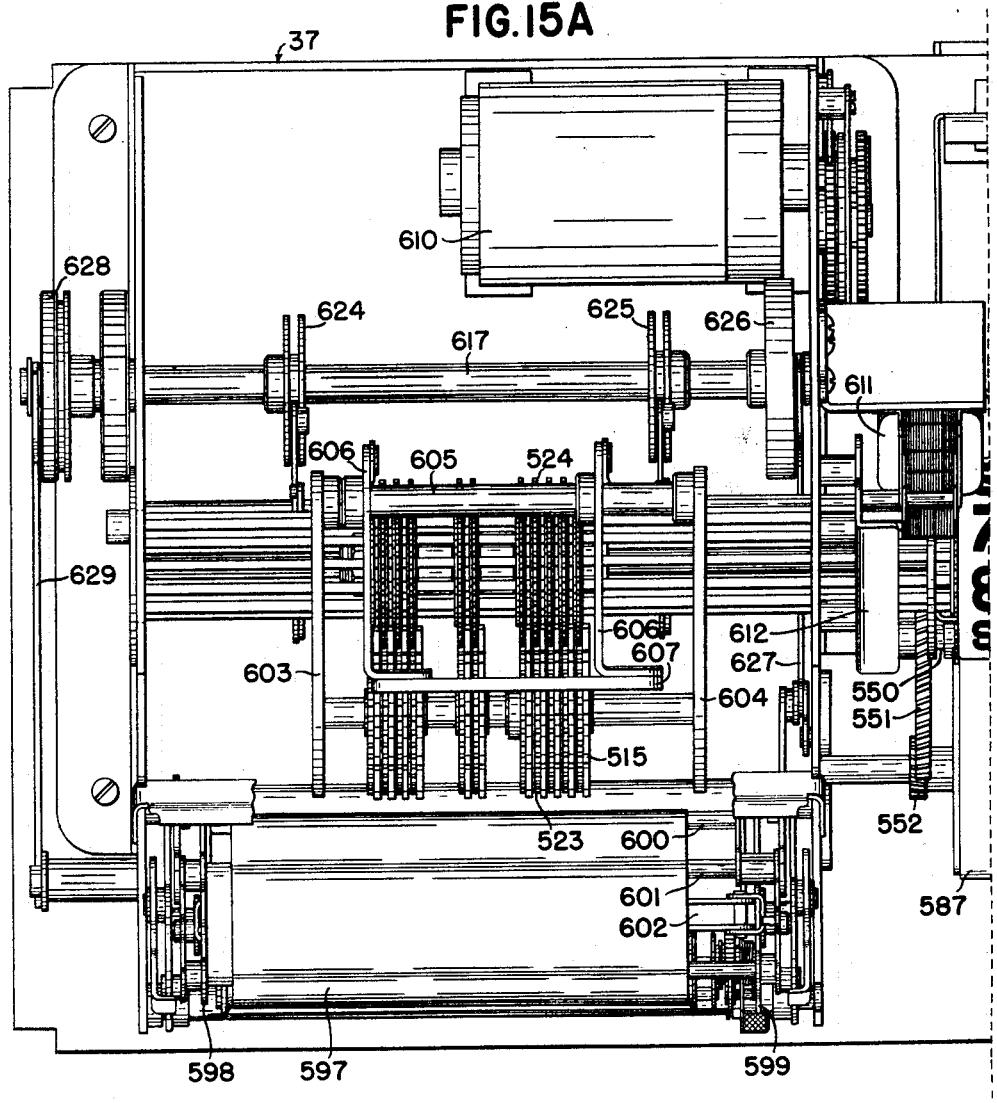

Figs. 15A and 15B together are a top plan view of the summary recorder unit of the machine with its cabinet omitted and certain parts broken away to show the construction of the indicating and printing mechanism more clearly.

Fig. 16 is a vertical section through the indicating mechanism of the summary recorder, showing the driving means and the controls for setting one of the indicator drums and its related type wheel.

Fig. 17 is a section through the summary recorder, showing in particular the right side frame of the printing mechanism and details of the drive for operating the printing mechanism in a printing operation.

Figure 18I:
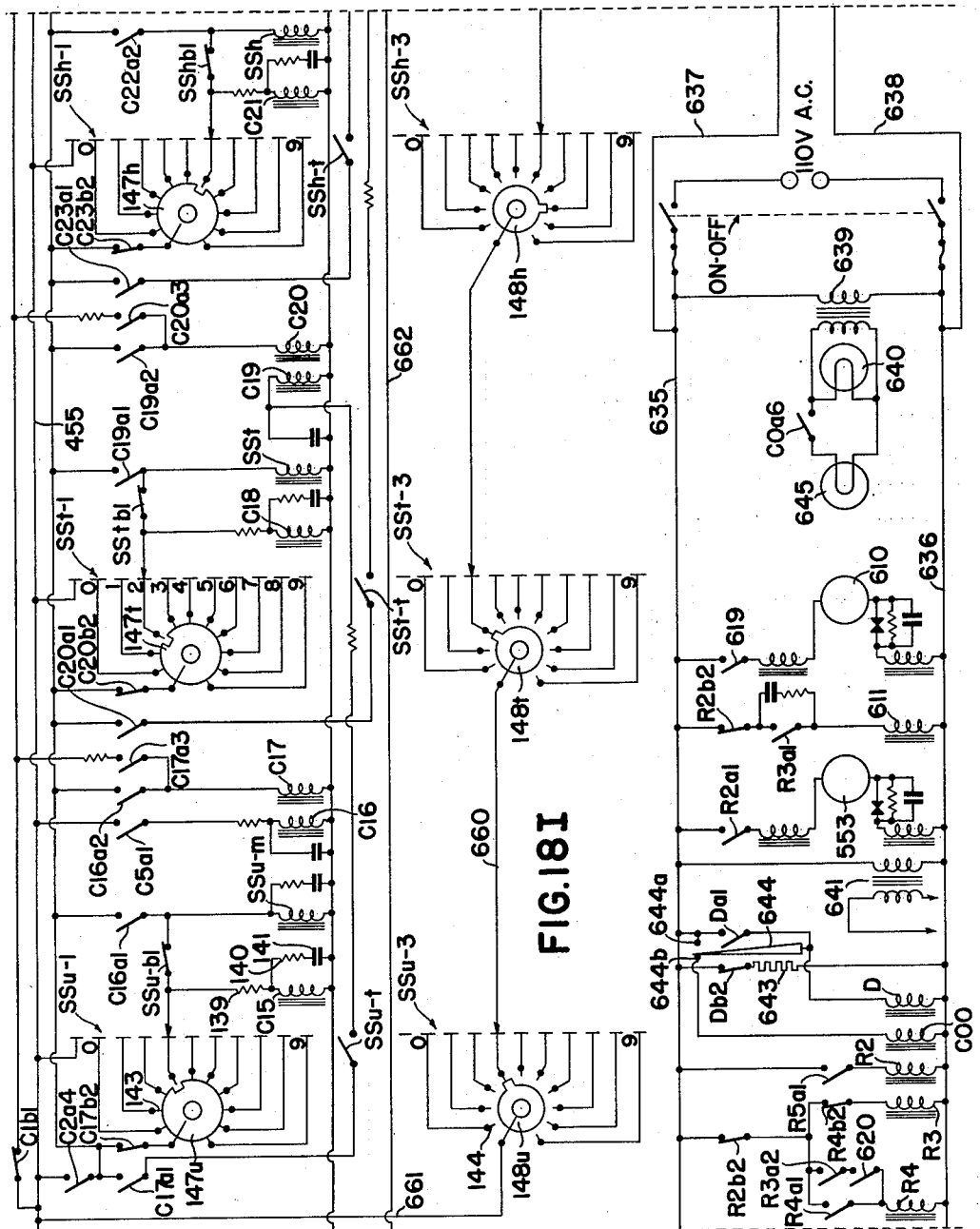

Fig. 18 is a diagram showing how Figs. 18A to 18J are to be joined to form the circuit diagram.

Figs. 18A to 18J, together, show the circuit diagram of the analyzing machine.

GENERAL DESCRIPTION

The novel analyzing machine, which is shown in Fig. 1, consists of two integrated units 25 and 26, which are interconnected by suitable cables for joint operation, the unit 25 containing the scanner section and other components for making the analysis, and the unit 26 containing the summary recorder for recording the results of the analysis and for indicating the last data which were recorded during the various stages of the analysis.

The analyzing machine, because of its great speed, is particularly adapted to be used at a central analyzing station for analyzing tapes produced by a plurality of tape recorders.

Figure 2:
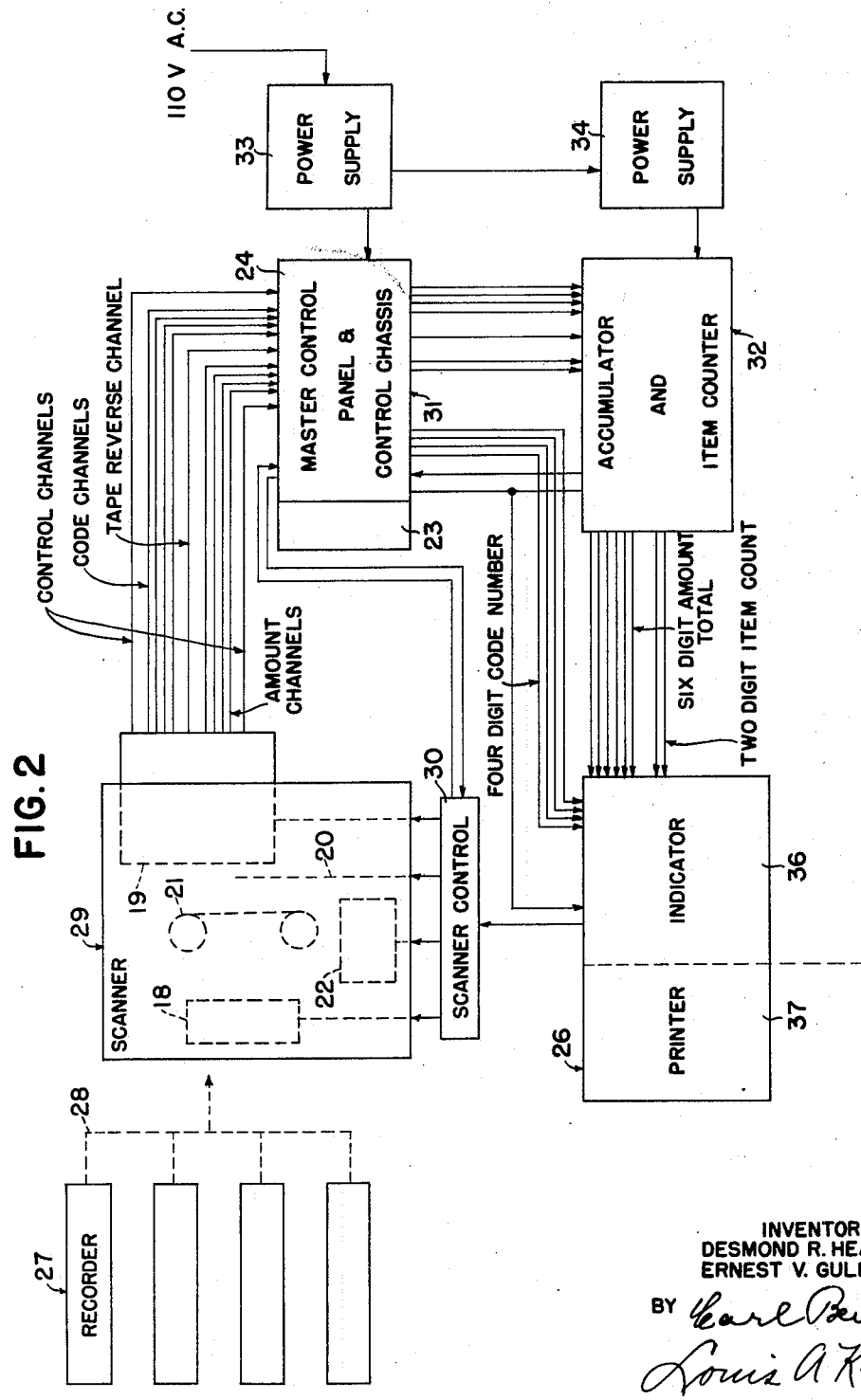
Fig. 2 is a block diagram showing the relation between the analyzing machine and a plurality of tape recorders and also showing the relation between the various components of the analyzing machine.

Fig. 2 is a block diagram showing the relation between the various components of the analyzing machine and the relation between the analyzing machine and the plurality of tape recorders.

The plurality of tape recorders 27, shown at the upper left of Fig. 2 may be cash registers, accounting machines, or adding machines, in which the tapes are produced as an incident to the usual operation of the machines, or may be recorders whose sole function is to prepare the tapes. As the data are recorded on the tape by any of these recorders, the tape is wound on a spool, which can be removed from the recorder and sent to the analyzing machine, as indicated by the dotted line in Fig. 2.

The unit 25 of the analyzing machine includes a scanner section, shown generally at 29 in Fig. 2; a scanner control 30; a master control panel and control chassis 31; an accumulator and counter component 32; and two power supplies—one, 33, for the control chassis 31, and another, 34, for the accumulator and counter component 32.

The scanner section 29 contains the means for reading or sensing the tape and also means for feeding the tape back and forth past the sensing means.

The sensing means which is used in the embodiment described to explain the invention utilizes light from a light source, shown generally at 18, passing through perforations in the tape to control photo-cell pick-up means, shown generally at 19, to produce impulses for entering the data and for controlling certain automatic operations of the machine. While perforated tapes and sensing means utilizing light passing through perforations in the tape are used to control the machine in the disclosed embodiment, it will be obvious that other types of recording, as by magnetic marks or printed marks, may be used, and that suitable means for sensing these types of recordings to produce input impulses also may be used to control the machine without departing from the invention. The sensing means is so arranged and controlled by a shutter, shown generally at 20, that it can sense a classification or code number just before its related amount number in either direction of feed of the tape, which enables the selection to be made just before the related amount is sensed to determine whether or not the amount is to be entered into the accumulator. Pre-amplifiers are included with the photo-cell pick-up means in the portion 19 in the scanner section 29 to provide a preliminary amplification of the impulses produced by the pick-up means before they are sent from the scanner section.

The feeding means for feeding the tape, shown generally at 21, includes two driven reels, one for driving the tape to feed it continuously in one direction during a pass past the sensing means, and the other for driving the tape to feed it continuously in the opposite direction during a pass past the sensing means and a driving means, shown generally at 22. The direction of feed is controlled by manual controls as well as by control perforations on the tape.

The spool of tape which has been prepared on the tape recorder is placed in the scanner section, and the tape is transferred to one of the pair of reels of the tape-feeding means. The free end of the tape which has thus been transferred to one of the reels is guided past the sensing means and secured to the other reel of the feeding means, and the tape is ready to be fed back and forth.

The output from the pick-up means, which is in the form of positive or negative impulses, as required, is sent to the master control panel and control chassis 31.

The master control panel and control chassis 31 includes manual controls, shown generally at 23, and relay controls, shown generally at 24, for controlling certain automatic sequences of operation of the machine and, in addition, contains the selecting means, which can be preset according to the code number to be used during a pass of the tape past the sensing means or can be preset according to a group of code numbers and can compare the sensed code numbers with the preset number or with various numbers of a group in successive passes with such a speed that the selection occurs as soon as the classification or code number is sensed and enables the sensing of the amounts to take place immediately after the code numbers while the tape is in continuous operation in either direction; and also contains gates which are controlled by the selecting means to enable selected amounts which are related to the preset code number, and which are sensed immediately after the code number, to be entered in the accumulator.

The output from the master control panel and control chassis controls the summary recorder unit 26 to set up therein the classification or code number; causes the entry of selected amounts in the accumulator and counter component 32; and controls the scanner section 29 through the scanner control 30.

The accumulator and counter component 32 contains a six-denominational-order electron-tube accumulator, into which amounts on the tape which are related to a selected classification or code number can be entered under control of the selecting means and can be accumulated to provide a total of the amounts related to this classification, and contains a two-denominational-order electron-tube counter, which can count the number of amounts which were related to this classification number and which have been accumulated.

The accumulator and counter component 32 controls the summary recorder unit 26 at the end of a pass of the tape to set up on the recorder the total of amounts which have been accumulated and the number of entries which have been made in the accumulator during that pass. The accumulator and counter component 32 also can control the summary recorder unit and the master control panel to eliminate an operation of the summary recorder if no amounts have been accumulated during a pass.

The power supplies 33 and 34 in the unit 25 provide proper D.C. operating voltages and filament voltages for their respective components of the unit.

The summary recorder unit 26 includes an indicating portion, shown generally at 36, and a printing portion 37, in which indicator drums and type wheels, respectively, can be set under control of the selecting means of the master control panel and control chassis 31 according to the classification or code number which was used to control the selection of amounts in a pass of the tape and can be set under control of the accumulator and counter component 32 according to amounts accumulated therein.

The indicator and type wheel setting operation is initiated under control of means in the control chassis at the end of a pass if any amounts were accumulated during the pass. During the setting operation, the summary recorder controls the tape feed control means to prevent further feeding of the tape past the sensing means, but, as soon as the setting of the indicator wheels and type wheels has been finished, the tape feed is allowed to operate, and the printer portion is put into operation to print this data during the next pass of the tape. This overlapping of the printing of summary data resulting from one pass of the tape and the sensing of data in the next pass of the tape speeds up the operation of the machine to a marked degree.

DETAILED DESCRIPTION

In the following description of the novel machine, the various elements of the machine will be described in detail, and thereafter the coordination and control of these elements in the operation of the machine will be given.

In this description of the preferred embodiment of the invention, certain tube types and certain values of potentials, resistors, and capacitors will be given; but it is to be understood that it is not intended to limit the invention to the embodiment described nor to limit the circuit values and tube types to those specified, because these are merely selected as illustrative. It is obvious that other potentials and/or other similar types of tubes can be used and the circuit values of resistance and capacitance can be adjusted to maintain the proper relation between the various parts of the circuits. Throughout the circuit diagram, the heater elements for the tubes, the heater potential supplies and the connections to the heater elements have been omitted to avoid possible confusion in the circuit diagram.

The tape

The tape 40 (Fig. 6), which is prepared by the tape recorders 27 (Fig. 2) and which is analyzed by the analyzing machine, is made of opaque flexible material which can be perforated to form sharp holes, one such material being high-quality black-and-red duplex calendered paper similar to that used for photographic film backing, another such material being an opaque plastic film.

In order to explain the invention more clearly, a tape having a capacity of eleven channels for data and control perforations will be described. A fragment of a tape including two entries is shown in Fig. 6.

Channels 2, 3, 4, and 5 are assigned to the digit-representing perforations for a four-denominational code number, and channels 7, 8, 9, and 10 are assigned to the digit-representing perforations for a four-denominational related amount. The code number and its related amount, which form a single entry on the tape, are perforated in alinement across the tape. Each of the digits of the code number and the amount is represented by a corresponding number of perforations, which produce a corresponding number of impulses when the tape is sensed. By this use of the corresponding number of perforations to represent a digit, the tape can be sensed in either an upward pass or a downward pass of the tape past the sensing means and can control the machine properly in either direction of travel of the tape.

Channels 1 and 11 contain control perforations which are effective, after each entry on the tape has been sensed, to cause the code number storage chains in the control chassis 31 to be reset and also cause an operation of the tens transfer means of the accumulator to be initiated. A perforation is provided in each of these channels for each entry, and the perforations are located diagonally across the tape closely adjacent the field in which the digit-representing perforations may be made. The perforations in channel 1 are effective to cause reset operations and tens transfer operations during a downward pass of the tape, and the perforations in channel 11 are effective to cause similar operations during an upward pass of the tape, as will be explained more fully hereinafter.

Each code number and related amount, together with a control perforation in each of the channels 1 and 11, constitute an entry or a frame of information to be analyzed, as indicated at 41 in Fig. 6. The adjacent frames are separated by spaces about the length of the frame, as indicated at 42 in Fig. 6.

It has been found that perforations about twenty thousandths of an inch in diameter will give adequate signals and that, when perforations of this size are used, a frame 41 of data plus a space 42 between frames requires about .92 inch of length along the tape.

In addition to the entries thereon, each tape is provided with leaders, as 43 and 44, which extend beyond the last entry at either end of the tape a distance sufficient to allow for the reversal of the direction of feed of the tape without feeding the tape completely from the reels.

Each leader is perforated in channel 6 adjacent the last entry on the tape with a larger perforation, as 45, for initiating a reversal of the direction of tape feed.

Since the code number is punched in channels 2, 3, 4, and 5 on the tape and the amount is punched in channels 7, 8, 9, and 10, and these channels occupy similar positions on either side of the center of the tape, it is important that the tape be placed in the analyzing machine in proper relation to the sensing means, so that the sensing means in channels 2 to 5 will sense the code numbers and the sensing means in channels 7 to 10 will sense the amount numbers. In order to assist in locating the tape in the analyzing machine, the spool on which the punched tape is wound in the tape recorder is provided with suitable indication on one end, which indication can be matched with suitable indications on the reels of the analyzing machine, if desired, to insure that the tape is properly related to the sensing means.

*The sensing means*

The sensing means, which is provided to sense the data and control perforations on the tape 40 and to control the apparatus according to the sensed data, is included in the scanner section 29 of the unit 25 and is shown most clearly in Figs. 1, 3, 4, 5, 7, 8, 9, 10, and 11.

In general, the sensing means includes a source of light, from which the light is directed through slots at a sensing station where it can pass through perforations in the tape and can shine on light guides, which direct the light to photo-cells of the pick-up means. The light, which passes through the perforations in the tape and is guided to the photo-cells of the pick-up means, causes electrical output impulses to be sent from the cells.

The sensing means is supported on a scanner section base plate 46 and on front and rear vertical supporting plates 47 and 48, secured to the base plate in proper spaced relation.

The tape 40 is fed between a pair of guide plates 51 and 52 at the sensing station (Figs. 7 and 8), which plates are mounted on the front vertical supporting plate 47 and are provided with upper alined slots 53 and lower alined slots 54, which extend across the width of the tape and are spaced apart approximately the length of a frame. Due to the manner in which the tape is fed, there will be a tendency for the tape to ride against the guide plate 51 in its passing upwardly and downwardly past the sensing means, so, in order to minimize friction and to prevent bits of paper or other foreign matter from clogging the slots 53 and 54 in the plate 51, a piece of transparent material 55 (Fig. 8) is provided to cover the plate 51 and the slots 53 and 54 therein along the path of travel of the tape.

Mounted on the guide plate 52 for movement relative thereto to an upper position and a lower position is a shutter 60, which is provided with slots so arranged as to coincide with portions of the slots 53 and 54 in the guide plates to control which portions of the slots 53 and 54 will be effective in the sensing of the tape and thereby control the phasing of the sensing of the code numbers and the amounts.

The shutter 60 is normally urged upwardly by a spring 61 (Figs. 3 and 4) to engage a stop on a bracket 59, secured to plate 47, and is connected at its lower end to the armature of a shutter-operating solenoid 62, which will be energized during any downward pass of the tape to shift the shutter to its lower position, so that data will be sensed in proper phase or sequence.

Fig. 9 shows the shutter 60 in its lower position, the position which it occupies during a downward pass of the tape past the sensing means. In this position of the shutter, the horizontal portion of an L-shaped slot 63 in the shutter 60 coincides with the upper slots 53 in the guide plates 51 and 52 to enable code numbers to be sensed first during the downward pass of the tape. Slots 64 and 65 in the shutter 60 in this position coincide with the lower slots 54 in the guide plates 51 and 52, the slot 64 enabling the amount to be sensed immediately after the code number in the downward pass of the tape and the slot 65 enabling the control perforation in channel 1 to be sensed immediately after the amount in the downward pass of the tape. The extreme left end of the slot 63 extends across channel 6 and is effective to sense the reverse control perforations 45 at either end of the tape during the downward pass of the tape.

Fig. 10 shows the shutter 60 in its upper position, the position which it occupies during an upward pass of the tape past the sensing means. With the shutter 60 in this position, slot 66 therein coincides with lower slots 54 in the guide plates 51 and 52 to enable the code number to be read first in the upward pass of the tape, and slot 67 coincides with the upper slots 53 in the guide plates 51 and 52 to enable the amount to be read immediately after the code number, and also to enable the control perforation in channel 11 to be read after the amount in the upward pass of the tape. The lower end of the vertical portion of the L-shaped slot 63 coincides with the slot 53 to enable both reverse control perforations 45 to be sensed during the upward pass of the tape.

Accordingly, it is seen that the shutter 60 controls the single sensing means in phasing the sensing of data on the tape, so that, in either direction of feed of the tape, the code number will be sensed first, the amount will be sensed immediately thereafter, and finally the control perforation, which resets the code number chain and initiates the operation of the tens transfer means, will be sensed.

It is to be noted that the slots 53 and 54 in the guide plates 51 and 52 are so spaced that, approximately one pulse time after the code number perforations pass the effective portion of the slots in the guide plates and the shutter, the amount perforations are presented to their appropriate effective slots in the guide plates and the shutter. The selecting means, which is controlled by the code number sensing means, operates so rapidly that the decision, whether or not an amount related to a particular code number is to be entered into the accumulator, is made after the sensing of the code number and before the sensing of the related amount and while the tape is continuously in motion past the sensing means.

Light from a suitable lamp 68 (Figs. 4 and 7), which is mounted in a housing 69 supported on the base 46, is directed by a pair of lenses 70 through an enclosure 71 and thence through the slots 53 and 54, as determined by the shutter 60. A suitable blower 72, which is driven by a motor 73 (Figs. 4 and 18H) whenever the lamp is lighted, assists in dissipating heat from the lamp.

The light which is directed through the slots in the guide plates and the shutter will pass through the perforations in the tape and will reach a group of light guides 75–1 to 75–11 (Figs. 7 and 11), which form a part of the pick-up means and are made of Lucite or other similar light-transmitting material. The light guides 75–1 to 75–11 extend from a point closely adjacent the shutter to the photo-cells 76 and enable light passing through the perforations in the corresponding channels in the tape to cause electrical output impulses to be sent from the photo-cells 76–1 to 76–11 (Figs. 11 and 18A).

The light guides 75–1 to 75–11 and the photo-cells 76–1 to 76–11 and related preamplifiers 77–1 to 77–11 (Figs. 7 and 18A) for amplifying the output signals from the photo-cells, together with their related circuit elements, are mounted in a pick-up unit 78. The arrangement of the light guides and photo-cells is shown particularly in Figs. 7 and 11. The pick-up unit is mounted on a bracket which is secured on the plate 47 and is adjustable thereon, so that the eleven light guides 75–1 to 75–11 are located properly in relation to the shutter and opposite the eleven channels on the tape, each light guide being suitably shielded to prevent loss of light and to keep out extraneous light and being of a height to span the slots 53 and 54, so that light through either slot can be transmitted to the photo-cells. The light guides extend from the shutter 60 through openings in shields, as 79–7, which surround the photo-cells, as 76–7, to a point closely adjacent the photo-cells and enable the maximum impulses to be obtained from the light passing through the perforations in the tape.

The photo-cells 76–1 to 76–11 and their shields and associated circuits of the pick-up means require more space than that allotted to the several channels on the tape, so, as shown most clearly in Fig. 11, the photo-cells 76–1 to 76–11 are suitably spaced in the pick-up unit 78, and the light guides 75–1 to 75–11 are bent to extend thereto from the points opposite the eleven channels on the tape.

The photo-cells and preamplifiers and their related circuits are shown in Fig. 18A.

The operating circuits for the photo-cells and preamplifiers connect these elements into three groups, one containing the cells and preamplifiers for channels 1 to 3, another for channels 4 to 7, and the third for channels 8 to 11.

Any suitable type of photo-cell may be used. In the preferred embodiment of the invention, which is being described, lend sulphide photo-conductive type cells, which are sold by the Continental Electric Company, of Geneva, Illinois, as type CE–702A, are used. In this type of photo-cell, the resistivity of the cell decreases as light shines thereon.

Each photo-cell is supplied with about +90 volts across the cell and a 1-megohm load, as 66, in series, the load being supplied to the appropriate side of the photo-cell to obtain the required positive or negative output impulses. The potential supply for each group is obtained from a tap on a 50,000-ohm potentiometer, as 67, which is connected between the +150-volt conductor 74 and ground, the tap also being connected to ground over a capacitor of .25 microfarad.

By using potentiometers in the potential supplies for the several groups, the operating potential for each group can be adjusted to compensate for variation in the light intensity, so that the output signals from channels 1 to 3 and 8 to 11 can be made substantially the same as those from channels 4 to 7.

In the case of channels 1 to 6 and 11, which are the control and code number channels, the load resistor is connected between the cell and the +90-volt conductor and will produce a negative voltage impulse each time a perforation is sensed. In channels 7 to 10, which are the amount channels, the load resistor is connected between the cell and ground and will produce a positive voltage impulse each time a perforation is sensed. The output from any of these circuits is derived from a point between the cell and the load resistor and will be in the form of positive or negative impulses, as noted above, of about .3 volt, which are used to drive the preamplifiers.

The preamplifiers 77–1 to 77–11 are 6AU6 tubes operating as Class A amplifiers. Each tube has its anode connected over a separate load resistor of 470,000 ohms, as 91, to a +250-volt conductor 92; has its suppressor grid and cathode grounded; and has its control grid connected to ground over a resistor, as 93, of 3.3 megohms, which, due to conduction in the tube, automatically supplies the control grid with about a —.9-volt bias. The screen grids of the tubes of each group are connected together and over a resistor, as 94, of 250,000 ohms, to the +150-volt conductor 74 and to ground over a capacitor of 8 microfarads, which circuits, due to conduction in the tubes of the group, will cause the screen grids to have a potential of about +25 volts. These circuit values and operating conditions will enable about a 250:1 gain to be derived from the tubes, so that output impulses of the order of about 75 volts will be obtained from the .3-volt input impulses from the photo-cells, which are applied to the control grids over capacitors, as 105, of .01 microfarad.

Since negative impulses are produced by the photo-cells for channels 1–6 and 11, the output impulses from the preamplifiers for these channels will be positive. Similarly, the output impulses from the preamplifiers for channels 7 to 10, which are supplied with positive impulses from the photo-cells, will be negative. These positive and negative impulses will be used to control the other parts of the machine, as will be explained more fully hereinafter.

RC filters, as resistor 106, of 2,200 ohms, and capacitor 106a, of 8 microfarads, and resistor 107, of 2,200 ohms, and capacitor 107a, of 8 microfarads, are provided for the +150-volt conductor 74 and the +250-volt conductor 92, respectively, to minimize transient pick-up in the circuit.

Suitable electrical connections extend to the unit from other components of the machine, and coaxial cables (not shown in Figs. 3, 4, 5, or 7) extend from the preamplifiers to other components of the machine to enable the sensed data to be used to control the various components, as will be explained more fully hereinafter.

Tape handling and feeding means

The means for feeding the tape back and forth past the sensing means are also mounted in the scanner section 29 of unit 25 and are shown in Figs. 1, 3, 4, 5, 7, 12, 13, and 14.

Access to the tape handling and feeding means can be had through a sliding door 39 in the front of the cabinet enclosing the unit 25.

The feeding means includes an upper reel 80 and a lower reel 81, which can be driven individually in opposite directions and which are mounted in vertical alinement. The tape 40, which is being sensed, is fed back and forth between the reels, being wound first on one reel and then on the other as successive passes of the tape are made past the sensing means. Intermediate the reels, the tape is guided over guide rollers 85 and 86 and between the guide plates 51 and 52 at the sensing station.

The guide rollers 85 and 86 are freely rotatable on shafts 87 and 88, respectively, which have one of their ends mounted in the front plate 47 and have the other of their ends mounted in an additional supporting plate 83, which is secured by screws to studs 89 and 90 secured in the front plate 47.

The reel 80 is secured on a drive shaft 82, which is journaled in the front and rear plates 47 and 48 and has its front end supported by a bearing in the additional supporting plate 83, the reel being mounted between the front plate 47 and the additional plate. The drive shaft 82 has secured thereon a drive pulley 95 (Figs. 5 and 12), which is connected by a belt 96 to a pulley 97 on an upper drive motor 98, which drives the shaft 82 and the reel 80 thereon clockwise (Figs. 3 and 12) to pull the tape upwardly.

Figure 4:
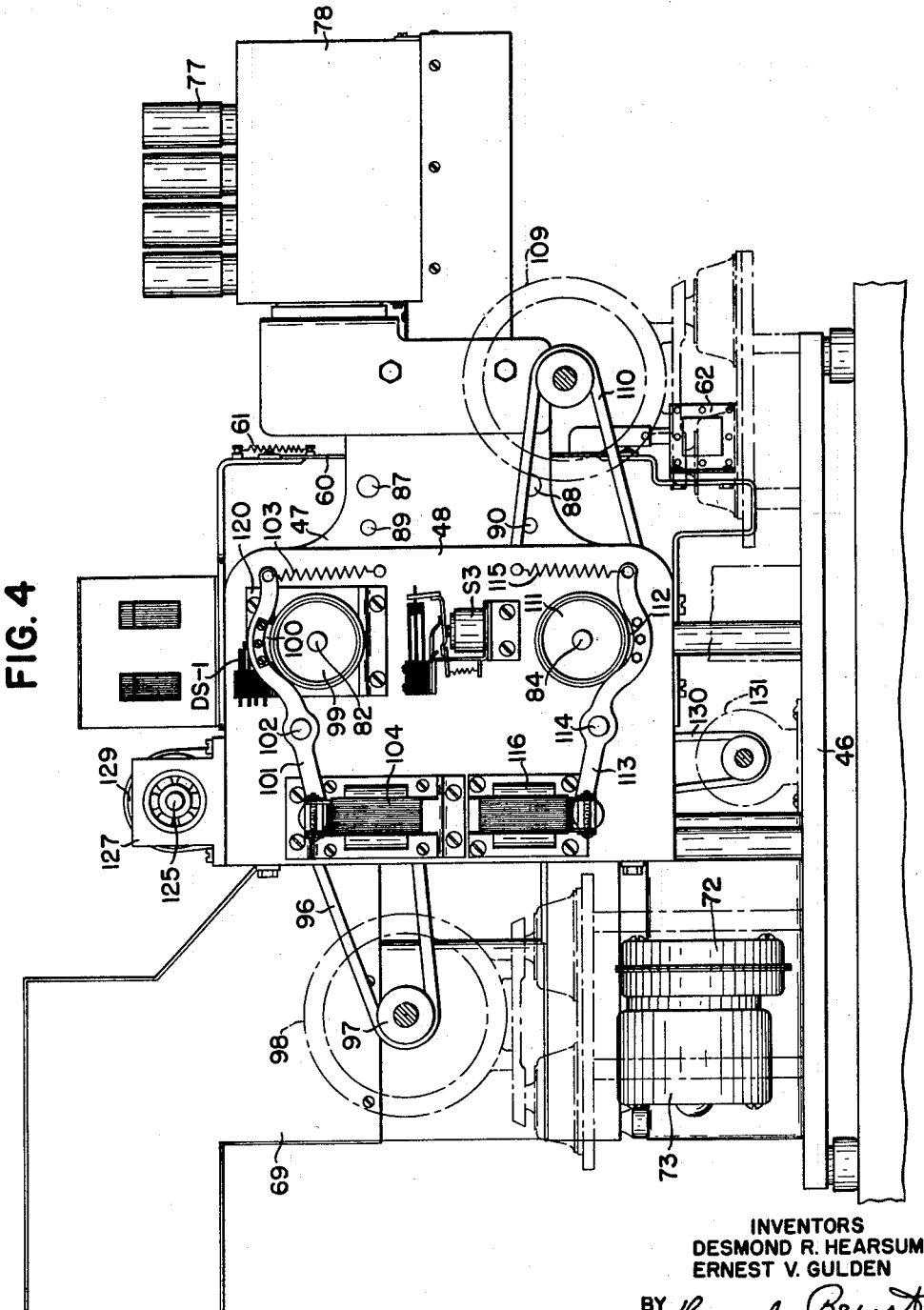
Fig. 4 is a rear elevation view of the scanner section with certain wiring omitted in order not to obscure details of construction.

The rear end of the shaft 82 is provided with a brake drum 99 (Figs. 4 and 5), with which a cooperating brake shoe 100 can engage to arrest movement of the shaft. As shown in Figs. 4 and 5, the brake shoe 100 is mounted on a lever 101 pivoted on a stud 102 extending from the plate 48. A spring 103, tensioned between one end of the lever 101 and a stud on the plate 48, urges the brake shoe 100 normally into braking engagement with the drum 99. A brake solenoid 104 has its armature connected to the other end of the lever 101 and, when energized, will force the brake shoe from engagement with the drum to free the shaft.

Similarly, the lower reel 81 is secured to a drive shaft 84, which is journaled in the front, rear, and additional plates and has a drive pulley 108 secured thereto. The drive shaft 82 is driven counter-clockwise (Figs. 3 and 12) by a lower drive motor 109 by means of a belt 110, which cooperates with the drive pulley 108. The lower reel 81 is effective to pull the tape 40 downwardly past the sensing means.

The lower shaft 84 also has secured thereto a brake drum 111, with which a brake shoe 112 cooperates to arrest the movement of the shaft 84. The brake shoe 112 is carried by a lever 113 pivoted on a stud 114, which extends from the plate 48. The brake shoe 112 is normally urged into engagement with the drum 111 by a spring 115, connected between one end of the lever 113 and a stud on the plate 48. The brake shoe can be moved to disengaging position upon energization of a brake solenoid 116, which has its armature connected to the other end of the lever 113.

The upper and lower tape feed driving motors 98 and 109 are of the capacitor start-and-run type and have high starting torque and constant speed when in operation. As will be explained more fully during the description of the turn-around operations in which the direction of the tape feed is reversed, the trailing motor is used to assist the brakes in stopping the tape to enable its direction of feed to be reversed.

The drive of the tape feeding means by the motors 98 and 109 is such that the tape is driven at a mean speed of approximately ten feet per second. Since the control of the machine by the sensed data is asynchronous, and since the sensing means is capable of sensing data at higher tape speeds than the mean speed, variations in the tape speed of as much as plus or minus twenty percent from the mean speed can be tolerated without causing errors in the entry of data into the machine.

A direction-controlled switch DS-1 (Figs. 4, 5, 13, and 14) is mounted on a bracket 117, adjustably mounted on a mounting plate 118 secured to the back of plate 48, and is controlled in its operation by a lever 119, of nonconducting material, loosely mounted on the shaft 82 by means of a metal bushing 120. The lever 119 is frictionally driven by the shaft 82, being urged by a spring 121 into frictional engagement with a collar 122 on the brake drum 99, which is secured to the shaft. When the shaft 82 rotates clockwise, as shown in Fig. 13, during a downward pass of the tape, the lever 119 will be driven, through the frictional coupling, out of engagement with the switch and into engagement with a stop stud 123, projecting from the back of the bracket 117. When the shaft 82 rotates counter-clockwise, as shown in Fig. 13, the lever 121 also will be driven counter-clockwise, through the frictional coupling, into engagement with a stop stud 124, projecting from the back of the bracket, and in this position the lever will engage the switch DS-1 and displace the switch. The switch DS-1 controls the application of the brakes and the operation of the driving motors during a turn-around or reversal of direction of feed of the tape.

A relay S3 (Figs. 4 and 18H) is mounted on the rear plate 48 and is energized under control of the direction-controlled switch DS-1. The relay S3 will be energized whenever the tape is being fed downwardly and has set the switch DS-1 accordingly. Relay S3 controls the energizing circuits to the brake release solenoids 104 and 116 to enable both solenoids to be energized whenever either motor is driving the tape and to enable braking to be applied to the proper one of the shafts during a turn-around operation.

With the direction-controlled switch DS-1 set for a downward pass, relay S3 will be energized and will open contacts S3b1 and S3b2 and close contacts S3a1 and S3a2. With the contacts of relay S3 in this condition, one circuit will be completed from A.C. conductor 635 over contacts S3a2 and the winding of solenoid 116 to the other side of the A.C. source, over conductor 636, and will cause the lower brake to be released; and another circuit will be prepared, extending from conductor 635 over contacts S4a1 and S3a1 and the winding of solenoid 104 to the conductor 636. This latter circuit will be completed by the closing of contacts S4a1 whenever power is applied to the tape feed motors and causes relay S4 to be energized and will insure that the trailing brake will be released when the tape is being fed. Accordingly, the trailing brake—that for the upper shaft 82—will be applied whenever and as soon as power is removed from the tape feeding motors during a turn-around operation. This will help stop the downward feed of the tape and also will maintain tension in the tape during this operation.

When, however, the direction-controlled switch DS-1 is set for an upward pass of the tape, relay S3 is de-energized, opening contacts S3a1 and S3a2 and closing contacts S3b1 and S3b2. The circuits to the brake release solenoids will now extend over the contacts S3b1 and S3b2, the one extending from conductor 635 over contacts S3b2 and the winding of solenoid 104 to conductor 636 to maintain the upper brake released, and the other extending from conductor 635 over contacts S4a1 and S3b1 and the winding of solenoid 116 to conductor 636 to cause the lower or trailing brake to be applied as soon as power is removed from the tape feeding motors.

A manually-operated "Brake Release" switch 107, carried by a bracket at the top of front plate 47 (Fig. 3), can be operated to close circuits to both brake release solenoids whenever it is desired to release both brakes while the tape-driving motors are not operating.

An auxiliary motor-driven shaft 125 (Figs. 3, 4, 5, and 12) is provided in order to assist in placing tapes in the apparatus and removing them therefrom. The auxiliary shaft 125 is mounted in bearings 126 and 127, which are secured to the front and rear plates 47 and 48, respectively. The shaft 125 extends forwardly of the front plate 47 and is provided with a shoulder to locate a spool, which has been taken from the tape recorders, in alinement with the reel 80. A locking clip 128 is provided near the end of the shaft to hold the spool in place thereon. The shaft 125 has a drive pulley 129 secured thereto and is connected by a belt 130 to a rewind motor 131, mounted on the base 46. The rewind motor 131 is capable of driving the shaft 125 and the spool thereon counter-clockwise (Fig. 3) to enable the tape to be rewound on the spool when the tape is to be removed from the analyzing machine.

The manner in which the tape handling and feeding means operates is as follows.

When a tape is to be introduced into the analyzing machine, the spool containing the tape, which has been punched in the recorder, is placed on the shaft 125, with the proper end of the spool toward the front of the apparatus and with the free end extending from beneath the spool toward the reel, so that the code number and amount perforations will be in proper relationship to their sensing means. The free end of the tape is secured to the upper reel 80 by pressure-sensitive adhesive or other suitable means, and a Manual Run key 135 (Fig. 1) is operated. The operation of this key, through circuits to be described later, causes the upper reel 80 to be driven clockwise (Fig. 3) by its drive motor 98 to transfer the tape to the reel. After the tape has been wound on the reel 80, the Emergency Stop key 136 (Fig. 1) is operated and, through circuits to be described more fully hereinafter, will interrupt the drive to the reel. The free end of the tape is then fed over the guide roller 85, between the guide plates 51 and 52, and over the guide roller 86, and is attached to the reel 81. The machine is now ready to analyze the data on the tape.

After the desired code numbers to be used in the analysis have been set up, the Start key 137 (Fig. 1) is depressed and, through control circuits to be explained more fully, will cause the automatic feeding of the tape back and forth under control of the selecting means until the amounts related to the last of the preset code numbers have been accumulated.

Since, as explained above, the tape is on the upper reel when first introduced into the machine, the first pass of the tape in the automatic operation will be a downward pass. Throughout the pass of the tape, the brakes are automatically operated to free the shafts 82 and 84, and power is supplied to the lower drive motor 109. In the downward pass, the lever 119 will have been set to its position out of engagement with the direction switch DS–1, setting up controls which indicate that the tape has been moved downwardly.

The sensing of the reverse control perforation 45 which precedes the data-bearing frames will condition the turn-around controls for operation, and the sensing of the reverse control perforation which follows the data-bearing frames will cause the turn-around controls to become effective. The details of the circuits and controls involved in a turn-around operation will be explained more fully hereinafter. As soon as the turn-around controls become effective, they operate a make-before-break switch in the circuits to the drive motors to apply power to the upper drive motor shortly before power is removed from the lower drive motor. Consequently, for a short time, both motors are under power and act in opposition, which tends to stop the tape feed. Power is then removed from both motors, and the brake is applied to the upper shaft. The combination of the momentary application of power to both motors and the application of the brake enables the tape feed to be stopped before the leader 43 is disconnected from the upper reel 80.

Power is then applied to the upper drive motor, and the upward feed of the tape is begun. Immediately upon the beginning of the upward movement of the tape, the lever 119 is shifted to cause the direction control switch DS–1 to be operated, and this interrupts the drive of the tape to allow time for readout of data which has been accumulated during the downward pass and the setting of this amount in the indicator-printer section. Upon completion of the readout operation, the upper drive motor will be energized, and the upward feed of the tape will be resumed.

If there has been no accumulation during the pass, the drive of the tape will be only momentarily halted and then will be resumed.

In the upward feed or pass of the tape past the sensing means, the reverse control perforations before and after the data-bearing frames will be sensed, as in the downward pass, and, when the second or trailing perforation is sensed, the turn-around control becomes effective, and power is applied momentarily to both motors, then removed therefrom, and the brake is applied to the lower shaft to stop the tape feed before the leader 44 is completely unwound from the lower reel. The power is applied to the lower drive motor 109 to start the downward pass of the tape. Immediately upon the beginning of the downward pass, the lever 119 is rocked out of engagement with the direction control switch DS–1, and further feeding of the tape is interrupted momentarily if no amounts related to the next code number have been accumulated during the pass or until a readout operation has taken place if an accumulation has been made. The downward feed is then resumed to cause the next pass to take place and the selection of amounts according to the next higher code number.

This back-and-forth feeding of the tape will continue automatically under control of the selecting means until an analysis according to the group of selected code numbers has been made, at which time a control will beome effective, in a manner to be explained hereinafter, to terminate further feeding of the tape.

The Manual Run key 135, which was used to cause the operation of the upper reel 80 when the tape was being introduced into the machine, is also used to cause an upward feed of the tape whenever it is desired to transfer the tape from the lower reel 81 to the upper reel 80 or to remove the tape completely from the lower reel. If the tape is on the lower reel, one operation of this key will cause the tape to be fed to the upper reel, but the feed will be stopped, as in the usual way, with the leader 44 still attached to the lower reel.

When it is desired to remove the tape completely from the machine, the tape is fed to the upper reel in the usual manner, with the leader 44 still attached to the lower reel 81; then the operation of the Manual Run key 135 will cause a further upward feeding operation to feed the tape completely from the lower reel. After the tape, including the leader, has been fed to the upper reel, further operation of the feeding means is terminated by operation of the Emergency Stop key 136. The leader 44 is then secured to the spool on the shaft 125. The rewind motor switch 132 (Figs. 3 and 5) is operated to release the brake on the upper shaft 82 and to complete the circuit to the rewind motor 131, which drives the spool counterclockwise (Figs. 3 and 12) to transfer the tape from the reel to the spool.

As soon as the tape has been completely wound on the spool, the switch 132 is returned to normal to interrupt power to the motor 131 and to restore the brake for shaft 82 to its normal mode of operation. With the tape on the spool, the spool can be removed from the shaft 125, and another spool from a tape recorder can be placed on the shaft and introduced into the machine.

*Selecting means*

The selecting means, which controls the selective accumulation of amounts on the tape according to the classification or code numbers to produce a summary record, is located in the master control panel and control chassis 31 and is shown in Fig. 1 and in Figs. 18B, 18C, 18I, and 18J of the circuit diagram.

The selecting means includes four manually-settable selector switches 145$th$, 145$h$, 145$t$, and 145$u$ (Fig. 1), which are accessible at the front of the unit 25 and upon which a four-digit starting code number of a group may be set; includes four stepping switches SS$u$ to SS$th$ (Figs. 18I and 18J), which can be set automatically under control of the starting number switches to the starting code number at the beginning of an automatic run and which are included in a counting circuit which operates the switches to add "one" to the starting code number for each pass of the tape past the sensing means; includes four manually-settable selector switches 146$th$, 146$h$, 146$t$, and 146$u$ (Fig. 1), located below the switches 145$u$ to 145$th$ at the front of the machine and upon which a four-digit stopping classification or code number of a group may be set and which cooperate with the stepping switches to interrupt further passes of the tape when the switches are set to the stop number; includes four code number storage chains of tubes (Fig. 18B) settable under control of the code number sensing means according to code numbers as they are sensed on the tape; and includes comparison circuits (Figs. 18B and 18C) for comparing the sensed code number which has been set in the storage chains with the number set on the stepping switches, and for opening gates to allow the entry of an amount to be made in the accumulator each time the sensed code number agrees with that set on the stepping switches.

Each of the manually-settable switches is a ten-position rotary switch having a handle portion cooperating with an index, as shown in Fig. 1, to indicate the digit to which the switch is set.

Each of the starting code number switches (Fig. 18I) is provided with ten contacts, as 143, spaced about the switch in positions corresponding to the ten digit positions of the switch, and is provided with a notched contact member, as 147$u$, for completing circuits through the contacts in all positions except that in which the switch is set. The contact members 147$u$, 147$t$, 147$h$, and 147$th$ and related contacts are used to control the setting of corresponding stepping switches according to the starting code number of a group.

Each of the stopping code number switches (Fig. 18I) is provided with ten contacts, as 144, spaced about the switch in positions corresponding to the ten positions of the switch, and is provided with a contact member, as 148$u$, having thereon a lug for completing a circuit to only that contact 144 which corresponds to the setting of the switch. These contact members 148$u$, 148$t$, 148$h$, and 148$th$ of the stopping number switches cooperate with the stepping switches to terminate an operation of the machine when the stepping switches have been set to the number which was set on the stopping switches. The manner in which the stopping switches and the stepping switches cooperate to terminate an operation of the machine when the last code number of a group has been sensed will be explained more fully when the circuit diagram is discussed.

The four stepping switches SS$u$ to SS$th$ are usual type eleven-position rotary switches which are controlled to operate as denominational orders of a decimal counter, each switch operating idly through the eleventh position automatically. Each stepping switch is provided with four banks of contacts, as SS$u$–1, SS$u$–2, SS$u$–3, and SS$u$–4, which are used to control various operations of the stepping switches and of the machine.

The banks SS$u$–1, SS$t$–1, etc. (Figs. 18I and 18J) cooperate with the starting code number switch contact members 147$u$, 147$t$, etc., to control the positioning of the stepping switches according to the digits of the starting code number. For instance, in the units order stepping switch SS$u$, each of the contacts of the bank of contacts SS$u$–1 is connected to a related contact, as 143, which has the same digit value, the "0" contact of the bank being connected to the contact 143 in the "0" position of the starting code number switch 145$a$, the "1" contact being connected to the contact 143 in the "1" position of the starting code number switch, etc.

The wiper which cooperates with the bank SS$u$–1 is connected to the control relay C15 and also over the interrupter contacts SS$u$–$b$1 to the operating magnet SS$u$–$m$ for the units order switch.

Accordingly, when contacts C2$a$4 are closed at the beginning of an analysis, a circuit is completed over contacts C2$a$4, contacts C17$b$2, the notched contact member 147$u$, contacts 143 and the related contacts of the bank, the wiper, and the relay C15 and operating magnet SS$u$–$m$ in parallel. The operating magnet will operate repeatedly to step the wiper over the contacts of the bank until it engages that contact of the bank whose related contact 143 is opposite the notch in the contact member 147$u$. When this happens, there will be no further stepping of the switch under control of the contact member 147$u$, and the stepping switch will have been set to the units digit of the starting code number.

Two resistors, 139 and 140, of 5,000 ohms and 200 ohms, respectively, and a capacitor 141, of 16 microfarads, are in the circuit to relay C15 to slow down the operation of the relay, so that it will remain operated during the intermittent operation of the switch-operating magnet SS$u$–$m$.

Similar relays C18, C21, and C24 are provided for the higher order stepping switches.

Relays C15, C18, C21, and C24, when energized, open contacts C15$b$1, C18$b$1, C21$b$1, and C24$b$1 in the energizing circuit to relay C3 while the stepping switches are being set to the starting code number. Relay C3, when energized, applies power to the tape feed motors. Accordingly, the tape feed is disabled while any of the stepping switches are being operated.

The contact banks SS$u$–2, SS$t$–2, etc. (Fig. 18B), of the stepping switches cooperate with the code number storage chains to enable a comparison to be made between the sensed code number and that code number set on the stepping switches. The contact banks SS$u$–3, SS$t$–3, etc. (Figs. 18I and 18J), cooperate with the stop number switch contact members 148$u$, 148$t$, etc., to cause the termination of the automatic analysis when the stepping switches are set to the stopping code number. The contact banks SS$u$–4, SS$t$–4, etc. (Fig. 18F), are used to control the setting of the indicator-printer to cause the code number which has been used in the selective accumulation of amounts to be printed on the summary record when the total of the amounts is printed.

The four stepping switches SS$u$ to SS$th$ are also connected in a circuit which becomes effective after they have been set to the starting code number, and through which they act as a counter in which an increment of "one" is entered in the units order switch SS$u$ after each pass and in which entries are made in higher-order switches through tens transfer circuits each time a next adjacent lower-order switch makes ten increments of movement.

The circuit by which the stepping switches are interconnected to operate as a counter is shown in Figs. 18I and 18J.

The circuits associated with the units order switch SS$u$ include the relays C16 and C17. Relay C16 is energized when contacts C5$a$1 are closed at the end of a pass of the tape in either direction. This relay closes contacts C16$a$1 in an energizing circuit to the switch-operating magnet SS$u$–$m$ to cause a step of operation of the switch to enter a value of "one"; closes contacts C16$a$2 in the energizing circuit to relay C17; closes contacts C16$a$3, which prepare the energizing circuit to the turn-around control release relay C6; and opens contacts C16$b$3 in the energizing circuit to relay C3 to prevent tape feed until the value of "one" has been entered in the switch.

Relay C17, when energized, closes contacts C17$a$3 in a holding circuit over contacts C1$b$1 and will remain energized until relay C1 is energized. Relay C17 will open contacts C17$b$2 to interrupt the circuit over the contact member 147$u$ to prevent the contact member from further controlling the setting of the switch, and will close contacts C17$a$1 to prepare a tens transfer circuit over contacts SS$u$–$t$ to relay C19, which causes the operation of the denominational switch SS$t$ to enter a value of "one" therein in the same manner as relay C16 causes the units order switch to be operated. The circuit which is thus prepared over C17$a$1 will be completed by the closure of contacts SS$u$–$t$ each time the wiper passes from the "9" contact to the "0" contact, the contacts SS$u$–$t$ being closed by a cam on the shaft which supports the wiper. The energization of relay C19 energizes relay C20 in the same manner as relay C16 operated relay C17 and prepares the transfer circuit to the hundreds order.

Relays C22 and C23 in the hundreds order and relays C25 and C26 in the thousands order are operated when their respective contacts SS$t$–$t$ and SS$h$–$t$ are closed and operate in the same manner as relays C18 and C19 of the tens order operate when contacts SS$u$–$t$ are closed.

Energization of any one of the relays C16, C19, C22, or C25 in the entry of values in the switches will open contacts C16$b$3, C19$b$3, C22$b$3, and C25$b$3 in the circuit to relay C3 to prevent the tape feed from being operated while any of the stepping switches is being operated.

The four stepping switches are thus connected in a circuit to operate as a counter which is operated in unit increment entries in the lowest order and by tens transfer entries in higher order, and which advances the code number automatically by a value of "one" after each pass of the tape.

Rotary indicator drums 149 (Fig. 1) are driven by the stepping switches and show the digit values to which the stepping switches are set, hence show the particular code number which is being used in the selective accumulation of amounts in a pass of the tape past the sensing means.

The electron tube storage chains, upon which the code numbers are set up as they are sensed by the code number sensing means, are shown in Fig. 18B. Since the chains are alike in their circuitry and operation, only the chain for storing the units order of the code number will be described in detail.

Positive impulses from the preamplifier 77-2 related to the second channel on the tape are transmitted from point 150 in the anode circuit for this tube, over a coaxial cable 151, capacitor 152, of 250 micro-microfarads, point 153, and resistor 154, of 300,000 ohms, to the control grid of an amplifier-shaper tube 155. Point 153 in this circuit is connected over a resistor 156, of 470,000 ohms, to a tap on a 100,000-ohm potentiometer 157, which is connected to ground, and is connected over a resistor 158, of 50,000 ohms, to −105-volt conductor 159, and enables the grid to have a bias of about −6 volts applied thereto.

The tube 155, which is a 6AU6 type of tube, has its anode connected over point 162 and capacitor 163, of 100 micro-microfarads, and resistor 164, of 100,000 ohms, in parallel, to the +250-volt conductor 165. The tube has its screen grid connected to conductor 166, which is connected over resistor 167, of 50,000 ohms, to the +150-volt conductor 168. Conductor 166 extends to the screen grids of similar tubes in the other three banks of the storage chains, and the grid current will cause the drop across the resistor 167 to be such that these grids are supplied with a potential of about +60 volts. The suppressor grid is connected to the cathode of the tube 155, which cathode is connected to a normally-open switch C3a2 of relay C3, which, when operated, connects the cathode to ground. The connection of the cathode of tube 155 to ground only when relay C3 is energized prevents erroneous entries from being made in the code number storage chain.

The output from the amplifier and shaper tube 155 is taken from point 162 in its anode circuit and is in the form of sharp negative impulses, which operate an entry flip-flop device to produce positive potential operating impulses for the chain of tubes.

The entry flip-flop is made up of the two halves of a twin triode 171 of the 6J6 type. The left half has its anode connected to the +250-volt conductor 165 over a resistor 172, of 50,000 ohms, and has its cathode connected to ground. The control grid of the left half of the triode is connected over a resistor 173, of 120 ohms, point 174, and resistor 175, of 100,000 ohms, to point 176 in a potential divider consisting of a resistor 177, of 150,000 ohms, and resistor 178, of 50,000 ohms, connected between the +105-volt conductor 179θ and ground. Point 174 is coupled over a capacitor 180, of 50 micro-microfarads, to the anode of the right section and over capacitor 181, of 250 micro-microfarads, to the point 162 in the anode circuit of tube 155.

The right half of the flip-flop has its anode connected over a resistor 182, of 50,000 ohms, to the +250-volt conductor 165 and its cathode connected to ground. The grid of the right half of the flip-flop is supplied with a negative bias by being connected over resistor 184, of 120 ohms, point 185, and resistor 186, of 470,000 ohms, to the −75-volt conductor 205, which derives this potential from a potentiometer 188, which is in series with a potentiometer 189, in a circuit from the −105-volt conductor 159 to ground. The grid is also coupled from point 185 to the anode of the left section over a capacitor 190, of 250 micro-microfarads.

The flip-flop will normally have its left section conducting and its right section non-conducting. Each negative impulse applied to the left section from tube 155 will cause the left section to cease conducting, and this in turn will cause the right section to conduct. A short time after the impulse has caused the flip-flop to be operated from its normal condition, the flip-flop will return to its normal condition. Each time the flip-flop is operated from its normal condition, a steep-front, positive impulse is produced at the anode of the left section, which impulse is transmitted over the input conductor 191 to the tubes of the chain.

The storage chain is made up of ten gaseous tetrodes of the type sold by General Electric Company under the designation GL-5663 and is similar in essential respects to the circuit shown in the United States patent to Ernest V. Gulden, No. 2,515,448. To simplify the disclosure, only the "0," "1," "8," and "9" tubes of the chain and their related circuits are shown, because the circuits for the remaining tubes are the same as those shown, and their operation will be clear from what is described.

Each cathode is connected to ground through two circuits. Those for the "0" tube, for example, include resistor 195, of 15,000 ohms, point 196, and resistor 197, of 4,700 ohms, in series, and the other through a capacitor 198, of .005 microfarad, and resistor 199, of 2,500 ohms, in series. Each anode is connected to a conductor 201, which is connected over a resistor 200, of 5,000 ohms, to the +105-volt conductor 179. The cathode of any previously-conducting tube which has discharged its cathode capacitor will be at about +80 volts. When another tube of the chain is fired, its anode potential and that of the conductor 201 will drop to about +32 volts as the cathode capacitor is discharging, and this will cause the anode potential of the previously-conducting tube to drop below that of the cathode. This will cause cessation of current flow, momentarily, in the previously-conducting tube and will allow its grids to regain control. Thus, upon conduction commencing in any tube of the chain, any previously-conducting tube will be extinguished.

The control grid of the "0" tube, which is the first tube in the chain, is normally given a bias of +15 volts by being connected to the mid-point of a potential divider consisting of resistors 202 and 203, of 1.5 megohms, connected between the +105-volt conductor 179 and the −75-volt conductor 205. The shield grid of the "0" tube is connected over a resistor 204 of 1 megohm, to a −25-volt conductor 187, which derives its potential from the potentiometer 189. The shield grid is also connected over a resistor 206, of 47,000 ohms, and capacitor 207, of 25 micro-microfarads, to a zero-set impulse conductor 208, which has an impulse applied thereto to reset the counting chains to zero after each frame is sensed, as will be explained more fully later herein.

The "0" tube, with its control grid normally at +15 volts and its shield grid at −25 volts, will not normally be conducting but will be in the same condition as a primed tube and will fire whenever an impulse is impressed on the reset impulse conductor 208.

The control grid of the "1" tube is connected over a resistor 209, of 1.5 megohms, to the −75-volt conductor 205 and over a resistor 210, of 1.3 megohms, to the cathode of the "0" tube. These connections provide normal bias for the "1" tube and enable the "0" tube, when conducting, to prime the "1" tube, so that the "1" tube can be fired by an impulse from the flip-flop.

The shield grid of the "1" tube is connected over a resistor 212, of 4,700 ohms, and thence over a resistor 211, of 1 megohm, to the −25-volt conductor 187, and over a capacitor 213, of 10 micro-microfarads, to the input conductor 191.

Whenever the "1" tube is primed by conduction in the "0" tube, an impulse on the input conductor will cause the "1" tube to fire, and, in firing, the "1" tube will cause the "0" tube to be extinguished.

Circuits similar to the ones between the "0" tube and the "1" tube are provided for the remaining tubes and enable the conduction of a tube in the chain to prepare the next tube in the chain for response to an impulse on the input conductor 191.

The tens, hundreds, and thousands banks of code number storage chains are of similar construction and are operated by signals read from the third, fourth, and fifth channels of the tape, respectively.

As will be explained fully hereinafter, the storage chains are reset to zero by an impulse from an operating flip-flop 214a—214b (Fig. 18B), which causes their "0" tubes to conduct at the end of the sensing of each frame on the tape, so that, when the next frame is sensed, the number of impulses corresponding to the several digits of the code number are sent from the sensing means for channels 2 to 5 to the proper storage chains and will cause the tubes in the chains to become conducting one after another, beginning with the "1" tubes. At the end of the sensing of the code number of this next frame on the tape, only those tubes of the various chains will be conducting which correspond to the code number which was sensed.

As explained above, the potential of the cathode of a conducting tube will be more positive than that of a nonconducting tube, and this is used to control the selection of amounts to be accumulated.

The cathodes of the tubes of each chain are connected to corresponding contacts of the second bank of contacts of the stepping switches; that is, the cathode of the "0" tube of the units order code number storage chain will be connected to the "0" contact of the bank SS$u$–2; the cathode of the "1" tube will be connected to the "1" contact of bank SS$u$–2, and so forth, for all the tubes of the chain, although only the connection for the "0" and the "9" tubes are shown, the connection for the "0" tube extending from point 196 in the cathode circuit over conductor 215 to the "0" contact in the bank. Similarly, the cathodes of the tubes of the tens order code number storage chain will be connected to corresponding contacts of bank SS$t$–2; the cathodes of the tubes of the hundreds order code number storage chain will be connected to the corresponding contacts of the bank SS$h$–2; and the cathodes of the tubes of the thousands order code number storage chain will be connected to corresponding contacts of the bank SS$th$–2. In order to simplify the drawing, only the "0" and the "9" contacts of the banks SS$t$–2, SS$h$–2, and SS$th$–2 are shown, but it will be understood that each of these banks contains the full complement of contacts and connections.

The manner in which the stepping switches and storage chains cooperate to select amounts to be accumulated will now be explained.

Before a pass of the tape is made past the sensing means, the stepping switches SS$u$ to SS$th$ will have been set to the code number which is to be used in the selection of those amounts to be accumulated during the pass. This will mean that the wipers or brushes of these switches will be contacting the contact in each of the banks SS$u$–2 to SS$th$–2 which corresponds to the digit of the code number of that order.

It will be recalled that the code number in each frame is sensed immediately before its related amount. As the code number is sensed, it will cause the tubes of the storage chain which correspond to this number to be conducting, and, if the brushes are standing on contacts corresponding to this number, all the brushes will have the higher potential of the cathodes of these tubes applied thereto. If the sensed number does not correspond to the number set on the stepping switches, then one or more of the brushes will be standing on contacts of the bank which are connected to non-conducting tubes and will have a less positive potential than those brushes which are standing on contacts which are connected to conducting tubes.

The potentials which are applied to these brushes of the stepping switches by the code number storage chains control a coincidence circuit which in turn controls gates in the input to the accumulator, to control whether or not the amounts read from the tape will be entered into the accumulator. The control of the coincidence circuit is such that it will cause all the gates to be closed unless the wipers all have the higher potential applied thereto.

The coincidence circuit and its control over the gates will now be explained. The coincidence circuit includes four tubes, one for each denomination of the code number, whose conductivity is controlled by the potential applied to the brushes. Since the circuits related to the various denominations of the code number are similar, only those related to the units order of the code number will be explained.

Referring to Figs. 18B and 18C, the brush which contacts bank SS$u$–2 is connected over conductor 216 to the cathode of its related tube 217 in the coincidence circuit. Tube 217, which is a 6AG5 type, has its anode connected at point 218 in a divider network extending from the +150-volt conductor 219 over resistor 220, of 100,000 ohms, point 218, resistor 221, of 470,000 ohms, point 222, and resistor 223, of 470,000 ohms, to the —105-volt conductor 224. This tube also has its cathode and suppressor grid connected together and to ground over a resistor 225, of 3,900 ohms; has it control grid connected to ground over a resistor 226, of 500,000 ohms; and has its screen grid connected to the +150-volt conductor 219 over a resistor 227, of 60,000 ohms, and to ground over a capacitor 228, of .25 microfarad.

The anode potential supply for tube 217 is such that, when tube 217 is non-conducting, the potentials at the points 218 and 222 in the potential divider will be proportional to the drops across the resistors of the divider, point 218 being at about +125 volts and point 222 being at about 0 volts; however, when tube 217 conducts, the potential of point 218 is approximately at ground potential due to the low drop across the conducting tube and the relatively low resistance in the cathode circuit, and the potential of point 222 goes negative and becomes about —40 volts.

Whenever the brush of the stepping switch is on a contact which is connected to the cathode of a nonconducting tube of the storage chain and has the lower potential applied thereto, the potential of the cathode of tube 217 with respect to the potentials of the grids will be such as to cause the tube to conduct, causing the potential of point 222 to be about —40 volts. However, whenever the brush of the stepping switch is on a contact which is connected to the cathode of a conducting tube of the storage chain and has the higher potential supplied thereto, it will cause the potential of the cathode of tube 217 with respect to the potentials of the grids to be such as to cause tube 217 to be non-conducting, which, if none of the other tubes of the coincidence circuit is conducting, will cause the potential of point 222 to be at about 0 volts.

Each of the other tubes of the coincidence circuit has its anode connected over conductor 229 to point 218 in the potential divider, which is common thereto. Accordingly, if any one of the tubes of the coincidence circuit is conducting, the effect on the potentials in the potential divider will be the same as that explained above in connection with tube 217.

If the potential of point 222 is about 0 volts, therefore, it means that the sensed code number is the same as the one set on the stepping switches; and, if the potential of point 222 is at about —40 volts, then it means that the sensed code number is not the same as the one set on the stepping switches. The manner in which these potentials of point 222 are used to open and close gates in the accumulator entry circuits to control whether or not a sensed amount will be entered into the accumulator will be explained more fully hereinafter when the accumulator portion of the machine is described.

It is to be particularly noted that the operation of the storage chains and the comparison of the sensed code numbers with the code number set up on the stepping switches are so rapid that the control of the gates can be effected after the sensing of the code number and before the sensing of the amount and while the tape is driven continuously past the sensing means.

*Amount accumulator*

The amount accumulator and the entry controls therefor will now be described with reference to Figs. 18C, 18D, and 18E. Since the entry controls and the accumulator circuits for the several orders are substantially the same, only those for the units order will be described in detail.

Negative impulses from the preamplifier tube 77-7 (Fig. 18A) are transmitted over the coaxial cable 236 (Figs. 18A, 18B, and 18C) and are applied through a capacitor 237 (Fig. 18C), of 100 micro-microfarads, to the control grid of an amplifier-shaper tube 238 of the 6AU6 type, which is operated essentially as a zero-bias amplifier.

Tube 238 has its anode connected over point 239 and resistor 240, of 100,000 ohms, to a +250-volt conductor 241; has its suppressor grid and cathode grounded; has its screen grid connected, together with the screen grids of the amplifier-shaper tube of the other orders, over a voltage-dropping resistor 242, of 50,000 ohms, to the +250-volt conductor 241, conduction in the tubes causing the screen grids to be held at about +60 volts; and has its control grid supplied with a −0.5-volt bias over a resistor 243, of 300,000 ohms, and tap on the 10,000-ohm potentiometer 244, which is connected in series with a resistor 245, of 100,000 ohms, between a −105-volt conductor 224 and ground. The screen grids of the amplifier-shaper tubes of the other orders are also supplied with +60 volts over a conductor 247. The screen grids are also coupled to ground over an 8-microfarad capacitor, and the tap on the potentiometer is likewise connected to ground over a 4-microfarad capacitor.

The negative input impulses to the amplifier-shaper tube 238 will cause positive output impulses of the order of 70 volts to be generated at point 239 in the anode circuit, and impressed through a coupling capacitor 246, of 50 micro-microfarads, on a first control grid of the gate tube 251, which tube is of the 6AS6 type and, as explained earlier, is also controlled by the coincidence circuit of the selecting means.

The gate tube has its anode connected over point 252 and resistor 253, of 30,000 ohms, to the +150-volt conductor 219; has its cathode grounded; has its first control grid supplied with a negative bias of about −15 volts by being connected over a resistor 254, of 500,000 ohms, to point 255 in a potential divider consisting of resistors 256 and 257, of 60,000 and 10,000 ohms, respectively, connected in series between the −105-volt conductor 224 and ground; has its suppressor and shield grids connected together and supplied with +60 volts from point 258 in a potential divider consisting of resistor 259, of 30,000 ohms, and resistor 260, of 20,000 ohms, connected between the +150-volt conductor 219 and ground; and has a second control grid connected over conductor 261 to point 222 in the coincidence circuit, which enables the coincidence circuit to control the output from the gate tube. The second control grids of the gate tubes serving other orders of the accumulator are also connected to conductor 261, so that the gates in all orders are controlled simultaneously and in like manner from the coincidence circuit.

Point 258 has a conductor 262 extending therefrom to the suppressor grids and shield grids of the other gate tubes to supply these grids with +60 volts. Point 258 is also coupled to ground over a 4-microfarad capacitor.

The control of the gate tube 251 is such that, when the code number which has been sensed disagrees with that set on the stepping switches, the second control grid will be at −40 volts and will block the operation of the tube, so that input impulses impressed on the first control grid will be unable to cause output impulses to be generated at point 252 in the anode circuit of the gate tube 251. When the code number that is sensed agrees with the number standing on the stepping switches, then the second grid of the gate tube will be at 0 volts and will allow the tube to operate in response to input impulses to produce negative output impulses of about 50 volts at point 252 in its anode circuit.

The output impulses from the gate tube 251 are impressed, over conductor 265 (Figs. 18C, 18E, and 18D) and capacitor 266 (Fig. 18D), of 250 micro-microfarads, to the left half 267a of a twin triode of the 6J6 type, which left half of the triode forms the entry device for the units order of the accumulator.

The left half 267a of the tube has its anode connected over point 268 and resistor 269, of 15,000 ohms, to the +200-volt conductor 270; has its cathode connected to ground; and has its grid connected over a low resistance parasitic suppressor resistor to the junction of resistor 271, of 2.2 megohms, and resistor 272, of 250,000 ohms, which are connected in series between the +200-volt conductor 270 and ground and is supplied with a potential of about +20 volts therefrom. This half of the tube, consequently, is normally conducting but will be driven to cut-off by the −50-volt impulses from the gate tube 251 to produce about +100-volt impulses at point 268 in its anode circuit, which impulses are used to drive the electronic accumulator.

Each denominational order of the accumulator is made up of a ring of ten gaseous tetrodes of the GL–5663 type, interconnected in substantially the same manner as the ring shown in said Gulden Patent No. 2,515,448. In order to simplify the disclosure, only the "0," "1," "8," and "9" tubes and related circuits for the units denominational order are shown, because the circuits for the remaining tubes of the ring are the same as those shown, and their operation will be clear from what is described. Similarly, the rings of the other orders are the same as the units order, and their operation will be clear from a description of this order.

The anodes of the tubes are connected together and over a common resistor 276, of 5,000 ohms, to a +105-volt conductor 277, which is connected to the terminal 280 over point 278, a local clear key 279, and the normally open contact COa1 of relay CO, which relay is operated to close the contact whenever power is applied to the machine and the heaters have had time to become properly heated.

The cathode of each tube is connected to ground over two circuits; the circuits for the "0" tube, for instance, extend over a resistor 281, of 20,000 ohms, to ground, and also extends to ground over a resistor 282, of 2,500 ohms, point 283, and capacitor 284, of .005 microfarad, in series.

The shield grid is connected over a resistor 285, of 47,000 ohms, to point 286, which is coupled over a capacitor 287, of 10 micro-microfarads, to an input conductor 288, which is connected to the point 268 in the anode circuit of the half 267a of the twin triode, and which is connected over a resistor 289, of 1 megohm, to the conductor 290, which is supplied with a voltage of about −25 volts from the tap of a 50,000-ohm potentiometer 291 (Fig. 18E) connected in series with resistors 292, of 15,000 ohms, 293, of 25,000 ohms, and 294, of 25,000 ohms, between the −75-volt conductor 295 and ground. The tap is also coupled to ground over a stabilizing capacitor.

The control grid is connected over a resistor 296, of 1.5 megohms, to the −75-volt conductor 295, and is also connected over a resistor 297, of 1.3 megohms, to the cathode of the preceding tube of the ring, which, in the case of the "0" tube, is the "9" tube. This connection to the preceding tube of the ring enables conduction in a tube of the ring to prime the next tube in the ring for response to the next input impulse on the input conductor.

The operation of the ring is substantially the same as that of the code number storage chain previously described. With any tube of the ring conducting, an input impulse will cause the next tube to fire, and the firing of this next tube will cause the previously-conducting tube to be extinguished, so that, at any time, only that tube will be conducting which represents the digit standing in the order of the accumulator. As explained in connection with the storage chains, the potential of the cathode of the conducting tube will be more positive than that of the other tubes, and connections from points, as point 283 in the "0" tube cathode circuit, extend to the summary recorder to provide the controls, so that the total amounts related to a code number can be printed.

Means are provided to preset the accumulator to zero condition before each pass of the tape, so that the amount in the accumulator at the end of a pass will correspond to the total of all amounts on the tape which are related to the code number set in the stepping switches. The presetting controls include connections from the +200-volt conductor 270 over normally-open contacts of the relay A1, as A1a2 for the units denominational order, and over resistor 298, of 1 megohm, to the control grid of the "0" tube. The relay A1, which is energized momentarily just before each pass of the tape, closes the contacts A1a2 to A1a7, of which only the contacts A1a2 are shown, to apply the +200 volts momentarily to the control grids of the "0" tube in each of the denominations of the accumulator to cause these tubes to fire and extinguish any other tube of the ring which might have been conducting. The controls for momentary energization of the relay A1 will be explained more fully when the relays for coordinating the operation of the machine are described.

Means are provided in the accumulator for effecting tens transfers between adjacent denominational orders. Inasmuch as amount entries may be made simultaneously in all orders of the accumulator, a delayed-entry type of transfer means is provided, in which the required tens transfers are stored during the amount entry period, and the actual transfers are effected subsequently to the time in which amount entries are made. The transfer means between the units and tens orders is representative of the transfer means between the four lower orders of the accumulator.

A transfer storage tube 305 is provided for storing any transfer which may be required due to the value in the order reaching zero or passing through zero during the amount-entering operation of the accumulator. This tube is a gaseous tetrode of the GL–5663 type. It has its anode connected over an individual resistor 306, of 250 ohms, to a conductor 307, which is common to the anodes of all the transfer storage tubes.

Conductor 307 is connected over point 308, resistor 309, of 250 ohms, resistor 310, of 100 ohms, normally-closed relay contacts A1b1, and conductor 311 to point 278 and is supplied with +105 volts therefrom.

The shield grid is connected to the cathode, and both are connected to ground over two circuits, one over point 312 and resistor 313, of 20,000 ohms, and the other over a capacitor 314, of .005 microfarad, and resistor 315, of 2,500 ohms, in series.

The control grid of tube 305 is connected over point 316 and a resistor 317, of 500,000 ohms, to conductor 322a, which extends to a tap on a 50,000-ohm potentiometer 323 (Fig. 18D), from which it is supplied with a bias of about −13 volts, which potentiometer is connected between the −75-volt conductor 295 and ground and has its tap coupled to ground over a capacitor of .25 microfarad.

Point 316 in the control grid circuit is coupled over a capacitor 319, of 25 micro-microfarads, to the cathode of the "0" tube.

The transfer storage tube 305 is normally non-conducting but will be fired by an impulse derived from the cathode of the "0" tube as the "0" tube becomes conducting. The transfer storage tube will continue to conduct after the amount-entering operation and will control a transfer device to enable a tens transfer to be effected subsequently to the amount entry.

The relay contacts A1b1 in the anode potential supply circuit for the transfer storage tubes are opened when relay A1 is energized, and this disables the transfer storage tubes, so that these tubes will not be fired when the "0" tubes are fired as the accumulator is preset to "0."

The transfer device of the units denominational order, the right half 267b of the twin triode, is connected in parallel with the gate tube of the tens denominational order by having its anode connected over resistor 322, of 1,000 ohms, to the conductor 320 from the gate tube of the tens denominational order and thence over the anode resistor, which is similar to resistor 253 of the units order, to the +150-volt anode potential supply conductor 321 and by having its cathode connected to ground. Each time the transfer device conducts, it will cause an impulse to be impressed on the control grid of the entry device of the tens denominational order to cause a value of "one" to be entered in this order.

The transfer device has its control grid connected over resistor 325, of 120,000 ohms, resistor 326, of 250,000 ohms, and conductor 327, to a tap on a 50,000-ohm potentiometer 328, connected between the −75-volt conductor 295 and ground, and is supplied with a normal bias of about −50 volts. The tap is coupled to ground over a .25-microfarad stabilizing capacitor. The conductor extends to the control grids of the other transfer devices and supplies them with this bias potential. The control grid of the transfer device of the units order is also connected over a resistor 329, of 470,000 ohms, to point 312 in the cathode circuit of the transfer storage tube 305, which connection enables the transfer storage tube to control the bias on the transfer device to control when the transfer device can respond to transfer-effecting impulses which are impressed on the control grid from a transfer-actuator chain. The control over the transfer device is such that, when the transfer storage tube is non-conducting, indicating that no transfer is required, its cathode will be at a lower potential and will maintain the bias on the control grid of the transfer device at a value where the transfer device will not become conducting in response to the transfer-effecting impulses; but, when the transfer storage tube is conducting, indicating that a transfer is required, its cathode will be at a higher potential and will modify the bias on the control grid of the transfer device to enable the transfer device to conduct in response to a transfer-effecting impulse and cause a value of "one" to be entered in the next higher order.

Since there are only four amount channels on the tape, entries in the fifth and sixth orders of the accumulator are made only as the result of tens transfer operations from lower orders.

As shown in Fig. 18E, the fifth, or ten thousands, order is provided with an entry device 330a, a transfer device 330b, and a transfer storage tube 331.

The transfer storage tube 331 operates in the same manner as tube 305 to control the transfer device 330b. The transfer device 330b operates in substantially the same manner as the transfer device 267b but has its anode connected over resistor 332, of 1,000 ohms, point 333, and resistor 334, of 30,000 ohms, to the +200-volt conductor 270. Point 333 is coupled over capacitor 335, of 250 micro-microfarads, to the control grid of the entry device of the sixth or hundred thousands order. Each time the transfer device of the fifth order conducts, it will cause a negative impulse to be generated across the resistor 334, which impulse, when impressed on the entry device 336a, will cause it to operate and enter a value of "one" in the sixth order.

The entry device 330a of the fifth order is controlled from the transfer device of the fourth, or thousands, order, which transfer device has its anode connected over a resistor of 1,000 ohms (not shown), conductor 337, point 338, and resistor 339, of 30,000 ohms, to the +200-volt conductor 270 and will produce a negative impulse at point 338 each time it conducts.

Inasmuch as the sixth order is the highest order of the accumulator of the instant embodiment, no provision is made for transfers to a higher order, and the transfer storage tube and the transfer device have been omitted.

The transfer-effecting impulses are obtained from a chain of transfer-actuator tubes, shown near the top of Fig. 18D. The chain includes five tubes for operating the transfer devices to cause entries in the tens, hundreds, thousands, ten thousands, and hundred thousands orders in succession, if required, and a delay tube for operating a restoring tube, which, when operated, restores any operated transfer storage tubes to their unoperated condition. In Fig. 18D, only the units order tube "U," the ten thousands order tube "TTh," the delay tube 345, and the restoring tube 346 are shown; the tubes for causing transfer entries in intervening orders of the accumulator and their related circuits, being similar to the ones shown, have been omitted from the diagram in order to avoid duplication of the circuits.

The tubes of the chain, beginning with the "U" tube and ending with the delay tube 345, are gaseous tetrodes of the GL5663 type. These tubes have their anodes connected together and over point 347 and resistor 348, of 5,000 ohms, to the +105-volt conductor 311. Point 347 in this circuit is also coupled to ground over a capacitor of 100 micro-microfarads.

The shield grid and cathode of each tube are connected together and to ground over two circuits. The circuits for the "U" tube are representative, one extending to ground over a resistor 349, of 20,000 ohms, and the other extending to ground over a resistor 350, of 2,500 ohms, and capacitor 351, of .005 microfarad, in series.

The circuit to the control grid of the "U" tube, which is the first tube of the chain, is different from the circuits to the other control grids and extends over a resistor 352, of 470,000 ohms, to the tap on potentiometer 323, from which the grid is supplied with a bias of about −13 volts, and extends over a capacitor 353, of 25 micro-microfarads, and conductor 354, to an operating flip-flop 214a—214b (Fig. 18B), from which it receives an impulse to initiate an operation of the chain under control of the control perforations in channel 1 or 11 in a manner which will be explained more fully hereinafter.

The cathode of the "U" tube is connected over conductor 355, resistor 356, of 47,000 ohms, and capacitor 357, of 500 micro-microfarads, to the control grid of the transfer device 267b of the units order, which connection transmits the cathode potential rise of the "U" tube as an impulse to the transfer device to cause it to conduct, if its related transfer storage tube is conducting, and impress a negative impulse on the entry device of the tens denominational order to cause an entry of "one" therein.

The second tube of the chain has its control grid connected to the −75-volt conductor 295 over a resistor of 1 megohm (not shown, but similar to resistor 358 for the "TTh" tube) and resistor 359, of 1.5 megohms. This control grid is also connected to the cathode of the "U" tube over a resistor 360, of 1 megohm, which connection enables the cathode potential rise of the "U" tube to fire the "T" or next tube in the chain automatically. Point 361 in this control grid circuit is coupled to ground over a 250-micro-microfarad capacitor, which delays the firing of the "T" tube by the "U" tube long enough for the transfer storage tube in the tens order to be operated if a further tens transfer requirement results from the transfer entry.

When the "T" tube of the chain fires, it will cause the "U" tube to be extinguished, will send a transfer-actuating impulse over conductor 365 (only a portion of which is shown in Fig. 18D) to the transfer device of the tens denominational order, and will also, after a suitable delay, fire the "H" tube of the chain.

The sequential firing of the tubes of the chain will continue automatically, and, as each tube is fired, it will send a transfer-effecting impulse to the transfer device of its related order to cause the transfer device to operate if its related transfer storage tube is conducting, the connection of the last transfer-actuator tube extending from the cathode of the "TTh" tube over conductor 366, resistor 367, and capacitor 368 to the control grid of the transfer device 330b of the ten thousands order.

While the firing of the tube "TTh" of the chain, all possible transfer entries will have been made. The tube "TTh" also fires the delay tube 345, which in turn fires the transfer storage tube restoring tube 346 to restore any conducting storage tube to non-conducting condition.

The restoring tube 346 is a gaseous tetrode of the type designation 2D21. This tube has its anode connected to point 308 in the anode circuit for the transfer storage tubes. The shield grid and cathode are connected together and over resistor 369, of 75,000 ohms, and capacitor 370, of .015 microfarad, in parallel, to point 371 in a potential divider extending from the −75-volt conductor 295 to ground over resistor 372, of 10,000 ohms, the 10,000-ohm potentiometer 373, point 371, and resistor 374, of 25,000 ohms, from which point they are supplied with a potential of about −40 volts. Point 371 is coupled to ground over a stabilizing capacitor.

The control grid of tube 346 is supplied with a bias of about −48 volts by being connected over a resistor 375, of 500,000 ohms, to the tap on the potentiometer 373, and is also coupled to the cathode of the delay tube 345 over a capacitor 376, of 25 microfarads. When the delay tube 345 is fired, its cathode potential rise is impressed on the control grid of the restoring tube as a firing impulse and will cause the restoring tube to fire and become conducting. As the restoring tube is fired, its anode potential and that of conductor 307 will become negative, causing the potential of the anodes of the conducting transfer storing tubes to drop below that of their cathodes and the tubes to be extinguished. The circuit constants of the operating circuit for the restoring tube are such that the tube will automatically extinguish shortly after it has been fired to restore any transfer storage tubes which may have been operated.

Accordingly, it is seen that, in the operation of the transfer means, any tens transfers that are indicated during the amount-entering operation are stored in the transfer storage tubes, which tubes prepare tens transfer devices for operation. After the amount-entering operation, the operation of the transfer actuator chain is initiated to generate transfer-effecting impulses, which are impressed on the transfer devices one after another from lower to higher order to cause the required transfer entires to be made. After all required transfer entries have been made, the restoring tube 346 operates to extinguish any transfer storage tubes which may have been rendered conducting to store required transfers, and the transfer means is made ready for another operation.

*Item counter*

The counter which is provided to count the number of entries which have been accumulated in the amount accumulator during a pass of the tape is shown in Fig. 18E. In the embodiment which is shown to illustrate the invention, only units and tens denominational orders of the counter are shown, but it will be obvious that the capacity of the counter can be increased if desired.

Entries are made into the units order of the counter under the joint control of the coincidence circuit, which also controls the gates to the accumulator, and the operating flip-flop 214a—214b (Fig. 18B), which is operated by the control perforations in channels 1 or 11 of the tape at the end of an amount entry into the accumulator, a count of "one" being entered when the operating flip-flop is operated, if the coincidence circuit has opened the gates to the accumulator and has allowed an entry to have been made therein.

Associated with the units order of the counter are an entry control tube 381 and an entry flip-flop, 382a and 382b, which is operated from the control tube 381 and produces strong positive impulses for stepping the counting ring.

The entry control tube 381 is a 6AS6 type tube, which has its anode connected over point 383 and resistor 384, of 100,000 ohms, to the +200-volt conductor 270 and has its cathode grounded.

The suppressor grid and the shield grid are connected together and are provided with a potential of +80 volts from point 385 in a potential divider extending between the +105-volt conductor 277 and ground over resistors 386 and 387, of 30,000 ohms and 20,000 ohms, respectively.

The second control grid of tube 381 is connected over conductor 388 (Figs. 18E and 18C) and resistor 389, of 47,000 ohms, to conductor 261, which, as explained earlier herein, will have a potential of about —40 volts when the sensed code number does not agree with the number on the stepping switches, and will have a potential of about 0 volts when the sensed code number agrees with the number set on the stepping switches.

The first control gird of tube 381 is supplied with a bias of about —55 volts by being connected over a resistor 390, of 500,000 ohms, to a tap on a 50,000-ohm potentiometer 391, which is connected between the —75-volt conductor 295 and ground. This grid is also coupled over capacitor 392, of 50-micro-microfarads, conductor 393, and conductor 354 to the operating flip-flop 214a and 214b to receive an impulse each time a perforation is sensed in channels 1 or 11.

The control of the tube 381, therefore, is such that an impulse will be impressed on the first control grid immediately after each amount on the tape is sensed, but these impulses will be ineffective to produce entries into the counter if the bias on the second control grid has been made negative by the operation of the coincidence circuit due to the non-agreement between the sensed code number and the number set on the stepping switches.

The entry flip-flop is made up of two halves 382a and 382b of a 6J6 tube, which are so controlled as to have but one stable state, with half 382a normally conducting, and to return to said state a predetermined time after each operation therefrom.

Both halves have their anodes connected over resistors 394 and 395, each of 50,000 ohms, to the +200-volt conductor 270, and have their cathodes grounded.

The control grid of the left half, 382a, is normally supplied with a +20-volt potential by being connected over resistors 396, of 120 ohms, and 397, of 100,000 ohms, to point 398 in a potential divider consisting of resistors 399, of 100,000 ohms, and 400, of 25,000 ohms, connected between the +105-volt conductor 277 and ground. This control grid is also coupled over a capacitor 401, of 250 micro-microfarads, to point 383 in the anode circuit of the entry control tube 381 and over a capacitor 402, of 25 micro-microfarads, to the anode of the right half 382b of the flip-flop.

The control grid of the right half, 382b, is connected over resistor 409, of 120 ohms, and thence over resistor 410, of 500,000 ohms, to the —25-volt conductor 290 and over a capacitor 411, of 250 micro-microfarads, to the anode of the left half of the flip-flop.

The flip-flop will, therefore, have its left half normally conducting, but, on receipt of a negative impulse from the entry tube 381, the flip-flop will operate from normal, causing the left half to become non-conducting, with a consequent rise in potential at its anode.

This rise in potential will be impressed on the control grid of the right half as an impulse which will cause the right half to conduct and apply a negative impulse to the control grid of the left half. After a predetermined period, the right half will cease conducting, and the left half will be allowed to return to its normal conducting state.

The potential excursions of the anode of the left half of the flip-flop are transmitted over the input conductor 412 to the counting ring of the units denominational order of the counter to cause its step-by-step operation.

The counting rings of the counter portion of the machine are substantially the same as those used in the accumulator, differing only in the size of the capacitors used in coupling the shield grids to the input conductor, as 412. Capacitors of 25 micro-microfarads, as 413, are used to couple the input conductor 412 to the shield grids of the tubes of the counter instead of the 10-micro-microfarad capacitors, as 287, which were used in the accumulator.

The two orders of the counter are preset to zero along with the several orders of the accumulator each time the relay A1 operates, contacts A1a8 and A1a9 applying +200 volts to the control grid of the "0" tube in the units and tens orders, respectively.

Since entries are made in the counter only through the units denominational order, there is no need for the delayed type of transfer means, as used in the accumulator. The transfer means for making entries into the tens denomination, each time entries in the units order exceed its capacity, includes a transfer tube 414, which is a gaseous tetrode of the GL–5663 type, having its anode connected over resistor 415, of 250 ohms, and conductor 416 to the potential supply for the transfer storage tubes, which potential supply, as explained earlier, will be interrupted at contacts A1b1 each time the accumulator and the counter are reset to zero. This disabling of the transfer tube 414 prevents improper operation of the transfer means when the counter is reset to zero.

Tube 414 has its shield grid and cathode connected together and to ground over resistor 417, of 100,000 ohms, and capacitor 418, of 500 micro-microfarads in parallel, and has its control grid connected over a resistor 419, of 1 megohm, to a point between resistors 293 and 294 in the potential divider containing resistors 292, 293, and 294, and potentiometer 291, from which point it is supplied with a potential of about —10 to —12 volts.

The control grid of the transfer tube 414 is also coupled over a capacitor 420, of 25 micro-microfarads, to the cathode of the "0" tube of units order and will receive a positive firing impulse therefrom each time the "0" tube is fired when the units order exceeds its capacity.

When the transfer tube is fired, its cathode potential rise is impressed on the input conductor 421 for the tens order to cause a value of "one" to be entered in this order. The values of resistance and capacitance in the circuit to the transfer tube are such that the tube will be extinguished automatically each time it is fired.

As in the case of the accumulator, a conductor, as 422, extends from the cathode of each tube of the ring in each order of the counter to the summary recorder to enable the counter to control the recorder to print the number of entries along with the related total and code or classification number.

The counter, therefore, will be reset to zero before each pass of the tape and will have a value of "one" entered in the units order each time an entry is made in the amount accumulator during the pass. Whenever the capacity of the units order is exceeded, a unit will immediately be entered in the tens order through the transfer means. At the end of each pass, the counter can control the summary recorder, in a manner to be explained fully when the summary recorder is described, to print the amount standing in the counter.

The operating flip-flop

The operating flip-flop 214a—214b (Fig. 18B) operates under control of a perforation in channel 1 or 11 after each amount has been sensed. Each operation of the flip-flop generates a signal which is used to cause the resetting of the code number storage chains, is used to initiate a transfer operation in the accumulator, and also is used to cause an entry in the counter if the counter has been prepared for entry by the coincidence circuit.

The manner in which the flip-flop is controlled from channels 1 and 11 on the tape will now be described.

As explained earlier herein, the shutter 60 (Figs. 9 and 10) enables a control perforation in channel 1 to be sensed immediately after each amount in a downward pass of the tape and enables a control perforation in channel 11 to be sensed after each amount in an upward pass of the tape. As each control perforation is sensed, it will cause an operation of its related photo-cell pick-up 76–1 or 76–11 and preamplifier 77–1 or 77–11 to produce a positive impulse of about 75 volts on conductor 425 or 426.

The impulses on conductors 425 and 426 operate their respective halves 427a and 427b of a mixer-inverter tube of the 6J6 type to produce a negative impulse for each impulse on either conductor. The negative impulses are applied to the left half 214a of the operating flip-flop to cause an operation of the flip-flop.

The mixer-inverter tube has both its anodes connected together and to the +250-volt conductor 92 over a resistor 428, of 10,000 ohms, and capacitor 429, of 100 micro-microfarads, in parallel, and has both its cathodes grounded.

The control grids of both halves are connected over resistors 430 and 431, of 250,000 ohms each, to a potential divider consisting of resistors 432, of 100,000 ohms, and 433, of 6,000 ohms, connected in series between the —105-volt conductor 159 and ground and are supplied with a bias of about —8 volts therefrom, which causes both halves of the tube to normally be non-conducting.

The control grid of the left half 427a is also coupled over a capacitor 434, of 1,000 micro-microfarads, and the coaxial cable 425 to the preamplifier 77–1, which impresses positive impulses of about 70 volts on this grid each time a perforation is sensed in channel 1. Similarly, the control grid of the right half 427b is coupled over a capacitor 435, of 1,000 micro-microfarads, and coaxial cable 426 to the preamplifier 77–11, which impresses a positive impulse of about 70 volts on this grid each time a perforation is sensed in channel 11. When an impulse is impressed on the control grid of either half of the mixer-amplifier, that half will conduct and, since both anodes are connected together, will cause the anode potential to drop, which drop is utilized as an operating impulse for the operating flip-flop 214a—214b.

The operating flip-flop is made up of the two halves 214a and 214b of a 6J6 tube, which are so controlled as to have but one stable state, with half 214a normally conducting, and to return to said state a predetermined time after each operation therefrom.

The anodes of the halves are connected over resistors 436 and 437, of 50,000 ohms, to the +250-volt conductor 92, and the cathodes of both halves are grounded.

The control grid of the left half, 214a, is supplied with a potential of about +40 volts by being connected over resistors 438, of 120 ohms, and 439, of 100,000 ohms, to point 440 in a potential divider consisting of resistors 441, of 250,000 ohms, and 442, of 50,000 ohms, connected between the +250-volt conductor 92 and ground. This control grid is coupled over a capacitor 443, of 250 microfarads, to the anodes of the mixer-inverter tube and will receive a negative impulse each time either half of the tube operates in response to the sensing of a perforation in channels 1 or 11. The control grid of the left half 214a is also coupled over a capacitor 444, of 100 micro-microfarads, to the anode of the right half, so that anode potential excursions can be used to control conduction in the left half.

The control grid of the right half 214b is connected over resistors 450, of 120 ohms, and 451, of 500,000 ohms, to the —25-volt conductor 187 and is provided with a negative bias of about 25 volts therefrom. This control grid is coupled over a capacitor 452, of 250 micro-microfarads, and conductor 453 to the anode of the left half to enable potential excursions of the anode of the left half to control conduction in the right half. A further connection extends from conductor 453 over capacitor 454, of 1,000 micro-microfarads, and normally open contacts C1a2 of relay C1 to a +90-volt conductor 455 and enables the flip-flop to be operated when relay C1 is operated just prior to the beginning of a pass of the tape, as will be explained more fully when the control relays are described.

Each time the operating flip-flop is operated, either by the closure of contacts C1a2 or by an impulse from the mixer-inverter tube in response to a signal in channels 1 or 11, a positive impulse will be sent from the anode of the left half 214a over resistor 456, of 47,000 ohms, and conductors 208 and 354 to reset the storage chains, to initiate an operation of the tens transfer-actuator chain and also cause an entry in the item counter if the coincidence circuit has indicated an agreement between the code number and the number set up on the stepping switches, all as explained earlier herein.

Tape reverse control

A further portion of the machine, which is controlled immediately from perforations in the tape, is that which initiates a turn-around operation or reversal of the feed of the tape and causes those operations incident to a turn-around operation to take place, such as the operation of the summary recorder to record data set up during the pass and also the operation of entering a value of "one" in the stepping switches to advance the code number to that which is to be used in the next pass. This portion also provides controls for certain parts of the machine according to the direction in which the tape feed is to take place.

As explained earlier herein, each leader 43 and 44 (Fig. 6) of the tape 40 is perforated with a perforation 45 in channel 6 position adjacent the last data entry at each end of the tape. The leaders are long enough to allow for the stopping of the tape feed in one direction and the reversal of the direction of feed, all without feeding the tape completely from the reels. These perforations 45 operate this particular portion of the machine to provide the necessary controls for causing the reversal of the tape feed at the end of each pass of the tape.

Since it is the sensing of the perforation following the data entries which initiates the turn-around operation, and since this perforation will have passed the sensing means before the direction of feed is reversed in the turn-around operation, provision must be made so that this perforation, which will again be sensed by the sensing means at the beginning of the next pass, will not cause a turn-around operation but will merely prepare or condition this control portion of the machine so that the perforation 45 which follows the data entries on the tape can initiate the turn-around operation.

This control portion is shown at the top of Fig. 18C and includes an amplifier-shaper tube 460, a reversing control trigger pair consisting of left and right sections 461a and 461b and a relay-operating tube 462 controlled therefrom, and a direction-controlling trigger pair consisting of left and right sections 463a and 463b and a relay-operating tube 464 controlled therefrom.

The amplifier-shaper tube 460, which is of the 6AU6 type, has its anode connected over point 465, resistor 466, of 100,000 ohms, and conductor 165 to the +250-volt conductor 92 and has its suppressor grid and cathode connected together and to ground.

The screen grid of tube 460 is connected over conductor 467 to the +150-volt conductor 74, and the control grid is given a normal negative bias of about 10 volts by being connected over a 1-megohm resistor 468 to a potential divider consisting of resistors 469, of 210,000 ohms, and 470, of 25,000 ohms, connected in series between the −105-volt conductor 159 and ground.

The control grid is also coupled over a capacitor 471, of 1,500 micro-microfarads, and coaxial cable 472 to the preamplifier 77–6, from which it receives a positive impulse of about 125 volts each time one of the perforations 45 in the tape is sensed.

Tube 460, due to its bias, will normally be non-conducting but will conduct each time an impulse is received from the preamplifier 77–6. This will cause the potential of its anode to drop, which potential drop is used to operate the reversing control trigger pair 461a and 461b.

The reversing control trigger pair, which is made up of the two sections 461a and 461b of a tube of the 6J6 type, has two stable states, with either section conducting and the other section non-conducting.

The two sections 461a and 461b have their anodes connected over resistors 475 and 476, of 10,000 ohms each, to the +150-volt conductor 467 and have their cathodes grounded.

The anode of each section is connected to the control grid of the other section over a trigger connection including a resistor, as 477, of 100,000 ohms, and capacitor, as 478, of 1,000 micro-microfarads, in parallel.

The control grid for the left section is connected over resistors 479, of 120 ohms, and 480, of 100,000 ohms, conductor 481, and normally-open switch COa2 to the −105-volt conductor 159 and is supplied with a negative potential when the delay relay CO operates soon after power is supplied to the machine, as will be explained more fully when the control relays are described. This delay in application of negative potential causes the trigger pair initially to assume a condition in which the left section is conducting. The control grid for the left section is also coupled to point 465 in the anode circuit of the amplifier-shaper tube 460 over a resistor 482, of 47,000 ohms, and capacitor 483, of 100 micro-microfarads, in series, and is coupled to the +250-volt conductor 165 over a resistor 484, of 470,000 ohms, and the normally-open switch C1a3, which is closed momentarily at the start of an analysis, to preset the trigger pair with the left section 461a conducting before the first pass of the tape is initiated, as will be explained more fully when the control relays are described.

The control grid for the right section 461b is connected over resistors 485, of 120 ohms, and 486, of 100,000 ohms, to the −105-volt conductor 159, and is connected over resistor 487, of 47,000 ohms, and capacitor 488, of 100 micro-microfarads, in series to point 465 in the anode circuit of the amplifier-shaper tube 460.

The operation of the reverse control trigger pair is such that, due to the control by the relay contacts COa2 and C1a3, the trigger pair will always have its left section 461a conducting at the beginning of a pass of the tape. The perforation 45 which is sensed before the data entries on the tape will cause the amplifier-shaper tube 460 to conduct and send a negative impulse to the trigger pair to change its operation so that the right section 461b is conducting and its left section 461a is non-conducting to condition the turn-around controls for operation. The perforation 45 which follows the data entries will operate the amplifier-shaper tube 460 to send a negative impulse to the trigger pair to restore the trigger pair to its starting condition with the left section conducting, which causes the turn-around controls to operate. Accordingly, it is seen that the first perforation 45 which is sensed in a pass of the tape will cause the reverse trigger pair to operate from its normal condition to condition the turn-around controls for operation, and the second perforation 45 which is sensed will cause the trigger pair to return to its normal condition to initiate the turn-around operation.

The reversing control trigger pair controls a gaseous tetrode 462, which operates the turn-around operation control relay C5. This relay prevents further tape feed and initiates a read-out operation from the code number switches, the accumulator, and the counter, and causes the stepping switches to receive a value of "one," all as will be explained more fully when the relay controls are described.

The tube 462, which is of the 2D21 type, has its anode connected over the normally-closed relay contacts C6b2, the winding of relay C5, and resistor 490, of 10,000 ohms, and capacitor 491, of 2 microfarads in parallel therewith, to the +150-volt conductor 467. The shield grid and cathode are connected together and to ground. The control grid is given a normal bias of about −60 volts by being connected over a resistor 492, of 500,000 ohms, to the junction of resistors 493 and 494, of 220,000 and 500,000 ohms, respectively, in a potential divider extending from the −105-volt conductor 159 to ground. The control grid is also coupled to the anode of the right section 461b of the reversing control trigger pair over a capacitor 495, of 200 micro-microfarads, and conductor 496, and will be fired when it receives a positive impulse from the trigger pair each time the trigger pair returns to its normal condition, with the right section non-conducting.

The reversing control trigger pair also supplies operating impulses to the direction-controlling trigger pair, which is made up of left and right sections 463a and 463b of a 6J6 type of tube.

The direction-controlling trigger pair is similar to the reversing control trigger pair, having the anodes of the sections connected over 100,000-ohm resistors to the +150-volt conductor 467, the cathodes connected to ground, and trigger connections from the anode of one section to the control grid of the other section over resistors of 100,000 ohms and capacitors of 1,000 micro-microfarads in parallel.

The control grid of the left section 463a is connected over resistor 497, of 120 ohms, resistor 498, of 100,000 ohms, the conductor 481, and relay contacts COa2 to the −105-volt conductor 159 and over capacitor 499, of 100 micro-microfarads, and resistor 500, of 47,000 ohms, to the anode of the left section 461a of the reversing control trigger pair. As in the case of the reversing control trigger pair, the supplying of bias over the relay contacts COa2 delays the application of bias momentarily to the left section when power is turned on, to insure that the trigger pair will be initially preset with the left section conducting.

The control grid of the right section is connected over resistor 501, of 120 ohms, and resistor 502, of 100,000 ohms, to the −105-volt conductor 159 and is coupled to the anode of the left section of the reversing control trigger pair in the same manner as the control grid of the left section 463a.

Further presetting means are provided for controlling whether the left or right-hand section of the direction-controlling trigger pair will be conducting at the beginning of a pass of the tape past the sensing means. The control grid of the left section 463a is connected over the resistor 497 and a resistor 503, of 500,000 ohms, and normally-closed relay contacts C12b1 to conductor 504, which is connected over normally-open contacts C1a4 to the +150-volt conductor 467, which connection will apply the positive voltage to the control grid momentarily to cause the left section to conduct prior to a pass of the tape. The control grid of the right section 463b is connected over the resistor 501 and a resistor 505, of 500,000 ohms, and the normally-open relay contacts C12a2 to the conductor 504, which, as explained, is connected momentarily to the +150-volt conductor over the relay contacts C1a4 before a pass of the tape is made.

The operation of the direction-controlling trigger pair is such that the left section will be conducting when the tape is to be fed downwardly, and the right section will be conducting when the tape is to be fed upwardly, the trigger pair being preset according to the direction of the first pass in an operation and thereafter being operated from the reversing control trigger pair to change its conducting status each time a turn-around operation is initiated.

It is to be noted that the normally-closed relay contacts C12b1 and normally-open relay contacts C12a2 control which section of the direction-controlling trigger pair will be rendered conducting in the presetting operation when contacts C1a4 close.

As indicated earlier and as will be explained more fully later when the control relays are described, the first pass of the tape in a normal operation of the machine, when the "Start" key 137 is operated, is a downward pass. In such an operation of the machine, the relay C12 will not be energized, and the contacts C12b1 will be closed, enabling the trigger pair to be preset with the left section conducting when contacts C1a4 close. If an operation is to be performed in which the first pass is an upward pass, as when the "Manual Run" key 135 is operated, then relay C12 will be energized prior to the pass, opening contacts C12b1 and closing contacts C12a2 and causing the trigger pair to be preset with the right section conducting.

The direction controls are effected by a direction-control relay C4, which is in the anode circuit of the relay-operating tube 464.

The relay-operating tube 464, which is one of the halves of a 6J6 type tube, has its anode connected over the winding of relay C4 to the +150-volt conductor 467, has its cathode grounded, and has its control grid connected over resistor 506, of 220,000 ohms, to the −105-volt conductor 159 and over resistor 507, of 220,000 ohms, to the anode of the left section 463a of the trigger pair.

Accordingly, whenever the left section 463a is conducting, the relay-operating tube 464 will be biased to cut-off, and relay C4 will not be energized, but, whenever the left section is non-conducting, the potential on the control grid of tube 464 will allow the tube to conduct and energize the relay C4. The manner in which the relay C4 controls the direction of feed of the tape will be explained more fully when the control by the relays is described.

*The summary recorder*

The summary recorder for indicating and printing the code number which was used during a pass of the tape, the total of amounts on the tape which were related to this code number, and the number of amounts which were accumulated to form this total is shown in Figs. 1, 15A, 15B, 16, 17, 18F, 18G, 18H, and 18I.

This recorder is essentially the same as the one shown in the co-pending United States patent application of Edward J. Carey and Desmond R. Hearsum, Serial No. 248,984, which was filed on September 29, 1951, now United States Patent No. 2,682,995, issued July 6, 1954, and only so much of the recorder will be described as is necessary for an understanding of the instant invention.

As shown in Figs. 15A and 15B, the printer portion 37, which is located at the left of the summary recorder, is provided with a plurality of type wheels 515, and the indicator portion 36, which is located at the right of the recorder, is provided with a plurality of indicator drums 516.

In Figs. 15A and 15B, the first four indicator drums at the left indicate the four digits of the code number, the next two drums indicate the item count, and the six drums at the right indicate the six digits of the amount. Similarly, the four type wheels at the left print the code number, the two in the center print the item count, and the five at the right print five digits of the total.

Each of the type wheels 515 and indicator drums 516 is provided around its periphery with indicia according to the digits of the notation. In the case of the indicator drums 516, they can be rotated to bring desired digits into viewing position opposite a window (Figs. 1 and 16) in the cabinet, which encloses the summary recorder; and, in the case of the type wheels, they can similarly be rotated to bring the desired digits into printing position.

A system of gearing connects the related indicator drums 516 and type wheels 515 for simultaneous movement to various ones of their positions, so that a related indicating drum and type wheel will be set with the same digit in indicating and printing positions, respectively. This gearing, which is shown in Figs. 15A, 15B, 16, and 17, includes a pair of supporting shafts 517 and 518 and a plurality of bearing disks 519 spaced thereon across the machine, and includes a plurality of individually-rotatable square transmission rods, as 520, which extend across the recorder and are supported in the bearing disks and in suitable supporting plates secured to various side frames of the recorder.

In the embodiment shown, there are twelve indicator drums, but only eleven rods 520, so the drum of the highest order of the accumulated amount, the sixth drum from the right in Fig. 15B, has no connection to a type wheel, and only five digits of the amount will be printed. There is a transmission rod 520 for each of the other related indicator drums and type wheels, a drum and its related type wheel being coupled to their related rod for similar movement as follows:

The indicator drum 516 (Fig. 16), which is the drum for indicating the thousands digit of the amount, has secured thereto a gear 521, which has external and internal teeth, the internal teeth engaging the outside of the bearing disk 519, which serves as a bearing for the gear 521 and for the rods 520. Adjacent the rod 520 which is related to this particular drum, the disk 519 is recessed to receive a gear 522, which is mounted on the rod 520 to rotate therewith and is in alinement with the gear 521 and meshes with its internal teeth. Retaining plates of larger diameter than the disk are mounted on either side of the disk and close thereto, to keep the gears 521 and 522 in alinement.

The type wheel 515 which is related to the drum 516 shown in Fig. 16 is the fourth wheel from the right, as shown in Fig. 15A. This type wheel has a gear 523, which meshes with the external teeth of an external-internal gear 524 (see also Fig. 17), similar to gear 521. The internal teeth of the gear 524 engage a bearing disk 525, which is recessed to receive a gear 526, which is mounted on the rod 520 in alinement with the gear 524 and meshes with its internal teeth. Retaining plates on either side of the bearing disk retain the gears 524 and 526 in alinement.

The above train of gearing between the drum and its related type wheel, including gears 521 and 522, transmission rod 520, and gears 523, 524, and 526, connects the drum and the type wheel for corresponding movement.

A similar train of gearing, utilizing different ones of the transmission rods, as 520, connects each of the other type wheels and related drums for corresponding movement.

Driving means, and sensing means for controlling the operation of the driving means, are provided to position the various related indicator drums and type wheels according to the code number in the stepping switches, the total on the accumulator, and the amount in the counter.

The driving means and the sensing means for each of the related indicator drums and type wheels are contained in a unit, as 530, the units being mounted side by side and secured to a front supporting plate 531 in the indicator portion 36 of the summary recorder, as shown in Figs. 15B and 16.

Since all the units, as 530, are of the same construction, their operation will be clear from the following description of one of them. The unit is constructed and operates substantially the same as the one which forms the subject matter of United States Letters Patent No. 2,617,870, to Jack I. Kern, which issued on November 11, 1952, and to which patent reference may be made for further details if desired.

Each unit is self-contained within a pair of side walls 532 and 533 (Figs. 15B and 16). The driving means includes a shaft 534, journaled in the side walls, which shaft has a driving gear 535 secured to one end thereof and also has a pair of brush carriers 536 secured thereto, the gear 535 being connected through gears 537 and 538, which are connected together by their supporting shaft, to the output gear 539 of a single-revolution clutch to be driven thereby whenever the clutch is operable to couple the drive to the unit.

The clutch, including its driving gear 540 and output gear 539, is mounted on a shaft 541, carried by a bracket secured to the side wall 533.

The ratio between the gears 535, 537, 538, and 539 is such that gear 535 will make one-tenth of a rotation for each rotation of the gear 539.

Gear 535 is connected through an intermediate gear 542 to the gear 521, which is connected to the indicator drum and will drive the drum and related type wheel one tenth of a revolution, to bring a different digit to indicating and printing position, for each rotation of the gear 539.

The single-revolution clutch is controlled by a clutch trip lever 545, which is pivoted on a stud between the side walls 532 and 533 of the unit and can move between a clutch-disengaging position, in which it retains the clutch disengaged, and clutch-engaging position, in which the clutch is allowed to couple the drive to the unit.

The position of the clutch trip lever 545 is controlled by a clutch control solenoid, as CS4 in Fig. 16, which is mounted on a bracket extending from the side frame 533. An armature 546, pivoted at point 547, has one end connected by a link 548 to the clutch trip lever 545. Resilient contacts CS4b1, which are normally closed, urge the armature clockwise (Fig. 16) to position the trip lever 545 in its clutch-disengaging position. Whenever the clutch control solenoid, as CS4, is energized, it will rock its armature 546 counter-clockwise (Fig. 16) to open contacts CS4b1 and also move the clutch trip lever 545 to clutch-engaging position to allow the clutch to couple the drive to the unit.

The driving gears, as 540, of the clutches of the various units mesh with corresponding gears, as 549, on a common drive shaft 550, which is mounted on the front plate 531 and is driven through gears 551 and 552 (Figs. 15A, 16, and 17) by a motor 553, which operates in a read-out operation.

The sensing means includes a commutator 555 (Figs. 15B and 16), which is secured on the inside of wall 533 and which has a central collector ring 556, concentric with the shaft 534, and ten segments 557, spaced equally about the collector ring.

A sensing brush 558, carried by the brush carrier 536, connects the segments to the ring 556 one after another in succession as the carrier 536 rotates, each rotation of the gear 539 causing the brush to move to the next segment.

The manner in which the sensing means controls the drive is shown most clearly in the circuit diagram and in particular in Figs. 18D and 18F, which show in detail the control for setting the indicator drum and the type wheel according to the units digit of the accumulated amount.

The cathodes of the tubes of the counting ring of the units denomination of the accumulator are connected to corresponding segments of the commutator, only the connections from the cathodes of the "0" and "9" tubes being shown, in order to simplify the diagram. The connection from the cathode of the "9" tube to the "9" segment of the commutator extends over a resistor 559, of 250,000 ohms, and conductor 560, which connection is similar to those between the "1" to "8" tubes and their related segments, and the connection from the cathode of the "0" tube to the "0" segment of the commutator extends over a resistor 561, of 100,000 ohms, conductor 562, and resistor 563, of 150,000 ohms. Because conductor 562 also extends to a further circuit for eliminating a read-out and printing operation when the accumulator and the counter stand at "zero," this resistor 563 is included in the circuit between the conductor 562 and the "0" segment 557 to prevent potentials which are applied to the segment by the sensing brush in "0" position, from interfering with the control over the circuit for eliminating a read-out and printing operation.

As explained earlier herein, the particular tube of a ring which is conducting and represents the digit standing in that order will have its cathode more positive than the other tubes of the ring; accordingly, the segment of the commutator which is connected to the conducting tube will have a more positive potential than the rest.

The central collector ring 556 of the commutator is connected to the control grid of a first control tube 554, which is the left section of a 6J6 type of tube. This control tube 554 has its anode connected over a resistor 564, of 100,000 ohms, to the read-out anode potential supply conductor 565, which is connected over a switch 566, which is closed except during a printing operation, and relay contacts C9b7 and C5a4 in series to the +250-volt conductor 92. Contacts C5a4 in this circuit will enable the read-out controls to be operable during a turn-around operation while relay C5 is energized. Switch 566 in this circuit is opened during the printing operation to prevent any change in the setting of the type wheels at this time, and relay contacts C9b7 are opened when relay C9 is energized during a "Manual-Run" operation, to prevent a read-out during the starting or at the end of a manual run.

The cathode of this control tube is connected to ground, and the control grid is connected over a resistor 567, of 1 megohm, and conductor 568 to the −75-volt conductor 295.

The control tube 554 controls a clutch solenoid operating tube 569, which is the right section of the 6J6 tube. The solenoid operating tube 569 has its anode connected over the winding of the clutch solenoid CS1 to the anode potential supply conductor 565, has its cathode grounded, and has its control grid connected over a resistor 570, of 470,000 ohms, to the anode of its related control tube and over a resistor 571, of 470,000 ohms, to conductor 568, from which it is supplied with a potential of −75 volts.

The operation of the sensing means to control the setting of the indicator and type wheel is as follows.

Whenever anode potential is supplied to the control tubes and the clutch solenoid operating tubes, and whenever the brush 558 is on a segment 557 which does not have the positive potential applied thereto, the first control tube 554 will be biased to cut-off and its anode potential will be high. This high potential, which is applied to the control grid of the clutch solenoid operating tube 569, causes it to conduct and energize the solenoid CS1, which releases the clutch to connect the sensing means to the drive for movement to the next segment. If the next segment does not have the positive potential applied thereto, the clutch solenoid will again be energized and the sensing means will be moved to a further segment.

This repeated energization of the clutch solenoid will continue until the brush engages the segment which is connected to the conducting tube of the ring. When the brush 558 engages this segment which has the positive potential applied thereto, the control tube will conduct, and the drop in potential of its anode will cause the clutch solenoid tube to be biased to cut-off, deenergizing the clutch solenoid CS1 and preventing further movement of the sensing brush. As the brush is moved from segment to segment, the indicator drum and the related type wheel will be driven to bring to indicating and printing position a digit corresponding to the value of the segment on which the brush is standing.

The control of the summary recorder from the item counter is the same as the control from the accumulator. In the case of the control from the stepping switches, the commutator segments are connected to corresponding contacts of the banks SS$u$-4, SS$t$-4, etc., (Fig. 18F) of the stepping switches. The stepping switch wipers, which are connected to the +90-volt conductor 455, over conductor 575, and resistors as 576, of 250,000 ohms, apply positive potential to the segments which correspond to the code number set in the switches and cause the operation of the clutch to set the indicator drum and type wheels according to the code number.

It will be recalled that, when the clutch solenoids were energized, they opened their related contacts CS1$b$1 to CS12$b$1. One or more of these contacts will be opened until all the indicator drums and type wheels have been set. As soon as all these contacts are closed, they will complete a circuit which will initiate an operation of the printer portion 37 of the summary recorder, in a manner to be explained more fully hereinafter, to cause the data to be printed on the summary tape.

The control tube 554 and the clutch solenoid operating tube 569, which are the halves of a twin triode and which control the operation of the units, are mounted on the plate 531 just below the related unit, as shown in Fig. 16.

At the beginning of each pass of the tape, the accumulator and the counter are cleared and reset to zero when the relay contacts A1$a$2 to A1$a$9 are closed momentarily, as explained earlier herein. If, during the pass of the tape, no entries thereon were sensed which were related to the code number set on the stepping switches, then no amount would have been entered into the accumulator, and the counter would not have been operated, leaving both in their zero condition. Under these circumstances, it is desirable to eliminate the read-out operation and the printing operation of the summary recorder and to provide necessary controls to bring about immediately those further operations of the machine which normally follow a read-out operation.

In addition to controlling the position of the indicator drums and type wheels in a read-out operation, the conductors, as 562, from the "0" tubes of the accumulator and counter also are effective to control a further circuit for preventing the read-out and printing operations and for providing the necessary control signals. The conductors, as 562, extend to the cathodes of diodes, as 577, each of which constitutes one half of a 6AL5 tube. The anodes of the diodes are connected together by conductor 578 and over point 579, resistor 580 of 20 megohms, point 581 and conductor 582 to the +150-volt conductor 74.

This circuit, which includes the diodes, is used to control the conductivity of an eliminate relay operating tube 583, which is half of a 2C51 type tube and which, when conducting, energizes the eliminate relay R6.

Tube 583 has its anode connected over the winding of relay R6 to the conductor 582, which goes to the +150-volt conductor 74, has its control grid connected to point 579 in the anode circuit of the diodes, and has its cathode connected to ground over a resistor 584, of 5,000 ohms.

Bias is supplied to tube 583 by a tube 585, which constitutes the other half of the 2C51 type tube. Tube 585 is connected in parallel with tube 583 by having its anode connected over point 581 to conductor 582 and by having its cathode connected to ground over the resistor 584, which is common to the two cathodes. The control grid for tube 585 is connected to a tap of a one-megohm potentiometer 586, which is connected between point 581 and ground. Conduction in tube 585 can be controlled by the potential supplied to its control grid from the potentiometer, and this in turn will control the cathode potential of both tubes and determine the threshold for operating tube 583 from the circuit including the diodes.

When all the denominations of the accumulator and counter stand at zero, with the "0" tubes conducting, the cathodes of the diodes will be sufficiently positive that there will be no conduction across the diodes, and there will be no potential drop across resistor 580; consequently the potential of the control grid will be sufficiently positive that tube 583 will conduct and energize relay R6. However, as soon as an entry is made in any order of the accumulator or the counter and the "0" tube in that order is extinguished, the cathode of that tube will become negative and will cause the cathode of the diode connected thereto to become sufficiently negative to cause conduction in the diode, with a consequent drop across resistor 580 sufficient to cause the grid of the tube 583 to become negative with respect to its cathode, thereby biasing tube 583 to cut-off and deenergizing the relay R6. The manner in which relay R6 exerts its control will be explained more fully when the cooperation of the control relays is described.

It is to be noted that by inserting the resistor 563 between the commutator segment and conductor 562 for the "0" tube, the negative potential on the grid of the tube 554 will not be effective to prevent the proper control of the diode from the "0" tube, even though the sensing brush be standing on the "0" commutator segment.

The eight diodes 577 are included in four tubes mounted on a shelf 587, which extends from the front of the plate 531. Also mounted on the shelf 587 is the twin triode containing the eliminate relay operating tube 583 and its biasing tube 585.

The electrical connections from the cable which joins the summary recorder unit 26 to the unit 25 are made through suitable plugs, the portions of the plugs on the summary recorder being shown at 588 in Figs. 15B and 16.

The printer portion 37 of the summary recorder is shown particularly in Figs. 15A and 17. This portion is supported above the base of the summary recorder by means of suitable supporting plates 595 (Fig. 17), the space beneath the printer portion being occupied by the motor 553 and by a panel 596, on which certain of the control relays, as R1, for example are mounted.

Means are provided in the printer portion of the recorder to support a supply of record material 597 for movement to and from printing position and to linespace the record material each time it is moved to printing position. The paper-supporting framework consists of a pair of rockable end plates 598 and 599 (Fig. 15A) and a plurality of guide rods, as 600 and 601, which are effective to move the record material 597 from normal position, as shown in Fig. 15A, to printing position, closely adjacent the type wheels 515, each time the printer portion is operated.

Also carried by the rockable frame is a printing platen 602, which is rocked with the frame from the position shown in Fig. 15A to a position opposite the printing line. When opposite the printing line, the platen 602 can be operated to cause the data set on the type wheels to be printed.

The paper-supporting means and the platen and its operating means are fully shown in the Carey and Hearsum application Serial No. 248,984, now Patent No. 2,682,995, mentioned earlier herein, and reference may be had thereto for further details if desired.

A pair of intermediate supporting plates 603 and 604 (Fig. 15A), which support the shaft on which the type wheels rotate, also support a pair of aliner-bar-supporting arms 606, mounted on a shaft 605, which support an aliner bar 607 for movement into engagement with the type wheels while an impression is being taken from the type wheels.

The switch 566 (Fig. 17), which is in the anode circuit of the clutch solenoid control and energizing tubes, is maintained in its closed position by the aliner bar 607 in its unoperated position, as shown in Fig. 17, but this switch will be opened as soon as the aliner bar moves to engage the type wheels in a printing operation.

The printer portion is driven by a motor 610 (Fig. 15A) to make impressions on the summary record. As soon as the read-out operation has been completed, control relays will be operated, in a manner to be explained fully when the control relays are described, and will energize a solenoid 611 (Figs. 15A and 17) to pull down a printer trip member 612, which will move a lug 613 thereon below the upper curved end of a clutch release lever 614 to allow the clutch release lever to pivot counter-clockwise to release a clutch pawl 615 to couple the drive from the motor-driven shaft 616 to the main drive shaft 617. When the clutch release lever 614 is allowed to rock, its upper curved end will engage over the lug 613 on the trip member 612 to retain the trip member in its operated position.

The clutch release lever 614 has a forward arm 618, which, when the lever rocks counter-clockwise, closes contacts 619 in the circuit to the motor 610 to cause the motor to operate.

As soon as the trip member 612 has been operated far enough to release the clutch release lever 614, the lower edge of the trip member will close a switch 620, which will cause the solenoid 611 to be deenergized.

A stud 621 on a plate 622 on the main drive shaft 617 engages a restoring arm 623 on the clutch release lever near the end of a rotation of the main shaft 617 and rocks the clutch release lever clockwise to clutch-disengaging position, in which position its upper curved end is moved from over the lug 613 on the trip member and allows the trip member to return to blocking position.

The main drive shaft 617 (Fig. 15A) has thereon two clusters of cams, 624 and 625, for rocking the arms 606 to move the aliner bar into and out of engagement with the type wheels. Also mounted on the main drive shaft 617 is a cam 626, which operates an operating linkage 627 for rocking the record-material-supporting carriage to printing position, and a cam 628 for operating the link 629 to move the platen 602, which has been positioned opposite the type wheels, to take an impression therefrom.

Accordingly, each time the trip member 612 is operated, it will initiate a printing operation in which the summary record will be line-spaced, and an impression will be taken from the type wheels which have been set during the read-out operation.

Control relays

The operation of the various parts of the machine in performing the several types of analysis is coordinated and controlled by a plurality of control relays, some of which have been referred to earlier herein. The manner in which the relays function to exert their control will best be explained by a consideration of certain typical operations.

Substantially all the control relays are included in that portion of the circuit diagram which is shown in Figs. 18H, 18I, and 18J. Those relays which are shown across the top of these figures are D.C. relays, while those which are shown across the bottom are A.C. relays.

In order to identify the contacts which are related to and are operated by the several relays, they will be numbered with the number of the relay, followed by a letter indicating the type of contact—"a" for normally open, "b" for normally closed, and "c" for make-and-break—and finally with a number indicating the particular contact of the relay. In those contacts which are "c" contacts, a further letter will be added to the number to indicate whether the contact is the normally-closed contact which is broken or the normally-open contact which is made. For example, contacts D$a$1 are contacts which are operated by relay D, are normally open contacts, and are the number 1 contacts associated with the relay; and contacts S5$c$1$b$ are those which are operated by the relay S5, are "c" or make-and-break contacts, are the number 1 contacts associated with the relay, and are the normally closed contacts of the make-and-break type.

The machine is prepared for operation by moving an On-Off switch (Fig. 18I) to "on" position, in which it connects a 110-volt A.C. source of operating potential to conductors 635 and 636, which supply operating potential to the group of A.C. relays and to the various motors of the tape-feeding means and the summary recorder; connects the A.C. source over conductors 637 and 638 and transformer and rectifier to provide +90 volts D.C. to conductor 455, which supplies operating potential for the group of D.C. relays; and also connects the source of potential over suitable conections, not shown in Fig. 18J, to the power supplies 33 and 34 (Fig. 2), which supply the D.C. operating potentials to the various terminals shown throughout the circuit diagram.

As soon as the On-Off switch is operated, several relays and other control means are automatically operated to prepare the machine for proper operation.

Application of the +90 volts to conductor 455 will cause the accumulator and counter reset relay A1 (Fig. 18H) to be energized over the normally-closed contacts A2$b$1. As explained earlier herein, contacts A1$a$2 to A1$a$9 of relay A1 apply +200 volts to the control grids of the "0" tubes in the various orders of the accumulator and counter for causing them to be fired to reset the accumulator and counter to zero, and contacts A1$b$1 open the anode circuit to the transfer storage tubes of the accumulator to prevent tens transfers from being stored therein due to the firing of the "0" tubes in the resetting operation.

Contacts A1$a$10 (Fig. 18H) prepare a circuit over contacts C1$b$5, C14$b$2, and C6$b$1 for the energization of relay A2, but this circuit remains open at contacts R6$a$1 until all the "0" tubes have actually been fired and the read-out and printing operation eliminate relay R6 has been energized in the manner explained earlier herein when the read-out and printing operation elimination controls were described.

When relay A2 is energized, it will open the contacts A2$b$1 in the circuit to relay A1 to deenergize relay A1.

Relay A2, when energized, also will close contacts A2$a$2 to complete a holding circuit for relay A2 over contacts C1$b$5, C14$b$2, and C6$b$1. This circuit will cause relay A2 to remain energized and open contacts A2$b$1 in the circuit to relay A1 until another accumulator reset operation is required, at which time one of the relays C1, C6, or C14 will interrupt the holding circuit for relay A2 to deenergized relay A2, which will in turn allow A1 to operate and cause the accumulator and counter to be reset.

The energization of relay A1 and then relay A2 when power is applied to the machine not only sets the accumulator and counter to an initial "0" condition but also insures that the relays A1 and A2 will operate in proper sequence whenever resetting is required when an analysis is to be made.

Application of the 110 volts A.C. to the conductors 635 and 636 will, through the transformer 639 (Fig. 18I), cause current to flow in a signal lamp 640 (Figs. 1 and 18I), which indicates that power has been applied to the machine, will energize transformers, as 641 (Fig. 18I), for supplying heater current to the tubes, and will cause the following initial operations to take place in the preparation of the machine for analysis.

The shutter-shifting solenoid 62 (Figs. 3 and 18H) will be energized over contacts C4b1 to shift the shutter 60 downwardly to prepare the sensing means for a downward pass of the tape.

The blower motor 73 (Figs. 4 and 18H) in the sensing means will be set in operation, and the lamp 68 will be lighted over a circuit which includes the relay C11, which will be energized. Relay C11 is a lamp failure signal relay which will remain energized as long as the lamp is lighted. When relay C11 is energized, it opens contacts C11b1 in the circuit to an emergency stop relay C8 and allows the relay to become deenergized when other controls are exerted thereon at the beginning of an analysis; but, when the lamp fails due to its filament's being interrupted, relay C11 allows contacts C11b1 to close to energize the relay C8 to stop the machine immediately.

The upper brake-release solenoid 104 (Figs. 4 and 18H) will be energized over contacts S3b2 and will release the upper brake whenever the direction switch DS–1 is set for a downward pass.

Relay S1 will be energized initially over contact S6b2 and will open its contact S1b1 in the circuit to relay S2 to deenergize relay S2 if it was energized. Contacts S6b1 insure that the relay S1 of the two cooperating relays S1 and S2 will be energized when power is applied to the machine. Relays S1 and S2 cooperate in controlling application of power to the tape feed motors and have a particular operating sequence during the feeding of the tape back and forth during an analysis.

Relay S6 is connected over conductor 642 (Figs. 18F and 18H) to the +150-volt terminal, which will have potential supplied thereto from the power supply 33, as soon as the filaments therein have heated properly, and will be energized shortly after the power is applied to the machine by the On-Off switch. Relay S6 will remain energized until power is removed from the machine by operating the On-Off switch to "off" position. Accordingly, contacts S6b1, which will open shortly after power is supplied, will be effective to insure an initial operation of relay S1 but will not affect the operation of relays S1 and S2 thereafter during the analysis.

Relay S1 closes a holding circuit for itself over contacts S1a1 and C3b1 and will remain energized until relay C3 is energized to start tape feed.

Application of potential of conductors 635 and 636 will also cause relay R3 (Fig. 18I) to be energized over contacts R2b2 and R4b2 to initiate a preliminary printing operation which prepares certain printer control relays for further automatic operation.

Relay R3 closes contacts R3a1 to complete a circuit over contacts R2b2 to the solenoid 611, which initiates an operation of the printer portion to take an impression from the type wheels, as described earlier herein.

Relay R3 also closes contacts R3a2 in the circuit to relay R4 over contacts R2b2 and the micro-switch 620, which is closed by the printer trip member 612 (Fig. 17) when the drive for the printer portion has been completely tripped.

Relay R4 will be energized when the switch 620 is closed and will close a holding circuit for itself over contacts R2b2 and R4a1. It also opens contacts R4b2 in the circuit to relay R3, deenergizing relay R3, which in turn opens contacts R3a1 to deenergize the solenoid 611.

This operation of the printing portion with the energization of relay R4 and deenergization of relay R3 prepares the printing portion control relays for further automatic operation.

Application of potential to conductors 635 and 636 also causes a delay means to operate to delay the application of certain potentials until heaters for the tubes have had time to heat properly and until other potentials have been applied in order that the parts will be properly conditioned for operation each time the machine is put into operation by the operation of the On-Off switch to "on" position. When potential is supplied to the conductors 635 and 636, current will flow through a heater 643 (Fig. 18I) of a thermal delay device, which heater will heat a thermal-responsive element 644, causing it to open its contact 644b and close its contact 644a after a predetermined time of, for example, about 20 seconds. Closure of contact 644a will complete a circuit to relay D, which is energized and closes a holding circuit over its contact Da1 and opens contact Db2 in the circuit to the heater 643 to allow the thermal-responsive element to cool. The cooling of the element 644 will open contacts 644a and will reclose contacts 644b after another predetermined time of, for example, 10 seconds.

As soon as the thermal-responsive element 644 has reclosed contact 644b, an A.C. delay control relay COO will be energized by a circuit over contacts Da1 and 644b.

Control relay COO, when energized, will close contacts COOa1 (Fig. 18H) in the circuit of a D.C. delay control relay CO, which is energized.

It is to be noted that relays D, COO, and CO remain energized until the On-Off switch is moved to "off" position to disconnect the machine from the 110-volt A.C. source.

The D.C. delay control relay CO delays application of D.C. operating and bias potentials to prevent premature operation of certain of the parts and to cause the proper operation of others.

Contacts COa1 (Fig. 18D) apply the +105-volt anode potential to the tubes of the accumulator and counter after their cathodes have been heated and after the resetting potentials have been applied to the "0" tubes of the different denominations. The "0" tubes will be fired at this time, causing relay R6 to be energized and in turn energize relay A2 to deenergize relay A1, as explained above. Deenergization of relay A1 opens contacts A1a2 to 9 to remove resetting potential from the "0" tubes and closes contacts A1b1 to supply anode potential to the tens transfer storage tubes. With relay A1 deenergized, the accumulator and counter are conditioned to receive entries according to data on the tape. When relay A2 was energized, it closed its holding circuit over contacts C1b5, C14b2, and C6b1.

Contacts COa2 (Fig. 18C) close the bias supply circuit to the sides 461a and 463a of the reversing control trigger pair and direction-controlling trigger pair after these sides have been initially made conducting by withholding bias therefrom.

Contacts COa3 (Fig. 18C) close the circuit to the turn-around operation control relay C5 to enable this relay to be operated under control of the reversing control trigger pair after the initial presetting thereof.

Contacts COa4 apply +105-volt anode potential to the tubes of the code number storage chains after their cathodes have been heated.

Contacts COa5 connect ground to start relay C1 and auxiliary manual-run operation control relay C9 to enable these relays to operate only after the machine is ready.

Contacts COa6 (Fig. 18I) connect a signal lamp 645 in parallel with the lamp 640 to be lighted therewith.

The lighting of the lamp 645 signifies that the machine is ready to be operated.

The various types of operations which the machine can perform will now be described.

As shown in Fig. 1, the unit 25 is provided with a plurality of control keys for controlling the various operations of the machine.

One of these keys is the Start key 137, which is operated to start an analysis of data on the tape according to a particular code number or a group of code numbers as determined by the setting of the start and stop code number switches. This key starts an analysis with a downward pass of the tape, and it is essential that the tape be on the upper reel 80 when it is operated.

Another of these control keys is the Manual-Run key 135. This key initiates an operation of the machine in which an upward pass of the tape is made. It is used to cause the operation of the machine to transfer a tape from a spool to the upper reel when a tape is introduced into the machine. It is also used to feed the tape from the lower reel to the upper reel if, for any reason, the machine has stopped with the tape on the lower reel; and in this type of operation the tape feed will stop automatically at the end of the upward pass. If the tape is on the upper reel with its lower end still fastened to the lower reel, and it is desired to remove the tape from the machine, the Manual-Run key will cause an upward feed of the tape to remove it completely from the lower reel; and in this type of operation the machine will not shut down automatically but will require the operation of the Emergency Stop key 136.

The Emergency Stop key 136 can be operated at any time when the machine is in operation, and will stop the machine immediately. One use of the key is to stop the operation of the machine after an operation of the Manual-Run key when a tape is introduced into the machine, or in an operation in which the tape is completely fed from the lower reel 81.

The remaining control key of the group is a Stop key 138, which, when operated during a pass of the tape, will terminate further analysis of the tape at the end of the pass regardless of the direction of the pass.

In order to make an analysis in an operation which is initiated by the Start key 137, it is necessary that the tape be on the upper reel 80 because the first pass in such an operation is always a downward pass.

Before the analysis is begun, the starting code number switches 145$th$ to 145$u$ are set according to the first code number of the group of code numbers to be used in the analysis, and the stopping code number switches 148$th$ to 148$u$ are set according to the last code number to be used in the analysis.

The Start key 137 (Figs. 1 and 18H) is operated to initiate the analyzing operation. The key 137 closes a circuit over contacts C2$b$1 to energize start relay C1, which, when energized, causes the code number storage chains, the accumulator, and the counter to be reset to zero; causes the reverse-control trigger pair 461$a$—461$b$ to be preset to the condition in which it should be at the beginning of a pass; causes the direction control trigger pair 463$a$—463$b$ to be preset for a downward pass of the tape; prepares the stepping switches for setting to the starting code number; releases the emergency stop relay C8 if it had been energized; and energizes an auxiliary start control relay C2 in the following manner:

Contacts C1$a$2 (Fig. 18B) are closed to apply +90 volts to capacitor 454 to cause the operating flip-flop 214$a$—214$b$ to operate, which flip-flop sends a strong positive impulse over conductor 208 to fire the "0" tube in each of the code number storage chains; sends an impulse over conductor 354 to initiate an operation of the chain of transfer-actuating tubes; and sends an impulse over conductor 393 to the counter input, which impulse will be ineffective to cause an entry at this time, inasmuch as the gates to the accumulator had not been opened.

Contacts C1$a$3 (Fig. 18C) are operated to preset the reverse-control trigger pair 461$a$—461$b$ with the section 461$a$ conducting, which is its proper condition of this trigger pair prior to a pass of the tape.

Contacts C1$a$4 (Fig. 18C) are operated to preset the direction-control trigger pair 463$a$—463$b$ with the section 463$a$ conducting. With this trigger pair in this condition, tube 464 will be non-conducting and the direction control relay C4 will be deenergized, allowing contacts C4$b$1 (Fig. 18H) to close and energize the solenoid 62, which pulls the shutter 60 downward to condition the sensing means for sensing the tape in a downward pass thereof and allowing contacts C4$a$2 to be opened to deenergize direction control relay S5, which controls to which tape driving motor power will be supplied.

Contacts C1$b$1 (Fig. 18I) will open holding circuits for relays C17, C20, C23, and C26 in the stepping switch operating circuit and thus prepare the stepping switches for setting to the new starting code number.

Contacts C1$b$5 open the holding circuit for relay A2, and the deenergization of relay A2 energizes relay A1, which in turn closes its contacts to reset the accumulator and counter in the manner explained earlier herein.

Contacts C1$b$7 open the holding circuit for the emergency stop relay C8 to insure that this relay will be released if it had been used in stopping the previous operation of the machine and thus prepares the machine for further operation.

Contacts C1$a$6 (Fig. 18H) complete the energizing circuit to an auxiliary start control relay C2.

Control relay C2 will remain energized during the analyzing operation and will be deenergized only under the following conditions: when relay C7 is energized to indicate that the last code number of the group has been used in the analysis; when the emergency stop relay C8 is operated, as when the key 136 is operated or there is a lamp failure; or when relays C13 and C5 are both energized at the end of a pass of the tape in a normal stop operation when the Stop key 138 has been operated and has energized the stop relay C13.

Control relay C2, when energized, deenergizes relay C1; closes a holding circuit for itself over contacts of relays C7 and C8 in series with contacts of relays C5 and C13 in parallel; partially closes a circuit to tape-feed motor power supply relay C3; closes the circuit for setting the stepping switches under control of the starting code number switches; and prepares a holding circuit for relay C13 in the following manner:

Contacts C2$b$1 open the circuit over the Start key 137 and cause relay C1 to be deenergized.

Contacts C2$a$2 close a holding circuit for relay C2 over contacts of relays C7 and C8 in series and contacts of relays C13 and C5 in parallel.

Contacts C2$a$3 partially close the energizing circuit for relay C3.

Contacts C2$b$5 open a circuit over contacts C12$a$3, but this circuit is not used in this operation.

Contacts C2$a$6 prepare a holding circuit for relay C13.

Contacts C2$a$4 close the circuit through the notched contact members 147$th$ to 147$u$ of the starting number setting switches to cause the stepping switches to step the wipers until they engage the contacts of banks SS$u$–1 to SS$th$–1, at which time the circuits are opened by the notched portions of the contact members. This will cause the stepping switches to be operated to positions corresponding to the starting code number. As the various stepping switches are operated, they will cause one or more of their relays C15, C18, C21, and C24 to be energized to open their contacts C15$b$1, C18$b$1, C21$b$1, and C24$b$1 in the energizing circuit of relay C3, which relay controls the application of power to the tape feed motors 98 and 109.

The energizing circuit to relay C3, which is partially completed by the closure of contacts C2$a$3, also extends over "b" contacts of the relays C15, C16, C18, C19, C21, C22, C24, and C25 of the operating circuit of the stepping switches, which prevent the energization of relay C3 until the stepping switches are completely set; extends over the contacts A2$a$3, which prevent the energization of relay C3 until the completion of an accumulator and counter resetting operation; extends over contacts C5$b$2, which are opened by the turn-around-control relay C5, which is energized at the end of each pass to set in operation the controls which are utilized at this time; and extends over contacts C7b2 of the control relay C7, which automatically stops the apparatus when the stepping switches have been set to the stop code number.

The relay C3, therefore, will be energized when relay C2 is energized, as soon as the stepping switches have completed their setting operation and when the accumulator and counter have been reset and are ready to receive entries and will be deenergized when relay C5 is energized during a turn-around operation and when relay C7 is energized when the last number of a group of code numbers has been set in the stepping switches.

Energization of relay C3 closes its contacts C3a3 (Fig. 18H) in the circuit to the tape-driving motors 98 and 109, which circuit is completed selectively through the proper one of the motors under control of the contacts S5c1a and b. As explained earlier, the relay S5 will be deenergized at this time along with relay C4, so that the circuit is completed through contacts S5c1b to cause the lower motor 109 to operate and drive the tape in a downward pass. The contacts C3a3 also complete a circuit which energizes an auxiliary brake control relay S4 to close contacts S4a1, which, through the contacts of brake control relay S3, cause both upper and lower brakes to be released whenever either the upper or the lower tape-driving motor is energized. At this particular time, the downward movement of the tape will have caused the direction switch DS1 (Figs. 4, 13, and 18H) to be in its lower position, as shown in Fig. 18H, in which position a circuit is completed over the upper contacts of the direction switch DS1 to energize the relay S3, which operates its contacts S3a1, S3b1, S3a2, and S3b2 to control the energizing circuits for the brake solenoids 104 and 116 for a downward pass.

Relay C3 also closes contacts C3a2 (Fig. 18B) to connect the cathodes of the amplifier-shaper tubes, as 155, related to the code number storage chains, to ground, to render these tubes operable. By thus disabling these amplifier-shaper tubes until the pass of the tape, improper entries in the code number storage chains due to undesirable signals from the sensing means (or other sources) are prevented.

Relay C3 also opens its contacts C3b1 to deenergize both relays S1 and S2 and prepare them for operation in proper sequence to control the application of power to the motors during a turn-around operation.

As soon as power is supplied to the motor 109, the lower reel 81 will be driven to feed the tape downwardly.

The first perforation which will be sensed on the tape is the perforation 45 in the leader 44, and this will cause the reversing control trigger pair 461a—461b to operate, causing the section 461b to become conducting and the section 461a to become non-conducting.

The next perforations on the tape which will be sensed will be those representing the code number of the first entry on the tape. These will cause the code number storage chains to be set according to the code number. The coincidence circuit immediately compares the number set in the storage chains with the number set on the stepping switches and controls the gate tubes in the accumulator to open the gates if the sensed code number agrees with the one set on the switches.

The amount perforations for the first entry on the tape will be sensed immediately after those of the code number. The comparison circuit operates so rapidly that the decision as to whether or not the amount will be entered is made after the code number is sensed and before the amount is sensed and while the tape continues in operation. If the accumulator gates have not been opened, then the amount which is sensed will not be entered into the accumulator, but, if the gates have been opened, indicating agreement between the sensed code number and the number set on the stepping switches, the sensed amount will be entered into the accumulator.

After the amount perforations have been sensed, the control perforation in channel 1 will be sensed and will operate the operating flip-flop 214a—214b. As explained earlier herein, this will cause an impulse to be sent to the tens-transfer-operating chain to effect any transfer operations which may be required; will cause an impulse to be sent to the counter to enter a value of "one" therein if the gates had been opened; and will cause an impulse to be sent to the "0" tubes of the code number storage chains to reset the chains to zero to prepare the chains so that they can store the code number of the next entry on the tape when it is sensed.

The tens transfer operating chain operates while a space 42 (Fig. 6) between entries on the tape is passing the sensing means and causes all required transfer entries to be made and the transfer means to be restored to starting condition.

The remaining entries on the tape will be sensed in like manner and will cause the sensed amounts to be entered into the accumulator and a value of "one" to be entered into the counter each time the sensed code number agrees with the code number set on the stepping switches.

After the last entry on the tape has been sensed, the large perforation 45 in the leader 43 will be sensed and will cause the reversing control trigger pair 461a—461b to operate, causing section 461a to become conducting and section 461b to become non-conducting.

As section 461a becomes conducting, its anode potential will drop, and a negative impulse will be sent to the direction control trigger pair 463a—463b to cause it to operate to render section 463a non-conducting and section 463b conducting. When section 463a becomes non-conducting, its anode potential will rise, and this rise is impressed on the control grid of relay-operating tube 464, causing it to conduct and energize the direction control relay C4 in preparation for an upward feed of the tape. Relay C4 in turn closes contacts C4a2 to energize relay S5, which remains energized throughout the upward pass of the tape.

When section 461b becomes non-conducting, its anode potential rise is sent over conductor 496 and capacitor 495 as a positive impulse, which will fire the relay-operating tube 462 and energize the turn-around operation control relay C5. Relay C5 will remain energized until contacts C6b2 in its energizing circuit are opened when relay C6 is energized.

Relay C5, when energized, will control the tape-feeding means to cause a turn-around or reversal of the tape feed; will initiate a read-out operation of the summary recorder; will cause a value of "one" to be added to the code number which is set in the stepping switches; and will exert other controls which are necessary during a turn-around operation.

The manner in which relay C5 controls the tape-feeding means will now be explained.

Contacts C5b2 will open the circuit to the relay C3, which will cause relay C3 to become deenergized and open contacts C3a3 (Fig. 18H) in the tape feed motor circuit to remove power from both motors.

It will be recalled that relay S5 was energized when relay C4 was energized as a result of sensing the second perforation 45 on the tape at the end of the downward pass of the tape. When relay S5 was energized, it shifted its contacts S5c1a and S5c1b and its contacts S5c2a and S5c2b. Contacts S5c1a and S5c1b control to which tape feed motor power will be applied and are of the make-before-break type, so that, during the shifting of the contacts to open S5c1b and to close contacts S5c1a, power will be applied momentarily to both motors and then to the upper motor 98 until contacts C3a3 open.

When power is removed from the tape feed motors, relay S4 will be deenergized and will open the circuit over S3a1 to the upper brake solenoid 104 to allow the upper brake to become effective to assist in stopping the downward feed of the tape.

As soon as relay C3 is deenergized, contacts C3b1 (Fig. 18H) close and cause relay S2 to be energized. Contacts S2a1 apply power to the upper tape driving motor 98, since the contact S5c1a has been closed, and will start the upward feed of the tape.

Contacts S2a2 close and, since contacts S5c2a have been closed, prepare a circuit which will be closed by the direction switch DS1 upon the initial upward movement of the tape and will energize relay S1.

Energization of relay S1 opens contacts S1b2 to deenergize relay S2, which opens contacts S2a1 to stop further upward feed of the tape after its initial upward feed. Relay S1 closes a holding circuit over contacts S1a1 and C3b1 to maintain relay S1 energized and relay S2 deenergized.

The direction of the tape feed will have been reversed, and further upward feed will have been terminated until read-out and accumulator-resetting operations have been completed and until the code number in the switches has been advanced by the entry of "one" therein, at which time relay C3 can be reenergized to supply power to the upper tape driving motor to cause an upward pass of the tape.

The manner in which relay C5 controls the read-out operation to set the summary recorder according to the code number and according to the amounts in the accumulator and the counter will next be explained.

Contacts C5a4 (Fig. 18F) close the anode potential supply circuit to the control tubes and the clutch solenoid operating tubes of the summary recorder and render them operable to control the setting of the indicator drums and type wheels in a read-out operation. These contacts also apply +250 volts over conductor 650 (Figs. 18F and 18G), resistor 651, of 20,000 ohms, and the winding of relay R1 to the anode of the delay relay operating tube 652 of the GL5663 type. Conductor 650 is also connected to the control grid of tube 652 by means of a delay network.

In this delay network, point 653, which is connected to the grid of the tube 652 over a resistor 654, of 470,000 ohms, is connected over a resistor 655, of 750,000 ohms, to the −75-volt conductor 295, which applies the normal bias to the tube, is connected to conductor 650 over a 1-megohm resistor 656 to supply +250 volts to the network to fire the tube, and is connected to ground over a capacitor of .1 microfarad, which delays the effect of the application of the +250 volts so that tube 652 fires after about a one-tenth-second delay. This delay in the energization of relay R1 will keep the contacts R1a1 open long enough to insure that there will be a read-out operation before any printing operation can be initiated.

Contacts C5a5 will close in the energizing circuit to the read-out and printing-operation-initiating relay R5.

It is to be noted that, if none of the code numbers on the tape correspond to the code number set on the stepping switches and no amounts were entered in the accumulator during the pass, then relay R6, which was energized when the accumulator was reset prior to the pass of the tape, will still be energized and will open contacts R6b3 to prevent relay R5 from being energized, thereby eliminating an operation of the summary recorder, if no entries were made in the accumulator during the pass. If there has been an entry in the accumulator during the pass, then the closure of contacts C5a5 will complete the energizing circuit to relay R5, which will immediately be energized to initiate the read-out cycle.

Contacts R5a1 (Fig. 18I) close and energize relay R2, which in turn closes contacts R2a1 in the circuit to the motor 553 (Figs. 17 and 18I), which drives the indicator drums and type wheels during a read-out operation.

Relay R2 also opens contacts R2b2 to deenergize relay R4 and prepare the printing-operation-initiating circuit to relay R3 for operation as soon as relay R2 is deenergized after the read-out operation. Relay R2 will be deenergized when relay R5 is deenergized either by the opening of contacts C5a5 upon the deenergization of relay C5 or by the opening of contacts R6b3 upon the energization of relay R6 when the accumulator has been reset to zero. When contacts R2b2 reclose, relay R3 and solenoid 611 will be energized to initiate a printing operation and will, in turn, cause relay R4 to be energized, as has been explained. The operation of the summary recorder to print the data which was set up during the read-out operation will take place during the next pass of the tape.

The manner in which relay C5 will cause an entry in the units order stepping switch to add "1" to the code number set therein will now be explained.

Contacts C5a1 (Fig. 18I) close the energizing circuit to relay C16, which closes contacts C16a1 in the energizing circuit to the units stepping switch operating magnet SSu−m to cause the stepping switch to be advanced one increment, as explained earlier. Relay C16 will close contacts C16a2 to cause relay C17 to be energized and close contacts C17a1 to prepare the tens transfer circuit, over which the tens order stepping switch will receive an entry each time the units order stepping switch is operated beyond its capacity and momentarily closes contacts SSu−t.

Relay C16 also opens contacts C16b3 in the energizing circuit to relay C3 to prevent further tape feed until the value has been entered in the stepping switches, and closed contacts C16a3 in the circuit to relay C6, which circuit will be completed in one of several ways, as will now be explained.

Contacts C5a3 are in series with contacts C16a3 in the energizing circuit of relay C6 and prepare the energizing circuit for relay C6, which may be completed selectively over any of the following three paths: (1) over contacts R1a1 and the clutch solenoid contacts CS1b1 to CS12b1 in series, which path will be completed at the end of a read-out operation if an amount has been entered in the accumulator during a pass; (2) over contacts R6a5 if no amount has been entered in the accumulator during the pass; and (3) over contacts C9a3 at the end of a pass in a Manual-Run operation, which circuit is not used in the automatic analysis now being considered.

Energization of relay C6 will occur, therefore, when all the operation incidental to a turn-around operation will have been completed. Energization of relay C6 will open contacts C6b1 in a holding circuit for relay A2 to initiate an accumulator and counter resetting operation; will open contacts C6b2 in the energizing circuit for relay C5 to release this relay and extinguish the tube 462; and will close contacts C6a3 in a holding circuit for relay C6 over contacts R6b4, which maintains relay C6 energized until the accumulator and the counter have been reset to zero.

When the entry has been made in the stepping switches and relays C16, C19, C22, and C24 have been deenergized, when relay A2 is re-energized after the accumulator has been reset, and when relay C5 is deenergized, relay C3 will be energized to supply power to the upper tape driving motor 98, since the contacts S5c1a have been closed, to cause an upward pass of the tape.

When relay C4 was energized at the end of the downward pass, it not only energized relay S5 but also opened contacts C4b1 (Fig. 18H) to deenergize the shutter solenoid 62 and allow the shutter 60 to be moved by the spring 61 to its upper position, which is the proper position for sensing the data on an upward pass of the tape.

In the upward pass of the tape, the first perforation to be sensed will be the perforation 45 in the leader 43, which will reverse the operating condition of the reversing control trigger pair 461a—461b to cause section 461a to become non-conducting and section 461b to become conducting.

Due to the shifting of the shutter 60 to its upper position at the end of the downward pass, the phasing of the sensing of the code number, the amount, and the control perforation will be reversed, so that in the upward pass of the tape the code number for each entry will be sensed first, followed by the amount and then by the control perforation, which is the same sequence as in the downward pass. In the upward pass, however, due to the arrangement of the slots in the slide 60, the control perforations in channel 11 will be used instead of the control perforations in channel 1.

In this upward pass, those amounts will be accumulated whose code number has a value of "one" more than the code number used during the downward pass.

As soon as the last entry on the tape has been sensed, the perforation 45 in the leader 44 will be sensed and will operate the reversing control trigger pair 461a—461b to cause section 461a to conduct and section 461b to become non-conducting, which, as before, causes the turn-around relay C5 to be energized and also sends an impulse to the direction-controlling trigger pair 463a—463b to cause it to operate and reverse the conducting status of its sections, making section 463a conduct, with the consequent cut-off of relay control tube 464 and deenergization of direction control relay C4.

It is to be noted that brake control relay S3 will not be energized during the upward pass of the tape because the upward feed of the tape will have positioned the direction control switch DS1 so as to open the circuit to the relay. Accordingly, contacts S3b1 and S3b2 will be closed, and the brakes will be controlled so that the solenoid 116 will be deenergized immediately when power is interrupted to the tape feed motors, enabling the brake to be applied to the lower or trailing reel.

The operations initiated or controlled by the relay C5 will be the same as explained above, but in this turn-around operation relays C4 and S5 will be deenergized and contacts S5c1b and S5c2b will be closed. During this turn-around, the code number and the amounts will be printed if any entries have been made in the accumulator and the counter, and the amount of the code number set on the stepping switches will be advanced by a value of "one" in preparation for the next pass.

As soon as the turn-around operation has been completed, the next pass will begin.

These passes back and forth past the sensing means will continue automatically, and at the end of each pass the stepping switches will be advanced to add "one" to the code number used in the previous pass.

When the stepping switches have been advanced until they are set to the code number to which the stopping code number switches 146th to 146u have been set, the automatic feeding of the tape back and forth will be terminated in the following manner:

It has been explained earlier herein that the stopping code number switches 146th to 146u position contact members 148th to 148u so that the lugs thereon engage those contacts, as 144 (Figs. 18I and 18J), in the various orders which correspond to the digit setting of the switches.

The contacts, as 144, are connected to corresponding digit contacts in the contact banks SSth-3 to SSu-3 of the stepping switches, each of which banks has a wiper cooperating therewith which is driven over the contacts of the bank as the stepping switch is set to the various code numbers.

The wiper of a lower order stepping switch is connected to the contact member of the next higher order; for example, the wiper which cooperates with the bank of conctacts SSu-3 of the units order stepping switch is connected over conductor 660 to the contact member 148t of the tens order.

When the stepping switches have been set to the code number which was set on the stopping member switches, a series circuit will be completed over the contact members 148th to 148u and their related banks SSth-3 to SSu-3 of the stepping switches to energize the relay C7, which will cause the automatic analysis to be terminated. This circuit will extend from the +90-volt conductor 455, over conductor 661, contact member 148u, contact 144, and contact of bank SSu-3, wiper for bank SSu-3, conductor 660, contact member 148t, bank SSt-3, contact member 148h, bank SSh-3, contact member 148th, bank SSth-3, conductor 662, contacts C9b2, and winding of relay C7.

Energization of relay C7 opens contacts C7b1 in the holding circuit for relay C2 and also opens contacts C7b2 in the energizing circuit for tape-feed motor power supply relay C3, causing both of these relays to be deenergized.

Deenergization of relay C3 prevents further tape feed, and the deenergization of relay C2 restores the machine to the control of the Start key 137 and the Manual-Run key 135.

Relay C7 will remain energized until either the stopping number switches 146th to 146u are set to another number or the contacts C9b2 are opened in a Manual-Run operation.

At the end of the automatic operation, the tape will have been analyzed according to the code numbers of the group, beginning with the number set on the start code number switches 145th to 145u and stopping with the number set on the stopping code number switches 146th to 146u, and a summary record will have been made of the code numbers on the tape, the totals related to these code numbers, and the number of entries related to each of these code numbers which were on the tape. There will be no record on the summary tape of any of the code numbers of this group for which there were no entries on the tape, the printing of these code numbers having been eliminated under control of relay R6.

If it is desired to stop the analysis at the end of any pass during the automatic operation, the Stop key 138 can be operated at any time during the pass prior to the initiation of a turn-around operation.

The operation of the Stop key 138 completes the energizing circuit to the stop relay C13, which operates to close contacts C13a1 in a holding circuit for relay C13, which extends over contacts C2a6, which are closed at this time, since the automatic operation is in progress. This circuit will maintain relay C13 energized until relay C2 is deenergized at the end of the pass.

Relay C13, when energized, will open contacts C13b2, which are paralleled with contacts C5b3 in the holding circuit to relay C2. When relay C5 operates at the end of the pass, both of the paralleled contacts will have been opened, and relay C2 will be deenergized.

Relay C5 will operate in the usual manner at the end of the pass to initiate a read-out and printing operation to print the code number and totals in the accumulator and counter if any amounts have been entered therein.

The release of the relay C2 prepares the machine for further control by the Start key 137, which should be operated if the analysis was stopped with the tape on the upper reel and further analysis is desired. The operation of the Start key will cause the analysis to begin again with the code number which is set on the starting code number switches. If the analysis was stopped with the tape on the lower reel, then the Manual-Run key 135 must be operated to transfer the tape to the upper reel before the Start key 137 can be operated to start another automatic analysis.

Machine operations which are initiated by the Manual-Run key 135 will now be considered.

Usually, this key is operated to cause the tape to be transferred from the lower reel to the upper reel of the tape-feeding means, and in this type of operation the tape feed will be stopped automatically at the end of the upward pass of the tape.

If, however, the tape is on the upper reel, the operation of the Manual-Run key will cause an upward feed of the tape to remove the leader from the lower reel and prepare the tape for removal from the machine. In this operation, the tape feed will not automatically be stopped, and the Emergency Stop key 136 must be operated to stop further tape feed.

The controls involved in an operation for transferring the tape from the lower reel to the upper reel will be considered first. When the Manual-Run key 135 (Figs. 1 and 18H) is operated, it completes an energizing circuit for the manual-run control relay C14. This relay opens contacts C14b1 to release the holding circuit for emergency stop relay C8 if relay C8 had been energized in a previous operation of the machine; opens contacts C14b2 in the holding circuit for the accumulator and counter reset relay A2 to deenergize this relay and initiate a resetting of the accumulator and counter; and closes contacts C14a3 to energize auxiliary control relay C9, if relay C2 is not energized at this time. Relay C14 will remain energized as long as the Manual-Run key 135 is operated.

Control relay C9 closes contacts C9a4 to energize relay C12, which exerts further controls necessary to a manual-run operation and remains energized as long as relay C9 remains energized.

Relay C9 closes contacts C9a5 to complete its holding circuit over contacts C8b3, which circuit maintains relay C9 energized until the emergency stop relay C8 is energized at the end of the pass.

Contacts C9b1 open the energizing circuit to the read-out and printer operation initiating relay R5 to prevent any summary recording at the end of the pass.

Contacts C9b7 (Fig. 18F) in the potential supply circuit to the control tubes and solenoid-operating tubes of the summary recorder are opened by relay C9 to prevent a read-out and setting of the indicating drums and type wheel in a manual-run operation.

Contacts C9b2 open the circuit to relay C7 to disable the control of the relay C7 by the stopping code number switches, so that further operation of the machine can take place even though the stepping switches are set to the same code number as the stopping code number switches.

The relay C9 also prepares two circuits, which will be completed at the end of the upward pass of the tape. Contacts C9a3 close in the circuit to relay C6 and will enable relay C6 to be energized when relays C5 and C16 have been energized at the end of the pass; and contacts C9a6 close in the circuit to the emergency stop relay C8 and will enable relay C8 to be energized when relay C5 is energized at the end of the pass.

Relay C12, which is energized upon closure of contacts C9a4, controls the presetting of the direction control trigger pair 463a—463b so that it will control the sensing means and the tape-feeding means in an upward pass, and also energizes start relay C1 to initiate an analysis of the tape.

Contacts C12a2 and C12b1 (Fig. 18C) control the application of positive potential to the sections 463a and 463b of the trigger pair, when contacts C1a4 close, to cause section 463b to conduct and section 463a to be non-conducting. With section 463a non-conducting, tube 464 will conduct and energize relay C4, which, as explained earlier, energizes relay S5. Relay C4 in its energized condition allows the shutter 60 to occupy its upper position, and relay S5 in its energized condition controls the tape feed motors for an upward feed, so that the machine is conditioned for an upward pass of the tape.

Contacts C12a3 (Fig. 18H) energize relay C1, which operates in the same manner as explained above to initiate an operation of the tape-feeding and -sensing means.

In this operation, the stepping switches are set to the code number on the starting code number switches, and those amounts which relate to this code number will be accumulated, but this is an idle analysis, inasmuch as the result is not printed by the summary recorder at the end of the pass.

During the upward pass of the tape, the various perforations will be sensed in the same order as in the upward pass described in connection with the analysis initiated by the Start key 137. The first perforation to be sensed will be the perforation 45 in the leader 43, which will cause a conditioning operation of the reversing control trigger pair 461a—461b to cause section 461b to conduct. Next, the entries on the tape will be sensed one after the other. In each entry, the sensing of the code number will be followed by the amount and then the control perforation in column 11. Those amounts related to the code number set on the stepping switches will be entered in the accumulator during this pass. After the last entry on the tape has been sensed, the perforation 45 in the leader 44 will cause the reversing control trigger pair 461a—461b to operate again, rendering section 461b conducting, which in turn fires the relay-operating tube 462 to energize the turn-around control relay C5.

The direction control trigger pair 463a—463b will also be operated from the trigger pair 461a—461b to deenergize relays C4 and S5 to prepare the scanner section for a downward pass, but, as will now be explained, the tape-feeding means will be stopped at the end of the upward pass.

When relay C5 is energized at the end of the pass, contacts C5a1 close to cause relay C16 to be energized to enter a value of "one" in the stepping switches; contacts C5a3 close in the energizing circuit to relay C6, which was prepared by contacts C9a3 and is completed as soon as relay C16 closes contacts C16a3; contacts C5a4 close in the anode supply circuit for the control and clutch solenoid operating tubes of the summary recorder, but read-out is prevented by contacts C9b7, which have opened the circuit; contacts C5a5 close in the energizing circuit to the read-out and printer operation initiating relay R5, but this circuit has been opened at C9b1; contacts C5a6 complete the energizing circuit for emergency stop relay C8, which was prepared by the closure of contacts C9a6; and contacts C5b2 open the circuit to the relay C3 to interrupt further tape feeding.

Relay C6, when operated, initiates a reset operation of the accumulator and counter by deenergizing relay A2, and also releases the turn-around relay C5.

Emergency stop relay C8 closes contacts C8a1 to complete a holding circuit for itself over contacts C1b7 and C14b1; opens contacts C8b2 in the holding circuit for relay C2; and opens contacts C8b3 in the holding circuit for relay C9.

This completes the Manual-Run operation, in which the tape is transferred from the lower reel to the upper reel.

If the tape is on the upper reel and the Manual-Run key 135 is depressed, the controls will operate, as explained above, to cause the tape to be fed upwardly. Since the tape is already on the upper reel, the upward feed of the tape will merely feed the leader completely from the lower reel. Also, with the tape on the upper reel at the beginning of the operation, both control perforations 45 will be above the sensing means and will not operate the reversing control trigger pair 461a—461b to energize the relay C5, which, as explained earlier, causes the machine to stop automatically. Since the relay C5 will not be energized in this operation, it is necessary to terminate the operation of the machine by operation of the Emergency Stop key 136, which should be operated as soon as the leader has been unwound from the lower reel and has been wound on the upper reel.

The Emergency Stop key 136 can be operated at any time while the machine is operating and, when operated, will cause the tape feed to be stopped immediately and the various controls which may have been set by the Start key 137 or by the Manual-Run key 135 to be restored.

The Emergency Stop key 136 (Fig. 18H) closes the energizing circuit to the emergency stop relay C8, which relay closes contacts C8a1 in a holding circuit over contacts C1b7 and C14b1 to maintain relay C8 energized until relay C1 is energized in a new automatic operation or until relay C14 is energized in a new manual-run operation.

Contacts C8b2 open the holding circuit to relay C2, which, upon deenergization, opens the circuit to relay C3 to allow this relay to be deenergized and remove operating power from the tape feed motors.

Contacts C8b3 open the holding circuit for relay C9 if the operation being stopped is a manual-run operation and relay C9 had been energized when it was initiated.

The Manual-Run and Emergency Stop keys are used to control the machine when putting tapes into and removing them from the machine.

When a tape is to be put in the machine, the spool of tape from the recorder 27 is placed on the shaft 125 (Fig. 3) with the proper flange outward, and the free end of the tape is attached to the lower surface of the reel 80 by any suitable fastening means, one such means being pressure-sensitive adhesive. The Manual-Run key 135 is operated to cause the tape-feeding means to operate as in an upward pass to remove the tape from the spool and wind it on the upper reel. As soon as the tape is on the upper reel, the Emergency Stop key 136 is operated to stop the operation of the tape-feeding means. The brake release switch 107 is then operated to release the brakes on the upper and lower reels, and the free end of the tape is threaded through the sensing means and is attached to the lower side of the lower reel 81. With the tape thus attached to the lower reel, the brake release switch 107 is operated to restore the brakes to the reels, and the machine is ready for operation.

When the tape is to be removed from the machine, the Manual-Run key 135 is operated once to feed the leader from the lower reel if the tape was already on the upper reel and is operated twice to feed the tape to the upper reel and to feed the leader from the lower reel if the tape was on the lower reel. In either case, the operation in which the leader is fed from the lower reel must be terminated by an operation of the Emergency Stop key 136, as explained. With the tape and the lower leader on the upper reel, the brake release switch 107 is operated, and the free end of the tape is secured to the under side of the spool on the shaft 125. The switch 107 is operated to reapply the brakes, and then switch 132 (Figs. 3, 5, and 18H) is closed to supply operating power to the rewind motor 131 and to supply energizing current to the brake-release solenoid 104 to release the brake for the upper reel. As soon as the tape has been rewound on the spool, switch 132 is opened. The spool with the tape thereon can be removed from the machine.

A schedule showing the various relays which are used in the control circuits, what energizes them, what deenergizes them, and the controls exerted by their various contacts is as follows:

SCHEDULE OF RELAYS

Relay:
D  Delay relay—
   Energized when thermal-responsive element 644 operates and closes contact 644a 20 seconds after power is applied to the apparatus by the On-Off switch.

Relay:
   Deenergized when power is removed by opening On-Off switch.
   Contacts:
      Da1 close holding circuit for relay D and prepare a circuit to be closed by contact 644b to relay COO.
      Db1 open circuit to heater element 643 of thermal delay device.

COO  A.C. delay control relay—
   Energized over contacts Da1 and 644b ten seconds after relay D operates.
   Deenergized when power is removed by opening On-Off switch.
   Contacts: COOa1 energize relay CO.

CO  D.C. delay control relay which delays application of D.C. operating and bias potentials to prevent premature operation of parts—
   Energized by relay COO.
   Deenergized when relay COO is deenergized.
   Contacts:
      COa1 apply +105 volts to anode supply of accumulator and counter after initial reset voltage has been applied to "0" tubes.
      COa2 close bias circuit to sections 461a and 463a of reversing control trigger pair and direction-controlling trigger pair after these sections have initially been made conducting by withholding bias.
      COa3 close circuit to relay C5 to enable relay C5 to be operated from reversing control trigger pair after initial presetting thereof.
      COa4 apply +105-volt anode potential to tubes of code number storage chains.
      COa5 apply ground to start relay C1 and auxiliary manual-run operation control relay C9 to allow these relays to operate only when the apparatus is ready.
      COa6 cause signal lamp 645 to light when machine is ready for operation.

A1  Accumulator and counter reset relay for applying reset voltage to grids of "0" tubes of accumulator and item counter and for disabling transfer storage tubes—
   Energized upon initial application of power to apparatus at On-Off switch and thereafter upon each deenergization of relay A2.
   Deenergized by energization of relay A2.
   Contacts:
      A1a2–9 apply reset voltage to "0" tubes in accumulator and counter.
      A1a10 partially close circuit to relay A2, which circuit is completed when relay R6 also operates.
      A1b1 open anode line to tens transfer storage tubes.

A2  Auxiliary reset control relay—
   Energized when relays A1 and R6 are operated.
   Deenergized when relays C1, C14, or C6 are operated.
   Contacts:
      A2a2 close holding circuit for relay A2 over C1b5, C14b2, and C6b1.
      A2a3 partially close circuit to relay C3.
      A2b1 deenergize relay A1.

C1  Start relay—
   Energized:
      Over C2b1 and Start key 137 in normal automatic run.
      Over C2b5 and C12a3 in manual run.
   Deenergized by energization of auxiliary start relay C2.
   Contacts:
      C1a2 cause operation of operating flip-flop 214a—214b to preset code number storage chains to zero, to cause an entry in the item counter if required, and to initiate an operation of the tens transfer actuating chain.
      C1a3 preset reverse control trigger pair with section 461a conducting.
      C1a4 preset direction-controlling trigger pair with section 463a conducting.
      C1a6 energize relay C2.

Relay:
C1b1 release holding circuits for relays C17, C20, C23, and C26.
C1b5 open holding circuit for relay A2.
C1b7 open holding circuit to relay C8.

C2  Auxiliary start relay—
Energized over C1a6.
Deenergized by energization of relay C3 in emergency stop and manual-run operations; by energization of relay C7 at end of automatic run; by joint energization of relays C13 and C5 in stop operation.
Contacts:
C2a2 close holding circuit for relay C2 over C8ba, C7b1.
C2a3 partially close energizing circuit to relay C3.
C2a4 close circuit to set stepping switches to starting code number.
C2a6 prepare holding circuit for relay C13.
C2b1 open circuit over Start key 137 and C14a3.
C2b5 open circuit over C12a3 to relay C1 in manual-run operations.

C3  Tape feed motor power supply relay—
Energized when stepping switches have completed their setting so that relays C15, C18, C21, C24, and C16, C19, C22, and C25 are deenergized and when relays A2 and C2 are energized and relays C5 and C7 are deenergized.
Deenergized by relay C5 at end of pass; by relay C7 at end of automatic run.
Contacts:
C3a3 close motor circuit to tape feed motors and to relay S4.
C3a2 close cathode return line for code number amplifiers.
C3b1 release relays S2 and S1.

C4  Sets controls for upward pass of tape—
Energized when control tube 464 conducts when direction-controlling trigger pair has its section 463b conducting.
Deenergized when control tube is non-conducting when direction-controlling trigger pair has its section 463a conducting.
Contacts:
C4a2 energize relay S5.
C4b1 deenergize shutter solenoid 62 and allow shutter to move to upper position.

C5  Turn-around operation control relay—
Energized by conduction in control tube whenever reversing control trigger pair returns to initial condition with section 461a conducting after initial preset.
Deenergized by energization of relay C6.
Contacts:
C5a1 energize relay C16 to cause step advance in units order of stepping switch.
C5a3 prepare energizing circuit to relay C6.
C5a4 close anode supply to read-out control to allow indicator setting.
C5a5 energize relay R5 to start a read-out and printing operation if relays R6 and C9 have not been energized.
C5a6 energize relay C8 at end of manual run when relay C9 has been energized.
C5b2 open circuit to relay C3.
C5b3 cooperate with relay C13 to release relay C2 when the Stop key 138 is operated.

C6  Turn-around control relay release relay—
Energized over any one of three paths when relays C5 and C16 are energized.
(1) C9a2—C5a3—C16a3 manual-run operations.
(2) R6a5—C5a3—C16a3 at end of pass with amount accumulator at "0."
(3) R1a1—CS1b1 to CS12b1—C5a3—C16a3 at end of pass when amount is in accumulator.
Deenergized when relay R6 operates to open holding circuit.
Contacts:
C6a3 close holding circuit for relay C6 over R6b4.

Relay:
C6b1 open holding circuit to relay A2 to initiate resetting of accumulator and counter.
C6b2 release relay C5.

C7  Stop relay for end of automatic operation—
Energized by stop circuit over stepping switches when stopping code number of group has been reached and relay C9 has not been energized.
Deenergized when stepping switches and stopping code number selecting switches are set to new number and also when relay C9 is energized.
Contacts:
C7b1 open holding circuit to relay C2.
C7b2 open circuit to relay C3.

C8  Emergency stop relay—
Energized by Emergency Stop key 136; by lamp failure via C11b1; by relay C9 and C5 in manual-run operation.
Deenergized by relay C1 at beginning of new automatic operation; by relay C14 at beginning of new manual-run operation.
Contacts:
C8a1 close holding circuit for relay C8 over C1b7 and C14b1.
C8b2 open holding circuit for relay C2.
C8b3 open holding circuit for relay C9.

C9  Manual-run auxiliary control relay—
Energized from relay C14 if relay C2 is not energized.
Deenergized by emergency stop relay C8 at end of pass.
Contacts:
C9a3 energize relay C6 when relays C5 and C16 are operated.
C9a4 energize relay C12.
C9a5 close holding circuit for relay C9 over C8b3.
C9a6 energize relay C8 when relay C5 operates.
C9b7 open read-out circuit to prevent read-out in manual-run operations.
C9b2 open circuit to relay C7.
C9b1 open circuit to relay R5.

C11  Lamp failure signal relay—
Energized upon application of power to projection lamp by closing the On-Off switch.
Deenergized by failure of lamp.
Contacts: C11b1 energize emergency stop relay C8 if lamp fails.

C12  Manual-run auxiliary control relay—
Energized by relay C9.
Deenergized when relay C9 is deenergized.
Contacts:
C12a2 preset direction-controlling trigger pair with section 463b conducting.
C12a3 energize relay C1.
C12b1 assist in presetting direction-controlling trigger pair with section 463b conducting.

C13  Stop relay—
Energized by Stop key 138.
Deenergized by deenergization of relay C2.
Contacts:
C13a1 close holding circuit for relay C13 over C2a6.
C13b2 release relay C2 when relay C5 is energized.

C14  Manual-run control relay—
Energized while Manual-Run key 135 is operated.
Contacts:
C14a3 energize relay C9 if relay C2 is not operated.
C14b1 release holding circuit for relay C8.
C14b2 deenergize relay A2 to start an accumulator and counter reset cycle.

C15  Control relay paralleling stepping switch operating magnet—units order—to prevent tape feed motor operation while switch steps—
Energized whenever stepping switch operating magnet is energized during setting of stepping switch to start position when C2a4 is closed, and when switch is advanced between passes.
Deenergized when operating magnet is deenergized—operating circuit has longer time constant than that for stepping magnet.
Contacts: C15b1 prevent energization of relay C3 during setting operations of stepping switch.

Relay:
C16 Step-by-step control relay for stepping switch—units order—
   Energized by C5a1 in turn-around operations.
   Deenergized when relay C5 is released by relay C6.
   Contacts:
      C16a1 operate operating magnet SSu m of the units order of the stepping switch.
      C16a2 energize relay C17.
      C16a3 prepare circuit to relay C6.
      C16b3 open circuit to relay C3.
C17 Transfer prepare and start number setting disabling control relay for stepping switch—units order—
   Energized from relay C16.
   Deenergized by relay C1 at C1b1.
   Contacts:
      C17a1 prepare transfer circuit over units order switch off-normal contact SSu–t to tens order transfer relay C19.
      C17a3 close holding circuit for relay C17 over C1b1.
      C17b2 open setting circuit over starting code number switch of units order.
C18 Control relay for tens stepping switch—same as C15.
C19 Transfer entry relay—tens order—
   Energized momentarily from units order switch as switch passes off-normal contact SSu–t after relay C17 has been energized.
   Contacts same as relay C16.
C20 Transfer prepare and start number setting disabling control relay for stepping switch—tens order—
   Energized from relay C19.
   Deenergized from relay C1.
   Contacts: Similar to those of relay C17.
C21 and 24 Same as relay C18 but for hundreds and thousands orders.
C22 and 25 Same as relay C19 but for hundreds and thousands orders.
C23 and 26 Same as relay C20 but for hundreds and thousands orders.
R1 Delay relay to insure read-out operation before printing.
   Energized over C5a4 and C9b7 after delay in turn-around operation.
   Deenergized when relay C5 is deenergized.
   Contacts: R1a1 delay energization of relay C6 for about one tenth of a second to insure that a read-out operation will be started when an amount is in the accumulator.
R2 Disables printing until read-out operation has been finished—
   Energized over R5a1.
   Deenergized when relay R5 is deenergized.
   Contacts:
      R2a1 close indicator motor circuit during read-out.
      R2b2 open circuit to printer initiate solenoid 611 and to relays R4 and R3.
R3 Controls initiation of printer operation—
   Energized over R2b2 and R4b2 when power is first applied and thereafter when relays R2 and R4 are both deenergized.
   Deenergized when R4 is energized.
   Contacts:
      R3a1 energize printer initiate solenoid 611 when relay R2 is deenergized.
      R3a2 prepare circuit to relay R4.
R4 Release relay for relay R3—
   Energized when printer solenoid micro-switch 620 is operated after relay R3 has been energized.
   Deenergized when relay R2 operates.
   Contacts:
      R4a1 close holding circuit for relay R4 over R2b2.
      R4b2 deenergize relay R3.
R5 Read-out and printer operation initiating relay—
   Energized by relay C5 if relays R6 and C9 are not energized.
   Deenergized by deenergization of relay C5.
   R5a1 energizes relay R2.
R6 Read-out operation elimination relay—
   Energized from amount accumulator and item counter over diode circuits when all orders are at "0."
   Deenergized when any order is not at "0."
   Contacts:
      R6a1 energize relay A2 if relay A1 has not been energized and relays C1, C6, and C14 are not energized.
      R6a5 close circuit to relay C6 when relays C5 and C16 operate.
      R6b4 open holding circuit to relay C6.
      R6b3 prevent R5 from operating if accumulator and counter are at "0" when C5 operates.
S1 Tape feed motor control relay—
   Energized initially over S6b1 when power is first applied to the machine and thereafter over S2a2 and direction-controlled switch DS–1, shortly after change of direction of tape in turn-around.
   Deenergized by relay C3.
   Contacts:
      S1a1 close holding circuit for relay S1 over C3b1.
      S1b2 open circuit to relay S2.
S2 Tape feed motor auxiliary power supply relay—
   Energized during turn-around operation when relay C3 is deenergized.
   Deenergized by relay S1 shortly after change of direction of tape feed.
   Contacts:
      S2a1 supply current to tape feed motors after relay C3 is deenergized.
      S2a2 prepare circuit to relay S1 over tape direction-controlled switch DS–1.
S3 Brake control relay—
   Energized over tape direction-controlled switch DS–1 when tape is being fed down.
   Deenergized by tape direction-controlled switch DS–1 during upward tape feed.
   Contacts:
      S3a1 energize upper brake solenoid from S4a1.
      S3a2 energize lower brake solenoid directly from A.C. relay supply.
      S3b1 energize lower brake solenoid from S4a1.
      S3b2 energize upper brake solenoid directly from A.C. relay supply.
S4 Auxiliary brake control relay operated with tape feed motors.
   Energized over C3a3 and S2a1 whenever tape feed motors are running.
   Deenergized when relays C3 and S2 are deenergized.
   Contacts: S4a1 control brake solenoids over contacts of relay S3 to release brakes while either motor is running.
S5 Direction control relay which is energized on upward feed of tape.
   Energized from C4.
   Deenergized when C4 deenergized.
   Contacts:
      S5c1(a) completes circuit to lower motor. } Bridging.
      S5c1(b) completes circuit to upper motor.
      S5c2(a) } Control energization of S1 over tape direction controlled switch DS–1 shortly after change in direction of tape feed.
      S5c2(b)
S6 Delay relay to insure energization of relay S1 when power is first applied to apparatus.
   Energized when +150 volts D.C. is applied to apparatus from power supply after voltage regulator heaters are heated following closing of On-Off switch.
   Deenergized when power is turned off at On-Off switch.
   Contacts: S6b1 cause relay S1 to be energized immediately power is applied at On-Off switch but thereafter to be energized under control of contacts 5c2(a) and (b) and tape direction controlled switch DS–1.

While the form of the invention shown and described herein is admirably adapted to fulfill the objects primarily stated, it is to be understood that it is not intended to confine the invention to the form or embodiment disclosed herein, for it is susceptible of embodiment in various other forms.

What is claimed is:

1. In an apparatus for analyzing a tape during successive passes of the tape back and forth past a sensing means, the tape containing control signals and a plurality of entries, each of which entries includes amount identification data and a related amount, the combination of a sensing means for sensing the control signals, identification data, and amounts on the tape; an accumulator; analysis control means settable to an amount identification data to be used in selecting amounts to be accumulated in a pass of the tape; selecting means controlled by the sensing means which senses amount identification data and by the analysis control means for enabling amounts related to the identification data set on the analysis control means to be entered into the accumulator under control of the amount sensing means; means to feed the tape back and forth past the sensing means, each pass consisting of a complete, continuous feed of all the entries on the tape past the sensing means; turn-around control means operated by certain control signals on the tape for controlling the tape feeding means to reverse the direction of tape feed at the end of a pass and to arrest further feed as soon as the direction of feed has been reversed; means controlled by the turn-around control means for operating the analysis control means to set new identification data therein to be used in selecting amounts in the next pass of the tape; and means controlled by the turn-around control means and by the analysis control means to initiate further operation of the feed means when the setting of the analysis control means is completed.

2. In an apparatus for analyzing a tape during successive passes of the tape back and forth past a sensing means, the tape containing control signals and a plurality of entries, each of which entries includes amount identification data and a related amount, the combination of a sensing means for sensing the control signals, identification data, and amounts on the tape; an accumulator; analysis control means settable to an amount identification data to be used in selecting amounts to be accumulated in a pass of the tape; selecting means controlled by the sensing means which senses amount identification data and by the analysis control means for enabling amounts related to the identification data set on the analysis control means to be entered into the accumulator under control of the amount sensing means; recording means settable from the accumulator and the analysis control means and operable to record the identification data and the total of related amounts which were accumulated during a pass; means to feed the tape back and forth past the sensing means, each pass consisting of a complete, continuous feed of all the entries on the tape past the sensing means; turn-around control means operated by certain control signals on the tape for controlling the tape feeding means to reverse the direction of tape feed at the end of a pass and to arrest further feed as soon as the direction of feed has been reversed; means controlled by the turn-around control means for causing a setting of the recorder from the accumulator and the analysis control means and for preparing a control means to initiate a recording operation of the recorder automatically upon the completion of the setting of the total and the item identification data therein; and means controlled by the recorder, when the total and identification data have been set therein, and by the turn-around control means, to initiate a further operation of the feeding means to cause the next pass of the tape to be made and to operate the analysis control means to set new identification data therein to be used in selecting amounts in the next pass of the tape.

3. In an apparatus for analyzing a tape during successive passes of the tape back and forth past a sensing means, the tape containing control signals and a plurality of entries, each of which entries includes amount identification data and a related amount, the combination of a sensing means for sensing the control signals, identification data, and amounts on the tape; an accumulator; analysis control means settable to an amount identification data to be used in selecting amounts to be accumulated in a pass of the tape; selecting means controlled by the sensing means which senses amount identification data and by the analysis control means for enabling amounts related to the identification data set on the analysis control means to be entered into the accumulator under control of the amount sensing means; summary recording means settable from the accumulator and the analysis control means and operable to record on a summary record the identification data and the total of related amounts which were accumulated during a pass; means to feed the tape back and forth past the sensing means, each pass consisting of a complete, continuous feed of all the entries on the tape past the sensing means; turn-around control means operated by certain control signals on the tape for controlling the tape feeding means to reverse the direction of tape feed at the end of a pass and to arrest further feed as soon as the direction of feed has been reversed; means controlled by the turn-around control means for causing a setting of the summary recorder from the accumulator and the analysis control means and for preparing a control means to initiate a recording operation of the summary recorder automatically upon the completion of the setting of the total and the item identification data therein; means controlled by the summary recorder when the total and identification data have been set therein and by the turn-around control means, to initiate a further operation of the feeding means to cause the next pass of the tape to be made and to operate the analysis control means to set new identification data therein to be used in selecting amounts in the next pass of the tape; and means controlled from the accumulator and operable, if no entries have been made therein during the pass, to prevent the setting and the recording operation of the summary recorder under control of the turn-around control means and to enable the turn-around control means to cause said operation of the analysis control means to set new identification data therein and to immediately initiate said further operation of the feeding means to cause the next pass of the tape to begin.

4. In an apparatus for analyzing a tape during successive passes of the tape back and forth past a sensing means, the tape containing control signals and a plurality of entries, each of which entries includes amount identification data and a related amount, the combination of a sensing means for sensing the control signals, identification data, and amounts on the tape; an accumulator; a counter; analysis control means settable to an amount identification data to be used in selecting amounts to be accumulated in a pass of the tape; selecting means controlled by the sensing means which senses amount identification data and by the analysis control means for rendering the accumulator operable to receive amounts related to the identification data set on the analysis control means, under control of the amount sensing means, and for enabling the counter to receive a unitary entry under control of a control signal on the tape each time the accumulator is rendered operable to receive an amount; summary recording means settable from the accumulator, the counter, and the analysis control means and operable to record the identification data, the total of related amounts which were accumulated during a pass, and the count of the number of amounts so accumulated; means to feed the tape back and forth past the sensing means, each pass consisting of a complete, continuous feed of all the entries on the tape past the sensing means; turn-around control means operated by other control signals on the tape for controlling the tape feeding means to reverse the direction of tape feed at the end of a pass and to arrest further feed as soon as the direction of feed has been reversed; means controlled by the turn-around control means for causing a setting of the summary recorder from the accumulator, the counter, and the analysis control means and for preparing a control means to initiate a recording operation of the summary recorder automatically upon the completion of the setting of the total, the count, and the item identification data therein; and means controlled by the summary recorder when the total, the count, and the identification data have been set therein and by the turn-around control means to reset the counter and the accumulator to zero, to initiate a further operation of the feeding means to cause the next pass of the tape to be made and to adjust the analysis control means to set new identification data therein to be used in selecting amounts in the next pass of the tape.

5. In an apparatus for analyzing entries on a tape during successive passes of the tape back and forth past a sensing means, each entry on the tape including an amount-identification number and a related amount, the combination of analysis control means settable to an amount-identification number to be used in selecting amounts to be accumulated during a pass of the tape; starting number means settable to the starting number of a block of identification numbers to be used in the analysis; stopping number means settable to the stopping number of the block of identification numbers to be used in the analysis; means to initiate an analyzing operation; means operated by the initiating means for causing the analysis control means to be set to the starting identification number of the block under control of the starting number means; means operable between passes to operate the analysis control means to adjust the identification number set therein by a value of "one" to enable selection of amounts related to successive numbers in the block of identification numbers to be made in successive passes of the tape; and means operable under the joint control of the stopping number means and the analysis control means to stop the analysis when the analysis control means has been set to the identification number which was set on the stopping number means.

6. In an apparatus for analyzing entries on a tape during successive passes of the tape back and forth past a sensing means, each entry on the tape including a multi-denominational amount-identification number and a related amount, the combination of a multi-denominational order accumulator-type of analysis control means settable to a multi-denominational amount-identification number to be used in selecting amounts to be accumulated during a pass of the tape and operable to control the selection of said amounts; starting number means settable to the lowest number of a block of multi-digit identification numbers to be used in the analysis; stopping number means settable to the highest number of the block of identification numbers to be used in the analysis; means to initiate an analyzing operation; means operated by the initiating means for causing the analysis control means to be set initially to the lowest identification number of the block under control of the starting number means; means operable between passes to enter a value of "one" in the lowest order of the analysis control means to add "one" to the identification number set therein to enable selection of amounts related to successive numbers in the block of identification numbers to be made in successive passes of the tape; and means operable under the joint control of the stopping number means and the analysis control means to stop the analysis when the analysis control means has been advanced to the identification number which was set on the stopping number means.

7. In an apparatus for analyzing entries on a tape during successive passes of the tape back and forth past a sensing means, each entry on the tape including an amount-identification number and a related amount, the combination of analysis control means including a stepping switch settable to positions according to an amount-identification number to be used in selecting amounts to be accumulated during a pass of the tape; starting number means settable to a starting identification number to be used in the analysis; stopping number means settable to the stopping identification number to be used in the analysis; means to initiate an analyzing operation; means operated by the initiating means for causing the stepping switch of the analysis control means to be set initially to the starting identification number under control of the starting number means; means operable between passes to operate the stepping switch of the analysis control means to adjust the identification number set therein by a value of "one" to enable selection of amounts related to successive identification numbers to be made in successive passes of the tape; and means operable under the joint control of the stopping number means and the analysis control means to stop the analysis when the stepping switch of the analysis control means has been advanced to the identification number which was set on the stopping number means.

8. In an apparatus for analyzing entries on a tape during successive passes of the tape back and forth past a sensing means, each entry on the tape including an amount-identification number and a related amount, the combination of analysis control means including an electro-magnetically-operated stepping switch settable to positions according to an amount-identification number to be used in selecting amounts to be accumulated during a pass of the tape; a starting number switch settable to the lowest number of a block of identification numbers to be used in the analysis; a stopping number switch settable to the highest number of a block of identification numbers to be used in the analysis; means to initiate an analyzing operation; a circuit made operable by the initiating means for causing the stepping switch of the analysis control means to be set to the lowest identification number under control of the starting number switch; a circuit closed momentarily between passes to advance the stepping switch of the analysis control means to add "one" to the identification number set therein to enable selection of amounts related to successive identification numbers to be made in successive passes of the tape; and means operable under the joint control of the stopping number switch and the stepping switch of the analysis control means to stop the analysis when the analysis control means has been set to the identification number which was set on the stopping number switch.

9. In an apparatus for analyzing entries on a tape during successive passes of the tape back and forth past a sensing means, each entry on the tape including a multi-denominational amount-identification number and a related amount, the combination of analysis control means including a stepping switch for each denomination of the identification number, which switches are settable to positions according to a multi-denominational amount-identification number to be used in selecting amounts to be accumulated during a pass of the tape and including circuits interconnecting the stepping switches to form a multi-denominational order counter; starting number means settable to the starting number of a block of identification numbers to be used in the analysis; stopping number means settable to the stopping number of a block of identification numbers to be used in the analysis; means to initiate an analysis; means operated by the initiating means for causing the stepping switches of the analysis control means to be set to the starting identification number of the block under control of the starting number means; means operable between passes and operable through the circuits interconnecting the stepping switches of the analysis control means to readjust the position of the switches and add "one" to the identification number previously set therein, to enable selection of amounts related to successive numbers in the block of identification numbers to be made in successive passes of the tape; and means operable under the joint control of the stopping number means and the analysis control means to stop the analysis when the stepping switches of the analysis control means have been advanced to the identification number which was set on the stopping number means.

10. In an apparatus for analyzing entries on a tape during successive passes of the tape back and forth past a sensing means, each entry on the tape including a multi-denominational amount-identification number and a related amount, the combination of analysis control means including an electro-magnetically-operated stepping switch for each denomination of the identification number, which switches are settable to positions according to an amount-identification number to be used in selecting amounts to be accumulated during a pass of the tape and including circuits interconnecting the stepping switches to form a multi-denominational-order counter; a starting number switch for each order of the identification number, which switches are settable to the lowest number of a block of identification number to be used in the analysis; a stopping number switch for each order of the identification number, which switches are settable to the highest number of a block of identification numbers to be used in the analysis; means to initiate an analysis; circuits rendered operable by the initiating means for causing the stepping switches of the analysis control means to be set initially to the lowest identification number of the block under control of the starting number switches; means operable between passes and operable through the circuits interconnecting the stepping switches of the analysis control means to readjust the position of the switches and add "one" to the identification number previously set therein, to enable selection of amounts related to successive numbers in the block of identification numbers to be made in successive passes of the tape; and means operable under the joint control of the stopping number switches and the stepping switches of the analysis contol means to stop the analysis when the analysis control means have been advanced to the identification number which was set on the stopping number switches.

11. In an apparatus for analyzing entries on a tape during successive passes of the tape back and forth past a sensing means, each entry on the tape including an amount-identification number and a related amount, the combination of sensing means for sensing entries on the tape; means to feed the tape back and forth past the sensing means; an accumulator; analysis control means settable to an amount-identification number to be used in selecting amounts to be accumulated during a pass of the tape; selecting means controlled by the sensing means which senses the amount-identification number and by the analysis control means for enabling amounts on the tape which are related to the identification number set on the analysis control means to be entered into the accumulator under control of the sensing means which senses the amounts on the tape; starting number means settable to the starting number of a block of identification numbers to be used in the analysis; stopping number means settable to the stopping number of a block of identification numbers to be used in the analysis; means to initiate an analysis; means operated by the initiating means for causing the feeding means to operate and the analysis control means to be set to the starting identification number of the block under control of the starting number means; means operable at the end of a pass to record the amount accumulated in the accumulator during the pass and clear the accumulator, to reverse the direction of tape feed, and to operate the analysis control means to add "one" to the identification number set therein whereby to enable selective accumulation and recording of totals of amounts related to successive numbers in the block of identification numbers to be made in successive passes of the tape; and means operable under the joint control of the stopping number means and the analysis control means to stop the analysis when the analysis control means has been advanced to the identification number which was set on the stopping number means.

12. In an apparatus for analyzing entries on a tape during successive passes of the tape back and forth past a sensing means, each entry on the tape including an amount-identification number and a related amount, the combination of sensing means for reading the identification numbers and amounts; an accumulator for accumulating selected amounts which are read from the tape; analysis control means settable to an amount-identification number to be used in selecting amounts to be accumulated during a pass of the tape; comparing means controlled by the sensing means which senses the identification numbers and by the analysis control means for comparing the identification number for each entry with that set on the analysis control means; gating means controlled by the comparing means for enabling those amounts whose identification numbers agree with that set on the analysis control means to be entered into the accumulator under control of the sensing means which reads these amounts; starting number means settable to the starting number of a block of identification numbers to be used in the analysis; stopping number means settable to the stopping number of the block of identification numbers to be used in the analysis; means to initiate an analyzing operation; means operated by the initiating means for causing the analysis control means to be set to the starting identification number of the block under control of the starting number means to enable comparison to be made with this identification number during the first pass of the tape; means operable between passes to operate the analysis control means to adjust the identification number set therein by a value of "one" to enable selection of amounts related to successive numbers in the block of identification numbers to be made in successive passes of the tape; and means operable under the joint control of the stopping number means and the analysis control means to stop the analysis when the analysis control means has been set to the identification number which was set on the stopping number means.

13. In an apparatus for analyzing entries on a tape during successive passes of the tape back and forth past a sensing means, each entry on the tape including a multi-denominational amount-identification number and a related amount, the combination of sensing means for reading the identification numbers and amounts; an accumulator for accumulating selected amounts which are read from the tape; a multi-denominational-order accumulator-type analysis control means settable to a multi-denominational amount-identification number to be used in selecting amounts to be accumulated during a pass of the tape and operable to control the selection of said amounts; comparing means controlled by the sensing means which reads the identification numbers and by the analysis control means for comparing the identification number for each entry on the tape with that set on the anlysis control means; gating means controlled by the comparing means to enable those amounts whose identification numbers agree with that set on the analysis control means to be entered into the accumulator under control of the sensing means which reads these amounts; starting number means settable to the lowest number of a block of multi-digit identification numbers to be used in the analysis; stopping number means settable to the highest number of the block of identification numbers to be used in the analysis; means to initiate an analyzing operation; means operated by the initiating means for causing the analysis control means to be set initially to the lowest identification number of the block under control of the starting number means to enable comparisons to be made with this identification number during the first pass of the tape; means operable between passes to enter a value of "one" in the lowest order of the analysis control means to add "one" to the identification number set therein to enable selection of amounts related to successive numbers in the block of identification numbers to be made in successive passes of the tape; and means operable under the joint control of the stopping number means and the analysis control means to stop the analysis when the analysis control means has been advanced to the identification number which was set on the stopping number means.

14. In an apparatus for analyzing entries on a tape during successive passes of the tape back and forth past a sensing means, each entry on the tape including an amount-identification number and a related amount, the combination of sensing means to read the identification numbers and amounts on the tape; an accumulator for accumulating amounts from selected entries on the tape; analysis control means including a stepping switch settable to positions according to an amount-identification number to be used in selecting amounts to be accumulated during a pass of the tape; comparing means controlled by the sensing means which senses the identification number and by the stepping switch of the analysis control means for comparing the identification number of each entry on the tape with that set on the analysis control means; entry control means for controlling the entry of sensed amounts in said accumulator, said entry control means normally blocking entries into the accumulator; means for controlling the entry control means from the comparing means to allow entries to be made into the accumulator upon agreement of the sensed identification number with that set on the analysis control means; starting number means settable to a starting identification number to be used in the analysis; stopping number means settable to the stopping identification number to be used in the analysis; means to initiate an analyzing operation; means operated by the initiating means for causing the stepping switch of the analysis control means to be set to the starting identification number under control of the starting number means to control the comparing means according to this number during the first pass; means operable between passes to advance the stepping switch of the analysis control means to adjust the identification number set therein by a value of "one" to enable selection of amounts related to successive identification numbers to be made in successive passes of the tape; and means operable under the joint control of the stopping number means and the analysis control means to stop the analysis when the stepping switch of the analysis control means has been advanced to the identification number which was set on the stopping number means.

15. In an apparatus for analyzing entries on a tape during successive passes of the tape back and forth past a sensing means, each entry on the tape including a multi-denominational amount-identification number and a related amount, the combination of sensing means for reading the identification numbers and amounts on the tape; an accumulator; analysis control means including a stepping switch for each denomination of the identification number, which switches are settable to positions according to an amount-identification number to be used in selecting amounts to be accumulated during a pass of the tape and including circuits interconnecting the stepping switches to form a multi-denominational-order counter; comparing means controlled by the sensing means which senses the identification number and by the stepping switches according to their positions for comparing the several digits of the multi-denominational identification number with the digits of the multi-denominational number set on the switches; entry control means controlled by the comparing means for enabling the amounts for those entries on the tape whose identification numbers agree with that set on the analysis control means to be entered into the accumulator under control of the sensing means which senses amounts; starting number means including denominational switches settable to the starting number of a block of identification numbers to be used in the analysis; stopping number means including denominational switches settable to the stopping number of a block of identification numbers to be used in the analysis; means to initiate an analysis; means operated by the initiating means for causing the stepping switches of the analysis control means to be set to the starting identification number of the block under control of the starting number means to control the comparing means according to this number during the first pass; means operable between passes and operable through the circuits interconnecting the stepping switches of the analysis control means to readjust the position of the switches and add "one" to the identification number previously set therein, to enable selection of amounts related to successive numbers in the block of identification numbers to be made in successive passes of the tape; and means including a stopping device and an operating circuit therefor, which operating circuit extends over the stopping number switches and the stepping switches in series and causes the device to operate and stop the analysis when the series circuit is completed over the stopping number switches and the stepping switches of the analysis control when the stepping switches of the analysis control means have been advanced to the identification number which was set on the stopping number switches.

16. In an apparatus for sensing entries on a tape as the tape is fed in either of two opposite directions, each entry including two types of data in side-by-side relation across the tape, the combination of a single set of sensing means extending across the tape, certain of said sensing means sensing one type of data and other of said sensing means sensing the other type of data; means to feed the tape back and forth past the sensing means; and control means for the sensing means to cause said one type of data of each entry to be sensed prior to the other type of data in that entry in either direction of tape feed.

17. In an apparatus for sensing entries on a tape as the tape is fed in either of two opposite directions, each entry including amount-identifying data and a related amount in side-by-side relation across the tape, the combination of a single set of sensing means extending across the tape for sensing the amount-identifying data and the related amount; means to feed the tape in successive passes back and forth past the sensing means, each pass consisting of a complete continuous feed of all the entires on the tape past the sensing means; and control means for the sensing means to cause the amount-identifying data of each entry to be sensed immediately prior to the amount in that entry while the tape is fed continuously past the sensing means in either direction of tape feed.

18. In an apparatus for sensing entries on a tape as the tape is fed in either of two opposite directions, the combination of means to project two lines of light across the tape which are spaced apart in the direction of tape feed; a set of photo cells; light-guiding means enabling the set of photo cells to be operated by light from either light line according to data representations on the tape; means to feed the tape in either of said two directions; and means to enable the photo cells to be operated by light from one of said light lines according to entries on the tape when the tape is fed in one of said directions, and to enable the photo cells to be operated by light from the other of said light lines according to entries on the tape when the tape is fed in the other of said directions.

19. In an apparatus for sensing entries on a tape as the tape is fed in either of two opposite directions, each entry extending across the tape normal to the direction of tape feed and each entry including data representations and occupying a predetermined length of the tape, the combination of sensing means including a light source and means to project the light across the tape at two lines spaced apart in the directions of tape feed approximately the length required for an entry on the tape, and including a single group of photo-electric means extending across the tape and controllable by light from both of said lines according to data representations in said tape; means to feed the tape in either of said two directions past the sensing means; shiftable control means cooperating with the sensing means to allow the light from a certain portion of the leading line of light, according to the direction of tape feed, to be effective on certain of the photo-electric means to sense certain data of an entry on the tape and to allow the light from a portion of the trailing line of light, according to the direction of the feed, to be effective on other of the photo-electric means to sense other data of said entry on the tape whereby said certain data of each entry will be sensed prior to said other data of the corresponding entry; and means to shift the control means according to the direction of operation of the feeding means to cause said certain data of each entry to be sensed prior to said other data of the entry in either direction of tape feed.

20. In an apparatus for sensing entries on a tape as the tape is fed in either of two opposite directions, each entry including amount-identifying data and a related amount in side-by-side relation across the tape and utilizing a predetermined length of tape, the combination of means to project two lines of light across the tape which are spaced apart in the direction of tape feed a distance equal to the length of an entry on the tape; a set of photo-cells for sensing amount-identifying data; a set of photo-cells for sensing amounts; light-guiding means enabling the sets of photo-cells to be operated by light from either light line according to data representations on the tape; means to feed the tape in successive passes back and forth past the sets of photo-cells, each pass consisting of a complete continuous feed of all the entries on the tape past the photo-cells; and means to enable the amount-identifying-data-sensing photo-cells to be operated by light from one of said light lines and the amount-reading photo-cells to be operated by light from the other of said light lines when the tape is fed in one of said directions, and to enable the amount-identifying-data-reading photo-cells to be operated by light from said other of said light lines and said amount-reading photo-cells to be operated by light from said one of said light lines when the tape is fed in the other of said directions, to cause the amount-identifying data of each entry to be sensed immediately before the amount of that entry in either direction of tape feed.

21. In an apparatus for sensing entries on a tape as the tape is fed in either of two opposite directions, each entry utilizing a plurality of longitudinal channels and extending across the tape and each entry including data representations in said channels and occupying a predetermined length of the tape, the combination of sensing means forming a single sensing station and including a light source and means to project the light across the tape at two lines spaced apart in the directions of tape feed approximately the length reqiured for an entry on the tape, and also including a single group of photo-electric means containing a photo-cell means for each channel and extending in a line across the tape and controlled by light from both of said light lines according to data representations in said tape; means to feed the tape in either of said two directions past the sensing means; shiftable control means cooperating with the sensing means to allow the light from a certain portion of the leading line of light, according to the direction of tape feed, to be effective only on certain of the photo-electric means to sense data in certain channels of an entry on the tape and to allow the light from a portion of the trailing line of light, according to the direction of the feed, to be effective on only other of the photo-electric means to sense data in other channels of said entry on the tape whereby said data in said certain channels of each entry will be sensed prior to said data in the other channels of the corresponding entry at said single sensing station; and means to jointly control the feeding means and the shiftable control means to shift the control means according to the direction of operation of the feeding means to cause said certain data of each entry to be sensed prior to said other data of the entry in either direction of tape feed.

22. In an apparatus for sensing entries on a tape as the tape is fed in either of two opposite directions, each entry utilizing a plurality of longitudinal channels and extending across the tape and each entry including control-data-representing perforations in certain of said channels and amount-data-representing perforations in other channels and occupying a predetermined length of the tape, the combination of sensing means forming a single sensing station and including a light source and means to project the light on one side of the tape at two lines spaced apart in the directions of tape feed approximately the length required for an entry on the tape, and also including a single group of photo-electric means extending across the other side of the tape and controlled by light from both of said lines according to data-representing perforations in said tape; means to feed the tape in successive passes back and forth past the sensing means, each pass consisting of a complete, continuous feed of all the entries on the tape; shiftable masking means cooperating with the sensing means to block the light from the leading line of light, according to the direction of feed, from the amount-reading photo-electric means to allow only the control-data-sensing photo-electric means to simultaneously sense control data in said certain channels of an entry on the tape and to block the light from the trailing line of light, according to the direction of feed, from the control-data-reading photo-electric means to allow only the amount-reading photo-electric means to simultaneously sense data in said other channels of said entry on the tape whereby said control data in said certain channels of each entry will be sensed immediately prior to said amount data in the other channels of the corresponding entry at said single sensing station; and means to jointly control the feeding means and the shiftable masking means to shift the masking means according to the direction of operation of the feeding means to cause said control data in certain channels of each entry to be sensed prior to said amount data in said other channels of the entry in either direction of tape feed.

23. In an apparatus for analyzing entries on a tape, each entry on the tape including an amount-identification number and a related amount, the combination of sensing means for sensing the data on the tape; an accumulator; a chain of electron tubes operable one after another in sequence from a starting tube under control of the amount-identification number sensing means when an amount-identification number is sensed, to cause the tube of the chain which corresponds to the identification number of an entry to conduct, each tube of the chain, when conducting, providing an output potential which is distinctive from that which is provided when the tube is not conducting; entry control means coupling the sensing means to the accumulator and controllable to control when sensed amounts will be entered in the accumulator; analysis control means settable to an amount-identifying number to be used in selecting amounts to be accumulated from the tape, said analysis control means selectively coupling the entry control means to that tube of the chain which corresponds to the amount-identification number set on the analysis control means, to enable the output potentials of that tube of the chain to control the entry control means to permit the sensed amount to be entered in the accumulator each time the sensed amount-identification number corresponds to the identification number set in the analysis control means and causes conduction in the tube of the chain to which the entry control means is coupled; and means to restore the chain to starting condition after each entry is sensed.

24. In an apparatus for analyzing entries on a tape, each entry on the tape including a multi-denominational amount-identification number and a related amount, the combination of sensing means for sensing the data on the tape; an accumulator; a plurality of banks of electron tubes, one bank for each denomination of the amount-identification number; means connecting the tubes of a bank in a chain for operation one at a time in sequence from a starting tube in each bank in response to impulses produced under control of the sensing means as the amount-identification number of an entry is sensed, whereby those tubes in the various banks will be rendered conducting which correspond to the digits in the several orders of the amount-identification number, each tube of the chain, when conducting, providing an output potential which is distinctive from that which is provided when the tube is not conducting; entry control means coupling the sensing means to the accumulator and controllable to control when sensed amounts will be entered in the accumulator; analysis control means settable to a multi-denominational amount-identification number to be used in selecting amounts to be accumulated from the tape, said analysis control means selectively coupling the entry control means to those tubes of the chains which correspond to the several digits of the amount-identification number set on the analysis control means to enable the output potentials of the tubes in the various chains to control the entry control means to permit the sensed amount to be entered in the accumulator only when the sensed amount-identification number corresponds to the identification number set in the analysis control means and causes conduction in all the tubes of the chains to which the entry control means is coupled; and means to restore the chains to their starting condition after each entry on the tape has been sensed.

25. In an apparatus for analyzing entries on a tape, each entry on the tape including an amount-identification number, a related amount, and a reset control signal, the combination of sensing means for sensing the data on the tape as the tape is fed past the sensing means; an accumulator; a chain of electron tubes operable one after another in sequence from a starting tube under control of the amount-identification number sensing means when an amount-identification number is sensed to cause the tube of the chain which corresponds to the identification number of an entry to conduct, each tube of the chain, when conducting, providing an output potential which is distinctive from that which is provided when the tube is not conducting; entry control means coupling the sensing means to the accumulator and controllable to control when sensed amounts will be entered in the accumulator; analysis control means settable to an amount-identification number to be used in selecting amounts to be accumulated from the tape, said analysis control means selectively coupling the entry control means to that tube of the chain which corresponds to the amount-identification number set on the analysis control means to enable the output potentials of that tube of the chain to control the entry control means to permit the sensed amount to be entered in the accumulator each time the sensed amount-identification number corresponds to the identification number set in the analysis control means and causes conduction in the tube of the chain to which the entry control means is coupled; and means coupled to the sensing means and to the chain of tubes and operated by the reset signals on the tape to reset the chain to starting condition after each entry is sensed.

26. In an apparatus for analyzing entries on a tape, each entry on the tape including a multi-denominational amount-identification number, a related amount, and a reset control signal, the combination of sensing means for sensing the data on the tape; an accumulator; a plurality of banks of electron tubes, one bank for each denomination of the amount-identification number; means connecting the tubes of a bank in a chain for operation one at a time in sequence from a starting tube in each bank in response to impulses produced under control of the sensing means as the amount-identification number of an entry is sensed, whereby those tubes in the various banks will be conducting which correspond to the digits in the several orders of the amount-identification number, each tube of the chain, when conducting, providing an output potential which is distinctive from that which is provided when the tube is not conducting; entry control means coupling the sensing means to the accumulator and normally effective to block entries into the accumulator but controllable to enable sensed amounts to be entered in the accumulator; analysis control means settable to a multi-denominational amount-identification number to be used in selecting amounts to be accumulated from the tape, said analysis control means selectively coupling the entry control means to those tubes of the chains which correspond to the several digits of the amount-identification number set on the analysis control means to enable the output potentials of the tubes in the various chains to control the entry control means to permit the sensed amount to be entered in the accumulator only when the sensed amount-identification number corresponds to the identification number set in the analysis control means and causes conduction in all the tubes of the chain to which the entry control means is coupled; and means coupled to the sensing means and to the banks of tubes to restore the chains of tubes therein to their starting condition when the reset control signal of an entry on the tape is sensed.

27. In an apparatus for analyzing entries on a tape, each entry on the tape including a multi-denominational amount-identification number and a related amount, the combination of sensing means for sensing the data on the tape; an accumulator; a plurality of banks of electron tubes, one bank for each denomination of the amount-identification number; means connecting the tubes of a bank in a chain for operation one at a time in sequence from a starting tube in each bank in response to impulses produced under control of the sensing means as the amount-identification number of an entry is sensed, whereby, after the sensing of the identification number of an entry, only those tubes in the various banks will be conducting which correspond to digits in the several orders of the amount-identification number, each tube of the bank, when conducting, providing an output potential which is distinctive from that which is provided when the tube is not conducting; entry control means coupling the sensing means to the accumulator and normally blocking entries in the accumulator but controllable to enable sensed amounts to be entered in the accumulator; a control tube related to each bank of tubes, each control tube having one mode of operation if a control potential applied thereto is the output potential of a conducting tube of a bank and having another mode of operation if the control potential applied thereto is the output potential of a non-conducting tube of a bank; analysis control means settable to a multi-denominational amount-identification number to be used in selecting amounts to be accumulated from the tape, said analysis control means selectively connecting the control tubes to those ones of the tubes of their related banks which correspond to the digits in the several denominations of the identification number set on the analysis control means, said connections applying the output potentials of the selected tubes in the several banks to their related control tubes as control potentials whereby the control tubes will have said one mode of operation only when the sensed amount-identification number corresponds to the identification number set in the analysis control means and causes conduction in all the tubes of the banks to which the control tubes are connected; means for enabling all the control tubes to cooperate to control the entry control means to enable entries to be made in the accumulator only when all of said control tubes have said one mode of operation; and means to restore the chains of the several banks to their starting condition after each entry on the tape has been sensed.

28. In an apparatus for analyzing entries on a tape as the tape is fed continuously past a sensing means, each entry including an amount-identification number and a related amount in side-by-side relation across the tape and utilizing a predetermined length of tape, the combination of sensing means including means to project two lines of light across the tape which are spaced apart in the direction of tape feed a distance equal to the length of an entry on the tape, including photo-electric means for reading identification numbers and operated by light from one of said light lines according to the identification numbers, and including photo-electric means for reading amounts and operated by light from the other light line according to the amounts, said sensing means sensing the identification number of an entry first and thereafter sensing the related amount; means to feed the tape continuously past the sensing means so that as soon as an entry on the tape has been fed past the identification number reading photo-electric means it begins to pass the amount-reading photo-electric means; an accumulator; a chain of electron tubes operable one after another in sequence from a starting tube under control of the identification-number-reading photo-electric means to cause the tube of the chain which corresponds to the identification number of an entry to conduct, each tube of the chain, when conducting, providing an output potential which is distinctive from that which is provided when the tube is not conducting; entry control means coupling the amount-reading photo-electric means to the accumulator and controllable to enable sensed amounts to be entered in the accumulator; analysis control means settable to an amount-identification number to be used in selecting amounts to be accumulated from the tape, said analysis control means selectively coupling the entry control means to that tube of the chain which corresponds to the amount-identifying number set on the analysis control means to enable the output potentials of the chain to control the entry control means between the reading of the identification number and the reading of the amount to permit the sensed amount to be entered in the accumulator each time the sensed amount-identification number corresponds to the identification number set in the analysis control means and causes conduction in the tube of the chain to which entry control means is coupled; and means to reset the chain to starting condition after the amount of each entry has been sensed.

29. In an apparatus for analyzing entries on a tape as the tape is fed in either of two opposite directions past a sensing means, each entry including an amount-identification number and a related amount in side-by-side relation across the tape and utilizing a predetermined length of tape, the combination of sensing means including means to project two lines of light across the tape which are spaced apart in the direction of tape feed a distance equal to the length of an entry on the tape, including photo-electric means for reading identification numbers, including photo-electric means for reading amounts, including light-guiding means enabling the two photo electric means to be operated from both light lines according to data on the tape and including control means settable according to the direction of tape feed to enable only the identification-number-reading photo-electric means to be operated by light from the leading light line, according to the direction of tape feed, to read identification numbers and to enable only the amount-reading photo-electric means to be operated by light from the trailing light line, according to the direction of tape feed, to read amounts; means to feed the tape in successive passes back and forth past the sensing means, each pass consisting of a complete continuous feed of all the entries on the tape past the photo-electric means, and in each pass the continuous feed of the tape past the sensing means enabling an entry on the tape to begin its movement past the amount-reading photo-electric means as soon as the entry has passed the identification-number-reading photo-electric means regardless of the direction of tape feed; means to jointly control direction of operation of the tape-feeding means and the control means of the sensing means to cause the identification number to be read from each entry immediately before the amount in that entry in either direction of tape feed; an accumulator; a chain of electron tubes operable one after another in sequence from a starting tube under control of the identification-number-reading photo-electric means to cause the tube of the chain which corresponds to the identification number of an entry to conduct, each tube of the chain, when conducting, providing an output potential which is distinctive from that which is provided when the tube is not conducting; entry control means coupling the amount-reading photo-electric means to the accumulator and controllable to enable sensed amounts to be entered in the accumulator; analysis control means settable to an amount-identification number to be used in selecting amounts to be accumulated from the tape, said analysis control means selectively coupling the entry control means to that tube of the chain which corresponds to the amount-identifying number set on the analysis control means to enable the output potentials of the chain to control the entry control means between the reading of the identification number and the reading of the amount of each entry on the tape to permit the sensed amount to be entered in the accumulator each time the sensed amount-identification number corresponds to the identification number set in the analysis control means and causes conduction in the tube of the chain to which the entry control means is coupled; and means to reset the chain to starting condition after each entry is read from the tape.

30. In an apparatus for analyzing entries on a tape as the tape is fed in either of two opposite directions past a sensing means, each entry including an amount-identification number and a related amount in side-by-side relation across the tape and utilizing a predetermined length of tape, the combination of sensing means including means to project two lines of light across the tape which are spaced apart in the direction of tape feed a distance equal to the length of an entry on the tape, including photo-electric means for reading identification numbers, including photo-electric means for reading amounts, including light-guiding means enabling the two photo-electric means to be operated from both light lines according to data on the tape and including control means settable according to the direction of tape feed to enable only the identification-number-reading photo-electric means to be operated by light from the leading light line, according to the direction of tape feed, to read identification numbers and to enable only the amount-reading photo-electric means to be operated by light from the trailing light line, according to the direction of tape feed, to read amounts; means to feed the tape in successive passes back and forth past the sensing means, each pass consisting of a complete continuous feed of all the entries on the tape past the photo-electric means, and in each pass the continuous feed of the tape past the sensing means enabling an entry on the tape to begin its movement past the amount-reading photo-electric means as soon as the entry has passed the identification-number-reading photo-electric means regardless of the direction of tape feed; means to jointly control direction of operation of the tape-feeding means and the control means of the sensing means to cause the identification number to be read from each entry immediately before the amount in that entry in either direction of tape feed; an accumulator; means coupling the accumulator to the amount-reading photo-electric means, said coupling means normally blocking entries into the accumulator under control of the amount-reading means but controllable to allow entries to be made in the accumulator under control of the amount-reading means; analysis control means settable to an identification number to be used in selecting amounts to be accumulated during a pass of the tape; and selecting means controlled by the identification-number-reading photo-electric means and by the analysis control means and controlling the coupling means between the reading of the identification number and amount of each entry to enable amounts on the tape which are related to the identification number set on the analysis control means to be entered into the accumulator.

31. In an apparatus for analyzing entries on a tape as the tape is fed continuously past a sensing means, each entry including a multi-denominational amount-identification number and a related amount in side-by-side relation across the tape and utilizing a predetermined length of tape, the combination of sensing means including means to project two lines of light across the tape which are spaced apart in the direction of tape feed a distance equal to the length of an entry on the tape, including photo-electric means for reading identification numbers and operated by light from one of said light lines according to the identification numbers, and including photo-electric means for reading amounts and operated by light from the other light line according to the amounts; said sensing means sensing the identification number of an entry first and immediately thereafter sensing the related amount; means to feed the tape continuously past the sensing means so that as soon as an entry on the tape has been fed past the identification number reading photo-electric means it begins to pass the amount-reading photo-electric means; an accumulator; a plurality of banks of electron tubes, one bank for each denomination of the amount-identification number, and the tubes of each bank connected in a chain and operable one after another in sequence from the initial tube of the chain under control of the identification-number-reading photo-electric means to cause the tube of the chain which corresponds to the digit in the related order of the identification number of an entry to conduct, each tube of a chain, when conducting, providing an output potential which is distinctive from that which is provided when the tube is not conducting; entry control means coupling the amount-reading photo-electric means to the accumulator and controllable to enable sensed amounts to be entered in the accumulator; analysis control means settable to a multi-digit amount-identification number to be used in selecting amounts to be accumulated from the tape, said analysis control means selectively coupling the entry control means to those tubes of the various chains which correspond to the several digits of the multi-denominational amount-identifying number set on the analysis control means to enable the output potentials of the tubes in the several chains to jointly control the entry control means between the reading of the identification number and the reading of the amount to permit the sensed amount to be entered in the accumulator each time the sensed amount-identification number corresponds to the identification number set in the analysis control means and causes conduction in the tubes of the chains to which the entry control means is coupled; and means to reset the chains to starting condition after the amount of each entry has been sensed.

32. In an apparatus for analyzing entries on a tape as the tape is fed in either of two opposite directions past a sensing means, each entry including a multi-denominational amount-identification number and a related amount in side-by-side relation across the tape and utilizing a predetermined length of tape, the combination of sensing means including means to project two lines of light across the tape which are spaced apart in the direction of tape feed a distance equal to the length of an entry on the tape, including a group of photo-electric means for reading different denominations of identification numbers, including a group of photo-electric means for reading amounts including light-guiding means enabling the two groups of photo-electric means to be operated from both light lines according to data on the tape, and including control means settable according to the direction of tape feed to enable only the group of identification-number-reading photo-electric means to be operated by light from the leading light line, according to the direction of tape feed, to read identification numbers to enable only the group of amount-reading photo-electric means to be operated by light from the trailing light line, according to the direction of tape feed, to read amounts; means to feed the tape in successive passes back and forth past the sensing means, each pass consisting of a complete continuous feed of all the entries on the tape past the photo-electric means, and in each pass the continuous feed of the tape past the sensing means enabling an entry on the tape to begin its movement past the group of amount-reading photo-electric means as soon as the entry has passed the group of identification-number-reading photo-eletric means regardless of the direction of tape feed; means to jointly control direction of operation of the tape-feeding means and the control means of the sensing means to cause the identification number to be read from each entry immediately before the amount in that entry in either direction of tape feed; an accumulator; a plurality of banks of electron tubes, one bank for each denomination of the amount-identification number, and the tubes of each bank connected in a chain and operable one after another in sequence from an initial tube of the chain under control of the identification-number-reading photo-electric means to cause the tube of the chain which corresponds to the digit in the related order of the identification number of an entry to conduct, each tube of a chain, when conducting, providing an output potential which is distinctive from that which is provided when the tube is not conducting; entry control means coupling the group of amount-reading photo-electric means to their respective orders of the accumulator and normally blocking entries therein but controllable to enable sensed amounts to be entered in the accumulator; analysis control means settable to a multi-digit amount-identification number to be used in selecting amounts to be accumulated from the tape, said analysis control means selectively coupling the entry control means to those tubes of the various chains which correspond to the several digits of the multi-denominational amount-identifying number set on the analysis control means to enable the output potentials of the tubes in the several chains to control the entry control means between the reading of the identification number and the reading of the amount to permit the sensed amount to be entered in the accumulator each time the sensed amount-identification number corresponds to the identification number set in the analysis control means and causes conduction in the tubes of the chains to which the entry control means is coupled; and means to reset the chains to starting condition after the amount of each entry has been read.

33. In an apparatus for analyzing entries on a tape during successive passes of the tape back and forth past a sensing means, the combination of a sensing means; means to feed the tape back and forth past the sensing means, each pass consisting of a continuous feed of the entries on the tape past the sensing means; turn-around control means for controlling the feeding means to reverse the direction of feed between passes; a turn-around control signal on the tape adjacent each end of the tape;

and turn-around-operation-initiating means conditioned by the sensing means, when it senses the turn-around control signal on the tape which precedes the entries at the beginning of a pass, and operated by the sensing means, when it senses the control signal which follows the entries at the end of the pass, to operate the turn-around controls and initiate the turn-around operation in which the direction of tape feed is reversed.

34. In an apparatus for analyzing entries on a tape during successive passes of the tape back and forth past a sensing means, the combination of a sensing means; means to feed the tape back and forth past the sensing means; means settable according to the direction of the tape feed; two turn-around control signals on the tape, one beyond the last entry at each end of the tape for controlling reversal of the direction of the tape feed between passes; turn-around-operation-initiating means conditioned by the sensing means, when it senses the turn-around control signal on the tape which precedes the entries at the beginning of a pass, and operated by the sensing means, when it senses the control signal which follows the entries at the end of the pass, to operate and initiate a turn-around operation; turn-around control means controlled by the settable means and set in operation by the initiating means to cause the feeding means to reverse the direction of tape feed and stop further feeding of the tape as soon as the direction of feed has been reversed; and means thereafter operable to initiate further operation of the feeding means to cause another pass to be made.

35. In an apparatus for analyzing entries on a tape during successive passes of the tape back and forth past a sensing means, the combination of means to feed the tape back and forth past the sensing means, each pass consisting of a complete, continuous feed of all entries on the tape past the sensing means; means operated by the feeding means and settable according to the direction of feed of the tape in a pass; two turn-around control signals on the tape, one beyond the last entry at each end of the tape for causing the reversal of the direction of tape feed between passes; turn-around-operation-initiating means conditioned by the sensing means, when it senses the turn-around control signal which precedes the entries at the beginning of a pass and operated by the sensing means when it senses the control signal which follows the entries at the end of a pass; means operable by the initiating means and settable according to the direction of feed of the tape in the next pass; turn-around control means controlled by the two settable means and set in operation by the initiating means to cause the feeding means to reverse the direction of tape feed and to stop further feeding or the tape as soon as the direction of feed has been reversed; and means thereafter operable to initiate further operation of the feeding means to cause another pass to be made.

36. In an apparatus for analyzing entries on a tape as the tape is fed back and forth past a sensing means, the combination of a pair of reels on which the tape is wound alternately as the tape is fed back and forth; a motor to drive one of the reels to feed the tape in a pass in one direction; a motor to drive the other of the reels to feed the tape in a pass in the other direction; tape feed control means for controlling the application of power selectively to one or the other of the motors according to the direction of feed desired in the pass; means to initiate an analyzing operation and to control the direction control means to cause the desired direction of feed in the first pass of the tape; and turn-around control means controlled by the tape and operated near the end of one pass for causing an operation of the direction control means to shift the power supply to the motors between passes to reverse the direction of tape feed for the next pass.

37. In an apparatus for analyzing entries on a tape as the tape is fed back and forth past a sensing means, the combination of a pair of reels on which the tape is wound alternately as the tape is fed back and forth; a motor to drive one of the reels to feed the tape in a pass in one direction; a motor to drive the other of the reels to feed the tape in a pass in the other direction; means settable according to the direction in which the tape is being fed; tape feed direction control means for controlling the application of power selectively to one or the other of the motors according to the direction of feed desired in the pass; means to initiate an analyzing operation and to control the direction control means to cause the desired direction of feed in the first pass of the tape; turn-around control means controlled by the tape and operated near the end of a pass for causing an operation of the direction control means to shift the power supply to the motors to reverse the direction of tape feed; means jointly controlled by the settable means and by the direction control means during a turn-around operation to remove power from the motors as soon as the direction of the tape feed has been reversed; and means thereafter operable to restore power to the motors to cause resumption of tape feed in said reverse direction.

38. In an apparatus for analyzing entries on a tape as the tape is fed back and forth past a sensing means, the combination of a pair of reels on which the tape is wound alternately as the tape is fed back and forth; a capacitor start-and-run type motor to drive one of the reels to feed the tape in one direction; a capacitor start-and-run type motor to drive the other of said reels to feed the tape in the other direction; turn-around control means operable under control of the tape near the end of each pass for reversing the direction of feed, said control means including a change-over switch for selectively applying operating power to one or the other of said motors according to the direction of feed of the tape desired in a pass, said switch being operated in a turn-around operation to shift the power from the driving motor to the trailing motor to reverse the direction of feed and being of the make-before-break type and applying power momentarily to both motors during a turn-around operation to enable the trailing motor to maintain tension in the tape and assist in stopping the tape feed before taking over the drive of the tape.

39. In an apparatus for analyzing entries on a tape as the tape is fed back and forth past a sensing means, the combination of a pair of reels on which the tape is wound alternately as the tape is fed back and forth; a brake for each reel for arresting movement of the reel; a motor to drive one of the reels to feed the tape in one direction; a motor to drive the other of said reels to feed the tape in the other direction; brake control means including means operable to release both brakes whenever power is applied to either motor to drive the reels and including means settable according to the direction of tape feed for selectively controlling the brakes to apply the trailing brake in either direction of tape feed when power is removed from the motors; turn-around control means operable under control of the tape near the end of each pass for reversing the direction of feed, said control means including a change-over switch for selectively applying operating power to one or the other of said motors according to the direction of feed of the tape desired in a pass, said switch being operated in a turn-around operation to shift the power from the driving motor to the trailing motor to reverse the direction of feed and being of the make-before-break type and applying power momentarily to both motors during a turn-around operation to enable the trailing motor to maintain tension in the tape and assist in stopping the tape feed before taking over the drive of the tape.

40. In an apparatus for analyzing entries on a tape as the tape is fed past a sensing means, each entry including a multi-denominational amount-identification number, the combination of sensing means for sensing data on the tape; means to feed the tape past the sensing means; a plurality of banks of electron tubes, one bank for each denomination of an identification number; means connecting the tubes of each bank in a chain for operation one after another in sequence from a starting tube in response to input impulses; means coupling the chains of tubes in the several banks to the sensing means to receive input impulses therefrom as the amount-identification number sensing means senses the entries on the tape, said coupling means normally preventing operation of the chains by the sensing means; means to initiate an operation of the feeding means to cause the tape to be moved past the sensing means; means operated by the initiating means to render the coupling means to the several banks operable to allow the chains therein to be operated by the sensing means only when the tape is being fed past the sensing means; and means operable after each entry on the tape has been sensed, for restoring the chains to starting condition.

41. In an apparatus for analyzing entries on a tape as the tape is fed past a sensing means, each entry including an amount-identification number, the combination of sensing means for sensing data on the tape; means to feed the tape past the sensing means; a chain of electron tubes operable one after another in sequence from a starting tube in response to input impulses; means coupling the chain of tubes to the sensing means to receive input impulses therefrom as the amount-identification numbers are sensed; disabling means selectively operable in a first condition to disable the coupling means to prevent operation of the chain by the sensing means, and being ineffective in a second condition to disable the coupling means; means to restore the chain to starting condition after each entry is sensed; initiating means to initiate an operation of the feeding means to cause the tape to be moved past the sensing means; and control means operable to control the initiating means for initiation of an operation of the feeding means, and also operable to cause the disabling means to assume said second condition to enable the coupling means to effect operation of the chain by the sensing means when the tape is being fed past the sensing means.

42. In an apparatus for analyzing the entries on a tape as the tape is fed past a sensing means, each entry including an amount-identification number and a related amount, the combination of sensing means for reading the identification number and the amount; means to feed the tape past the sensing means; an accumulator; entry control means coupling the accumulator to the amount-sensing means, said entry control means normally blocking entries into the accumulator but controllable to enable sensed amounts to be entered into the accumulator; analysis control means settable to the identification number to be used in selecting amounts to be accumulated from the tape; selecting means controlled by the identification-number-sensing means and by the analyzing means for controlling the entry control means to allow entries in the accumulator when the sensed identification number agrees that that set on the analysis control means; means normally blocking the control of the selecting means by the identification-number-sensing means; means to initiate an operation of the feeding means; and means operated by the initiating means to control the blocking means to allow the selecting means to be controlled by the identification-number-sensing means only when the tape is being fed past the sensing means, said selecting means, in turn, controlling the entry control means to render the accumulator operable to receive entries under control of the amount-sensing means only while the tape is being fed past the sensing means, whereby improper control by the selecting means and improper entries in the accumulator are eliminated.

References Cited in the file of this patent

UNITED STATES PATENTS

| | | |
|---|---|---|
| 1,998,281 | Kuhlman et al. | Apr. 16, 1935 |
| 2,079,429 | Tauschek | May 4, 1937 |
| 2,338,636 | Goodrum et al. | Jan. 4, 1944 |
| 2,356,421 | Morse | Aug. 22, 1944 |
| 2,372,900 | Keen | Apr. 3, 1945 |
| 2,402,222 | Willis | June 18, 1946 |
| 2,484,115 | Palmer et al. | Oct. 11, 1949 |
| 2,503,906 | Gollwitzer | Apr. 11, 1950 |
| 2,518,378 | Roggenstein | Aug. 8, 1950 |
| 2,575,034 | Tyler et al. | Nov. 13, 1951 |
| 2,580,768 | Hamilton | Jan. 1, 1952 |
| 2,583,385 | Miller | Jan. 22, 1952 |
| 2,588,375 | Flint et al. | Mar. 11, 1952 |
| 2,621,854 | Sprague | Dec. 16, 1952 |
| 2,679,638 | Bensky et al. | May 25, 1954 |
| 2,734,690 | Limberger | Feb. 14, 1956 |
| 2,755,994 | Williams | July 24, 1956 |
| 2,782,985 | Vibbard | Feb. 26, 1957 |

FOREIGN PATENTS

| | | |
|---|---|---|
| 709,407 | Great Britain | May 26, 1954 |

OTHER REFERENCES

Mauchly: "Sorting and Collating," Lecture No. 22 of Theory and Techniques for Design of Electronic Digital Computers, June 30, 1948, 20 pages.

Figure 3:
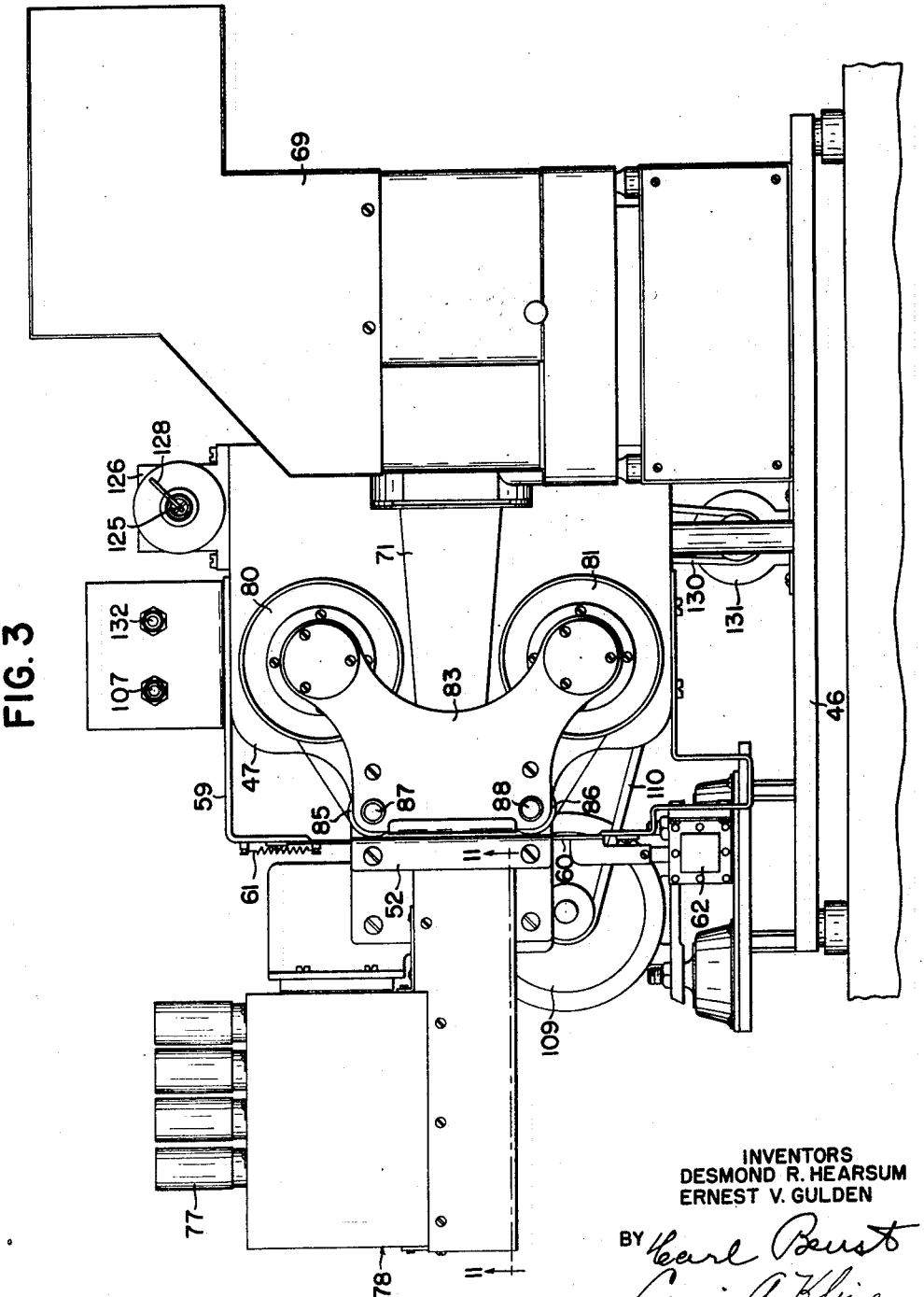
Fig. 3 is a front elevation view of the scanner section of the machine.

ERA, "24 Digit Parallel Computer with Magnetic Drum Memory," 1949 (69 pages spec., 47 shts. drgs.), pages 24 to 33 and 43, and Figs. 3.2-2, 3.3-4 to 3.3-9, 3.4-4, 3.5-3, and 3.5-4 relevant.

NBS Report No. 1519, "Analysis of the Application of Large-Scale Digital Computers to a Sorting Process," March 1952, 21 pages.

UNITED STATES PATENT OFFICE
CERTIFICATE OF CORRECTION

Patent No. 2,943,788  
July 5, 1960

Desmond R. Hearsum et al.

It is hereby certified that error appears in the printed specification of the above numbered patent requiring correction and that the said Letters Patent should read as corrected below.

Column 8, line 14, after "with" insert -- the --; column 9, line 28, for "lend" read -- lead --; column 17, line 55, for "1790" read -- 179 --; column 25, line 21, for "TTh" read -- Tth --; column 34, line 62, for "thed rum" read -- the drum --; column 40, line 27, for "conections" read -- connections --; column 41, line 26, for "S6b2" read -- S6b1 --; line 27, for "S1b1" read -- S1b2 --; column 49, line 73, for "conctacts" read -- contacts --; column 59, line 30, for "feed" read -- feeding --; column 60, line 62, for "unitary" read -- unit --; column 63, line 23, for "number", second occurrence, read -- numbers --; column 78, line 4, for "that", first occurrence, read -- with --.

Signed and sealed this 27th day of December 1960.

(SEAL)  
Attest:  
KARL H. AXLINE  
Attesting Officer

ROBERT C. WATSON  
Commissioner of Patents